*INVENTORS*
WARREN W. HOPPER
STANLEY J. PEZELY
LEONARD H. SICHEL, JR.
RONALD B. LOUNSBURY
PATRICIA V. ZIMMERMAN

*BY* Joseph P. Kates
ATTORNEY

INVENTORS.
WARREN W. HOPPER
STANLEY J. PEZELY
LEONARD H. SICHEL, JR.
RONALD B. LOUNSBURY
PATRICIA V. ZIMMERMAN

BY Joseph P. Kates

ATTORNEY

INVENTORS.
WARREN W. HOPPER
STANLEY J. PEZELY
LEONARD H. SICHEL, JR.
RONALD B. LOUNSBURY
PATRICIA V. ZIMMERMAN

BY Joseph P. Kates
ATTORNEY

INVENTORS.
WARREN W. HOPPER
STANLEY J. PEZELY
LEONARD H. SICHEL, JR.
RONALD B. LOUNSBURY
PATRICIA V. ZIMMERMAN

BY Joseph P. Kates
ATTORNEY

INVENTORS
WARREN W. HOPPER
STANLEY J. PEZELY
LEONARD H. SICHEL, JR.
RONALD B. LOUNSBURY
PATRICIA V. ZIMMERMAN

BY Joseph P. Kates
ATTORNEY

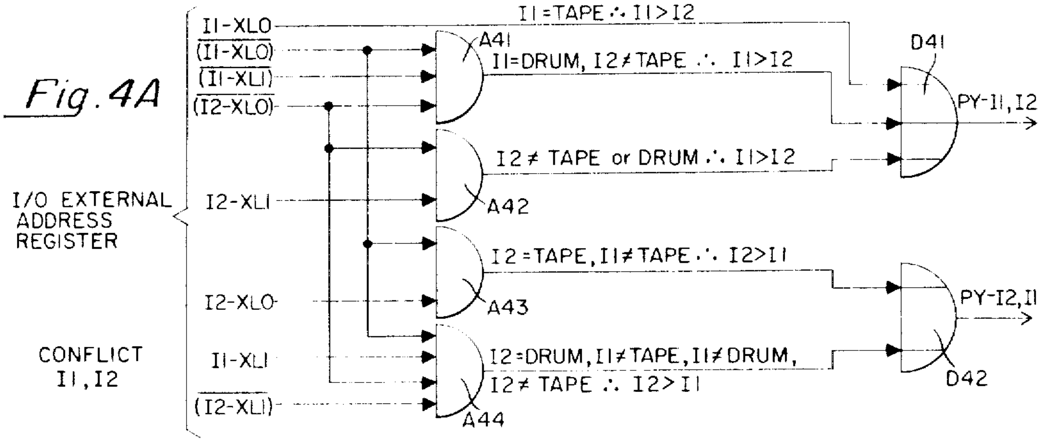
Fig. 4A
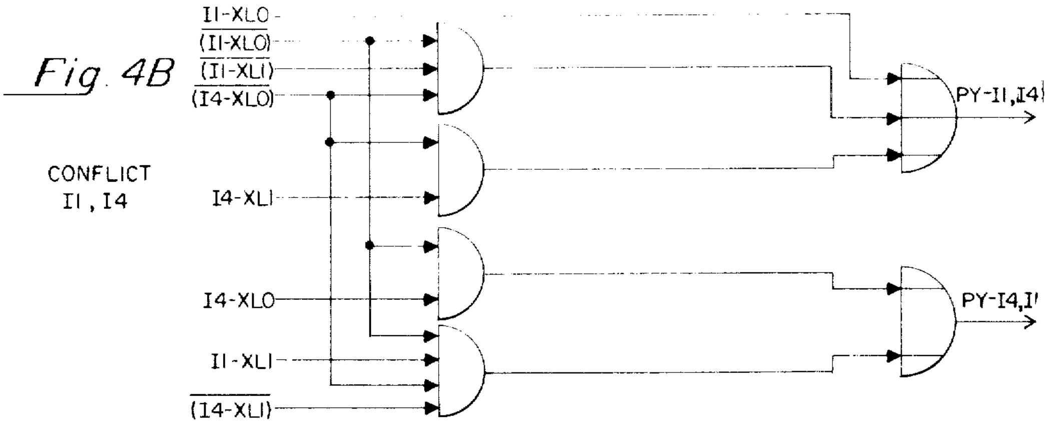
Fig. 4B
Fig. 4C
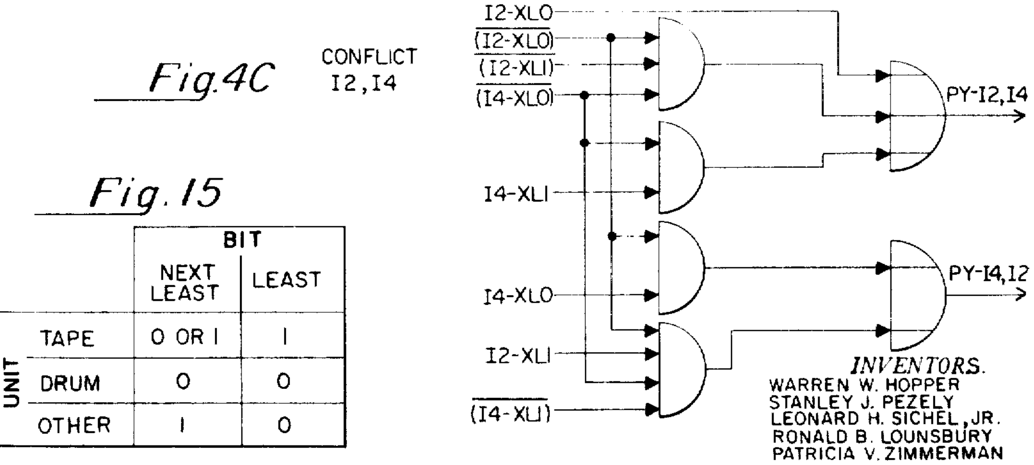
Fig. 15
| | | BIT | |
|---|---|---|---|
| | | NEXT LEAST | LEAST |
| UNIT | TAPE | 0 OR 1 | 1 |
| | DRUM | 0 | 0 |
| | OTHER | 1 | 0 |
INVENTORS.
WARREN W. HOPPER
STANLEY J. PEZELY
LEONARD H. SICHEL, JR.
RONALD B. LOUNSBURY
PATRICIA V. ZIMMERMAN
BY Joseph P. Kates
ATTORNEY INVENTORS.
WARREN W. HOPPER
STANLEY J. PEZELY
LEONARD H. SICHEL, JR.
RONALD B. LOUNSBURY
PATRICIA V. ZIMMERMAN
BY Joseph P. Kates
ATTORNEY INVENTORS
WARREN W. HOPPER
STANLEY J. PEZELY
LEONARD H. SICHEL, JR.
RONALD B. LOUNSBURY
PATRICIA V. ZIMMERMAN BY Joseph P Kates
ATTORNEY INVENTORS.
WARREN W. HOPPER
STANLEY J. PEZELY
LEONARD H. SICHEL, JR.
RONALD B. LOUNSBURY
PATRICIA V. ZIMMERMAN BY Joseph P. Kates
ATTORNEY INVENTORS.
WARREN W. HOPPER
STANLEY J. PEZELY
LEONARD H. SICHEL, JR.
RONALD B. LOUNSBURY
PATRICIA V. ZIMMERMAN BY Joseph P. Kates
ATTORNEY INVENTORS.
WARREN W. HOPPER
STANLEY J. PEZELY
LEONARD H. SICHEL, JR
RONALD B. LOUNSBURY
PATRICIA V. ZIMMERMAN
BY Joseph P. Kates
ATTORNEY

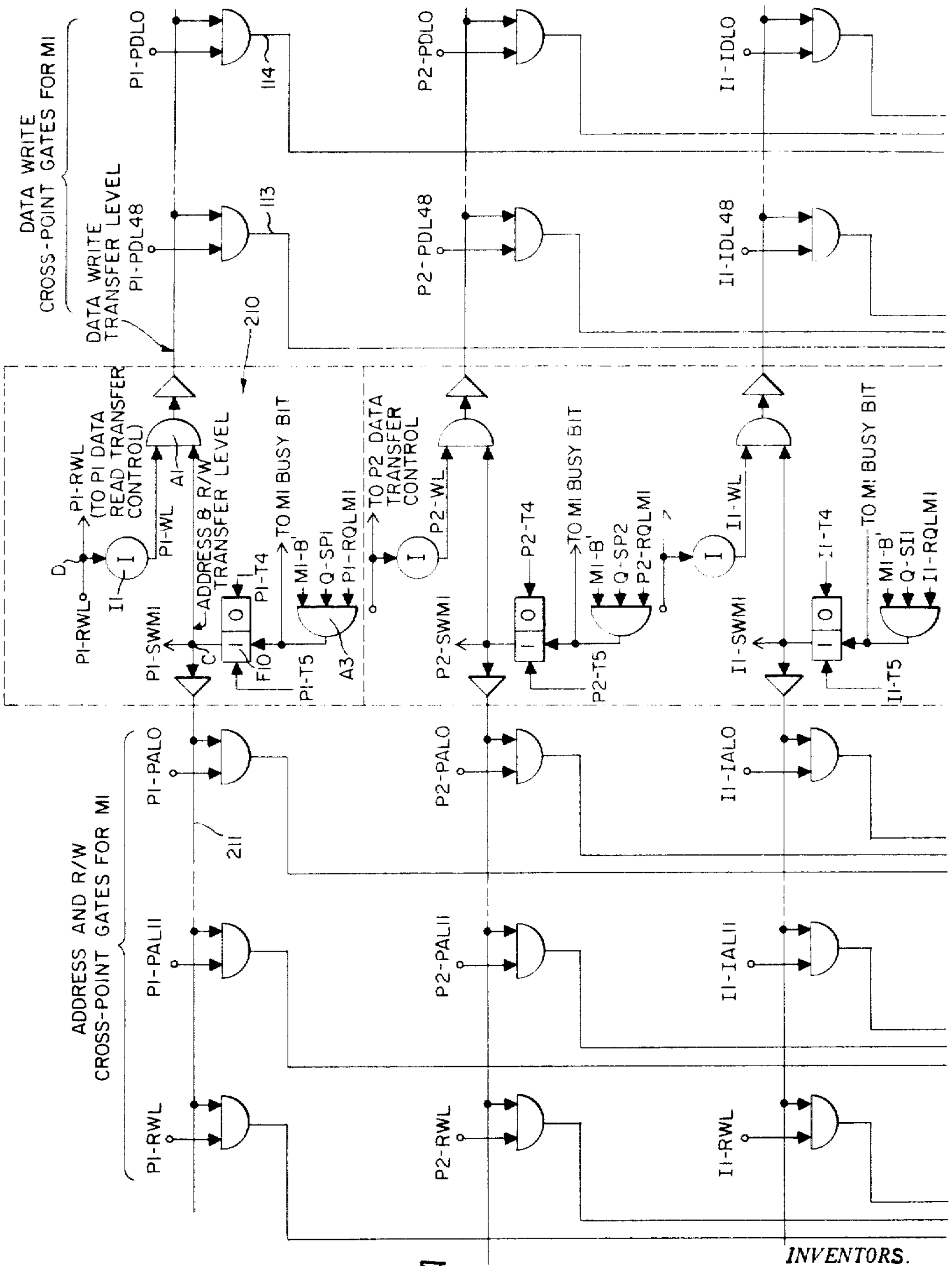
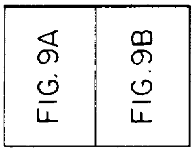
Fig. 9
Fig. 9A
INVENTORS.
WARREN W. HOPPER
STANLEY J. PEZELY
LEONARD H. SICHEL, JR.
RONALD B. LOUNSBURY
PATRICIA V. ZIMMERMAN
BY
Joseph P. Kates
ATTORNEY

COMPUTER SYSTEM

INVENTORS.
WARREN W. HOPPER
STANLEY J. PEZELY
LEONARD H. SICHEL, JR.
RONALD B. LOUNSBURY
PATRICIA V. ZIMMERMAN

BY Joseph P. Kates
ATTORNEY

INVENTORS.
WARREN W. HOPPER
STANLEY J. PEZELY
LEONARD H. SICHEL, JR.
RONALD B. LOUNSBURY
PATRICIA V. ZIMMERMAN
BY
Joseph P. Kates
ATTORNEY INVENTORS.
WARREN W. HOPPER
STANLEY J. PEZELY
LEONARD H. SICHEL, JR.
RONALD B. LOUNSBURY
PATRICIA V. ZIMMERMAN
BY
Joseph P. Kates
ATTORNEY INVENTORS.
WARREN W. HOPPER
STANLEY J. PEZELY
LEONARD H. SICHEL, JR.
RONALD B. LOUNSBURY
PATRICIA V. ZIMMERMAN BY Joseph P. Kates
ATTORNEY

*INVENTORS.*
WARREN W. HOPPER
STANLEY J. PEZELY
LEONARD H. SICHEL, JR.
RONALD B. LOUNSBURY
PATRICIA V. ZIMMERMAN

BY Joseph P. Kates
ATTORNEY

Sept. 20, 1966 W. W. HOPPER ET AL 3,274,554

COMPUTER SYSTEM

Filed Feb. 15, 1961 32 Sheets-Sheet 18

INVENTORS.
WARREN W. HOPPER
STANLEY J. PEZELY
LEONARD H. SICHEL, JR.
RONALD B. LOUNSBURY
PATRICIA V. ZIMMERMAN

BY Joseph P. Kates
ATTORNEY

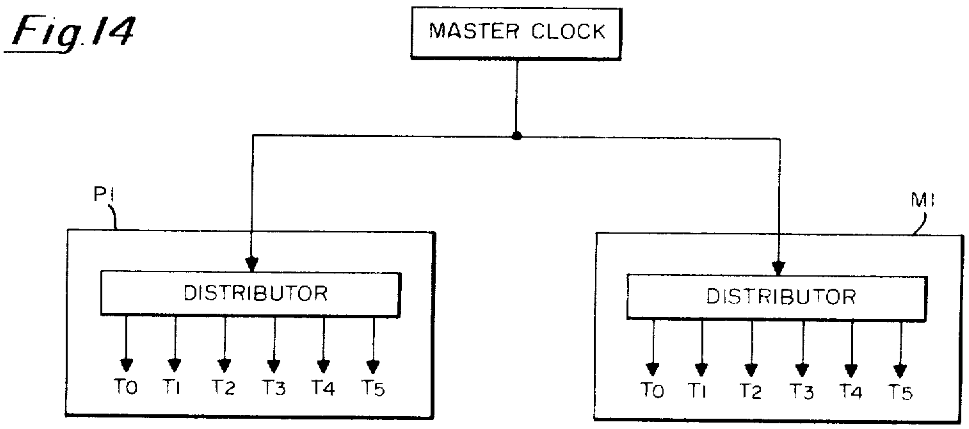
Fig. 14
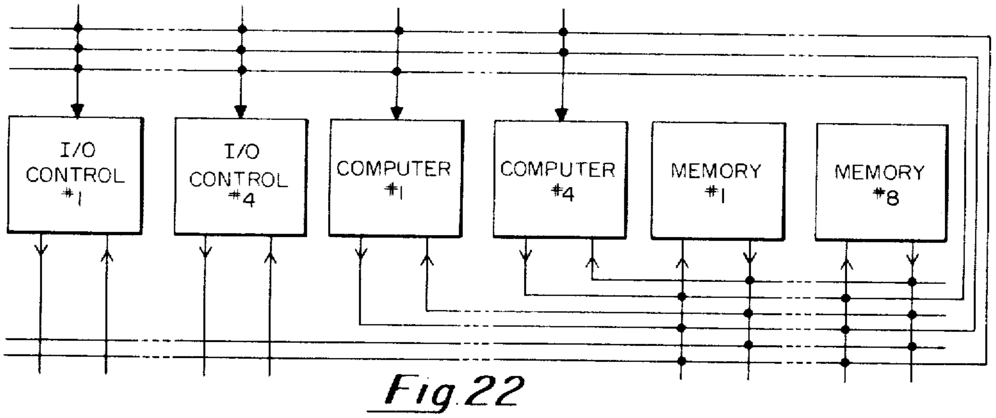
Fig. 22
| BUS NO. | 1 | 2 | 3 | 4 | 5 |
|---|---|---|---|---|---|
| 1 | | X | | | |
| 2 | X | | | | |
| 3 | | | | X | X |
| 4 | | | X | | X |
| 5 | | | X | X | |
CONFLICT MATRIX
Fig. 23A
| BUS NO. | 1 | 2 | 3 | 4 | 5 |
|---|---|---|---|---|---|
| 1 | | | | X | X |
| 2 | X | | | X | X |
| 3 | X | X | | X | X |
| 4 | | | | | X |
| 5 | | | | | |
PRIORITY MATRIX
Fig. 23B
| BUS NO. | 1 | 2 | 3 | 4 | 5 |
|---|---|---|---|---|---|
| 1 | | | | | |
| 2 | X | | | | |
| 3 | | | | X | X |
| 4 | | | | | X |
| 5 | | | | | |
QUEUE MATRIX
Fig. 23C
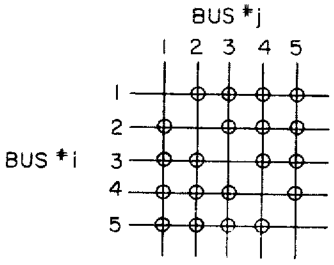
Fig. 24
INVENTORS.
BY WARREN W. HOPPER
STANLEY J. PEZELY
LEONARD H. SICHEL, JR.
RONALD B. LOUNSBURY
PATRICIA V. ZIMMERMAN
Joseph P. Kates
ATTORNEY

COMPUTER SYSTEM

Filed Feb. 15, 1961 32 Sheets-Sheet 20

INVENTORS.
WARREN W. HOPPER
STANLEY J. PEZELY
LEONARD H. SICHEL, JR
RONALD B. LOUNSBURY
PATRICIA V. ZIMMERMAN
BY Joseph P. Kates
ATTORNEY INVENTORS.
BY WARREN W. HOPPER
STANLEY J. PEZELY
LEONAND H. SICHEL, JR.
RONALD B. LOUNSBURY
PATRICIA V. ZIMMERMAN Joseph P. Kates
ATTORNEY Sept. 20, 1966 W. W. HOPPER ET AL 3,274,554

COMPUTER SYSTEM

Filed Feb. 15, 1961 32 Sheets-Sheet 22

INVENTORS.
WARREN W. HOPPER
STANLEY J. PEZELY
LEONARD H. SICHEL JR.
RONALD B. LOUNSBURY
PATRICIA V. ZIMMERMAN

BY Joseph P. Kates
ATTORNEY

COMPUTER SYSTEM

Filed Feb. 15, 1961

INVENTORS.
WARREN W. HOPPER
STANLEY J. PEZELY
LEONARD H. SICHEL, JR.
RONALD B. LOUNSBURY
PATRICIA V. ZIMMERMAN

BY Joseph P. Kates

ATTORNEY

INVENTORS.
WARREN W. HOPPER
STANLEY J. PEZELY
LEONARD H. SICHEL, JR.
RONALD B. LOUNSBURY
PATRICIA V. ZIMMERMAN
BY Joseph P. Kates
ATTORNEY INVENTORS.
WARREN W. HOPPER
STANLEY J. PEZELY
LEONARD H. SICHEL, JR.
RONALD B. LOUNSBURY
PATRICIA V. ZIMMERMAN
BY Joseph P. Katz
ATTORNEY INVENTORS.
WARREN W. HOPPER
STANLEY J. PEZELY
LEONARD H. SICHEL, JR.
RONALD B. LOUNSBURY
PATRICIA V. ZIMMERMAN
BY
Joseph P Kates
ATTORNEY INVENTORS.
WARREN W. HOPPER
STANLEY J. PEZELY
LEONARD H. SICHEL, JR.
RONALD B. LOUNSBURY
PATRICIA V. ZIMMERMAN BY Joseph P. Kates
ATTORNEY Sept. 20, 1966 W. W. HOPPER ET AL 3,274,554

COMPUTER SYSTEM

Filed Feb. 15, 1961 32 Sheets-Sheet 28

INVENTORS.
WARREN W. HOPPER
STANLEY J. PEZELY
LEONARD H. SICHEL, JR.
RONALD B. LOUNSBURY
PATRICIA V. ZIMMERMAN

BY Joseph P. Kates

ATTORNEY

COMPUTER SYSTEM

INVENTORS.
WARREN W. HOPPER
STANLEY J. PEZELY
LEONARD H. SICHEL, JR.
RONALD B. LOUNSBURY
PATRICIA V. ZIMMERMAN

BY Joseph P. Kates
ATTORNEY

Sept. 20, 1966 W. W. HOPPER ET AL 3,274,554

COMPUTER SYSTEM

Filed Feb. 15, 1961 32 Sheets-Sheet 30

INVENTORS
WARREN W. HOPPER
STANLEY J. PEZELY
LEONARD H. SICHEL, JR.
BY RONALD B. LOUNSBURY
PATRICIA V. ZIMMERMAN

Joseph P. Kates
ATTORNEY

INVENTORS
WARREN W. HOPPER
STANLEY J. PEZELY
LEONARD H. SICHEL, JR.
RONALD B. LOUNSBURY
PATRICIA V. ZIMMERMAN

BY Joseph P. Kates
ATTORNEY

COMPUTER SYSTEM

Filed Feb. 15, 1961

INVENTORS.
WARREN W. HOPPER
STANLEY J. PEZELY
LEONARD H. SICHEL, JR.
RONALD B. LOUNSBURY
PATRICIA V. ZIMMERMAN

BY Joseph P. Kates
ATTORNEY

United States Patent Office 3,274,554

Patented Sept. 20, 1966

3,274,554

COMPUTER SYSTEM

Warren W. Hopper, West Chester, Stanley J. Pezely, Norristown, Leonard H. Sichel, Jr., Bryn Mawr, Ronald B. Lounsbury, St. Davids, and Patricia V. Zimmerman, Oreland, Pa., assignors to Burroughs Corporation, Detroit, Mich., a corporation of Michigan Filed Feb. 15, 1961, Ser. No. 89,525

27 Claims. (Cl. 340—172.5)

The present invention relates to a modular computer system. More particularly the present invention relates to a switch interlock apparatus and method comprising a bus allocator and a cross-point control switching subsystem in combination in an expansible high speed data processing apparatus for computer operations. The data processing apparatus may comprise a modular processor system incorporating a plurality of processors, input-output control units, memory modules and the switch interlock link system therefor. The switch interlock system permits maximum continuous simultaneous use of all modular components. This interlock system resolves all conflicts in accordance with predetermined plans of priorities and includes means and a method for continuous queuing up of messages in order of instantaneous priorities which are continuously being realized in accordance with a predetermined fixed priority allocation and condition actuated variable priority allocations.

The present invention solves problems of the present state of art which occur in the natural evolutionary process of growth in computing system work-loads. This growth cannot be suppressed nor completely predicted. The present invention provides a method and means whereby the changing needs of dynamic applications are satisfied. It provides efficient data processing capability with maximum utility of computer units. It provides a new concept of computer system organization which introduces a second generation in computers, namely, expansible modular computer systems. The system can provide flexibility of application including real time processing.

The efficiency of the module computer system of this invention is required for both commercial and military computing systems. Its need in military use is enhanced because of the ever increasing complex strategic environment of modern warfare which uses weapons of advanced technology presenting tremendous requirements for reliable, automatic high-speed aids in such functions as evaluation, command, operation, check-out, communication, record-keeping and related areas. Here, concepts of the modern large-scale computers are employed to provide the automaticity, rapid recognition and reaction, accuracy, reliability and equipment maintainability demanded. Such computers are required in military applications such as mobile fire control systems, within aircraft, missiles, and satellites, and in other military and commercial applications where size, weight and power consumption are critical and where each task to be performed is, in effect, one of a clearly defined set. Other large-scale computer uses include applications to ground or ship-based configurations where there is emphasis on the number and diversity of the tasks performed, and upon the sheer quantity of data to be processed. The improvements afforded by adaptation of the invention herein are required by these and other applications such as command, control and communication systems; air surveillance and traffic control systems; nuclear system control operations; weather data collection and reporting systems. In solving tasks such as occur in space traffic control, in automatic ground control and check out of aircraft, submarines and in general systems where amount of equipment, system complexity, accuracy, fast response time, and other factors presents similarity in function, speed, capacity, type of data handled, manner in which employed, and similar reliability and maintainability requirements, general-purpose commercial equipment may be used. This general-purpose equipment compromises between desirability of special-purpose systems conforming to individual specifications of a task, and the advantages of a general-purpose computer which is adaptable readily to many applications, which is capable of expansion to meet particular needs, which is standardized and which saves the expense and time required for development of a special-purpose system conforming to specific commercial or military specifications.

Prior art large-scale computer system installations become saturated rapidly by an ever-increasing work-load never contemplated during the systems, inception.

The present invention comprises a modular computer system made up of interconnected functionally independent modules such as computer modules, memory modules, input-output control modules, etc. The present invention also comprises a program-responsive switching matrix for the most advantageous possible system of interconnection in combination with functional units of an overall system. The switching interlock of the invention also introduces methods and apparatus which provide contributions to effectively solve problems such as interconnection, timing, conflict, special request and information flow problems which arise in many types of other systems and applications. In the modular processor of the present invention modules may be added as requirements grow. The inventive system may be programmed to automatically assume an optimized working configuration for any problem or set of problems.

The inventive modular processor system effectively solves most large-scale, ground-based, military and commercial computing applications. It uses modern computer techniques and components. It approximates the capability and efficiency of a custom-tailored system through its use of a flexible organization of standard modular elements. The inventive system has built-in growth potential, being independently expansible in effective computation speed and input-output capability, as well as in memory capacity. Thus it matches the innate growth proclivity of most data processing applications. Growth, even beyond the maximum configuration suggested is practical. In the illustrative embodiment shown herein, addressing capability is inherent for a memory of over 32,000 words. The unitized structure of the system data busses and data flow control (switching interlock) enables expansion readily to accommodate more memory; computer and/or input-output control modules. The present invention enables use of a machine of high versatility which may be a high frequency (one or three megacycles, for example) synchronous, digital computing and data-processing system. Arithmetic processes and data flow within the system may be serial-parallel or parallel in nature. The command structure includes binary-decimal and alphanumeric instructions. Binary arithmetic may be fixed or floating-point with the computer organization oriented to an efficient-floating point computation. The addressing structure of the computer incorporates the power of a three-address machine, although less than this maximum can be processed with each instruction with commensurate savings in instruction time. Instructions may be specified by the use of strings of 12-bit syllables. An operation may consist only of a single operation syllable or it may embrace a number of complex syllable strings.

The invention provides for a system of maximum packing of program and memory which is achieved by holding four instruction syllables in each memory location. Instructions need not conform to normal memory word boundaries.

The inventive system enables problems to be performed in a small fraction of the time required by other flexible organized general-purpose computers. The inventive system is considerably faster than presently known computers within its price class.

The modular nature of the inventive system provides an inherent reliability advantage. The system is available for operation on the order of over 96% of the time. A single failure does not disable the entire system. The modular configuration enables the assigned task of a temporarily disabled module to be rapidly and automatically reassigned to another module of the same type. The inventive modular processor system can be efficiently operated in a small floor area of the order of 1200 square feet. It presents an improved power consumption feature. It does not require air conditioning beyond that used usually for office space. Maintenance is rapid and simple. The inventive system is adapted to plug-in unitized design. Automatic self-diagnostic routines are enabled which cut down repair time.

The novel plan of system organization and intercommunication provides for unique flexibility and efficiency of the modular processor system of the invention.

The present invention provides an integrated system of equipment grouped in an expansible, modular organization that may take many logical forms. It provides efficient operation and equipment utilization. The considerable flexibility and expansibility in the system organization permits it to be oriented and tailored to any of a broad range of real-time and non-real-time applications and to be reorientated in the field by appropriate additions of modules. Its advantages include insurance of maximum data utilization of equipment, minimum over-all processing time, real-time variable-priority multiproblem capability, broad interprogram flexibility, maximum input-output data rates, automatic by-pass of hardware malfunctions and rapid communication between the system and the operator.

The modular processor technique of the invention makes it possible to approach the ideal condition where all computer and input-output control modules are concurrently engaged in computational manipulation of input-output data. Although individual modules can be apportioned and preassigned to independent problems much like a group of conventional computers, the equipment may be accompanied by an automatic operating and scheduling program stored in the commonly-shared memory comprising a master control program which may be run only when needed and avoid the wait resulting from the idleness of a computer module specifically allocated for scheduling. Both minimizing of idle time of computers and also minimizing the running time of certain high priority programs can be used at the expense of delaying other programs. The console arrangement possible with the inventive module system enables easier access by operators and enables uniquely flexible efficient programming through the use of variable length instructions. The data word of the illustrative embodiments is of sufficient length (48 bits including sign) for most computing problems and for useful binary floating-point computation. This provides improved resolution for floating-point arithmetic which would otherwise require a larger scale computing system. The invention features automatic interrupt capability which provides additional control and facilitates recognition and diagnosis of computer element failures. Each computer module is enabled to establish a master-slave relationship with any other computer module in the system if desired.

In the modular computing system of the invention the modules comprise functionally self sufficient units, such as memory modules, input-output control modules, for controlling computer equipment such as magnetic tapes, printers, card readers etc., and computer modules such as arithmetic and control modules (without memory units associated) and possible other specialized modules for particular installation such as communication modules to control teletype communication links in a command control system. This invention solves certain problems which arise because of its modular and expansible nature. Ideally modules should operate with equal efficiency in small or large configurations. To achieve this objective, the present invention provides a flexible system organization with means for rapid and coordinated communications between modules. In large configurations for expanded systems parallel communications is a requirement. The present invention satisfies requirements of the critical factor of time in a computer system. Each module can communicate rapidly with any other module in the inventive system. Furthermore, it contemplates that if the configurations become larger a parallel link can be provided for intermodule communications so that multiple intermodule transfers may take place simultaneously. The modules connected to each parallel link should operate so that communications over individual links occur asynchronously with respect to each other. The multiple links can operate simultaneously as long as there is no conflict. A conflict occurs when two modules simultaneously address a third module. That is, for example, if two computers address the same memory module, one computer is denied access because of the probability that they will address different words within the memory module once access has been obtained. The invention solves the problem of minimizing delays for intermodule communications in cases of no conflict and immediately detects conflicts where they do occur and resolves them in an orderly manner.

The switching techniques of telephone equipment avoid conflicts in the establishments of links by using scanners in the passive end of the links, i.e., the terminal being addressed. For example, a scanner (lock-out circuit in telephone terminology) is used in each memory module so that in the event of simultaneous address of a memory module by multiple computers, only one computer can gain access and all other computers are locked out. Similarly, each computer is linked to multiple input-output buffers using the same type of scanner. A second approach to this problem uses the standard technique of cross-point array for the intermediate module indications links; and to avoid and resolve conflicts it uses an additional communication network that fans out from the computer module designated as the master computer. The master computer scans requests from other modules on the control network, decides which request will be serviced, and then establishes the requested communication lengths by effecting the necessary connections on the cross-point array.

These two parallel approaches of the art are disadvantageous in that they do not afford generality. In the telephone design approach, the number of input-output modules is limited by the number of computers. Hence, in a small configuration the system may be limited as to input-output modules. Also, since input-output control and computer transfers to the memory use the same link between the computer and the memory, simultaneous input-output control I/O and computer transfers are impossible. Additionally, the multiplicity of scanner circuits places an undesirable economic limit on the sophistication of each circuit.

Disadvantageous loss of generality in systems of the second approach results in the larger configurations because the central exchange tends to become a bottleneck in establishing new communication links. This approach is slow even in small configurations which is a serious handicap.

The present invention introduces a switching interlock system including a bus allocator and a cross-point switch which provides advantageous resolving of time conflicts resulting from simultaneous requests for the same bus of a module and which enables a pre-emptive priority system which is constantly changing in required respects to be instituted. Further advantages of the inventive system are provided by its variable instruction length, efficient use of both program time and space, indirect addressing of unlimited depth, efficient direct addressing through flexible and powerful index registers and a flexible operand stack minimizing requirement for operand manipulation.

The inventive system can use hybrid transistor-diode logic. This logic has advantages of optimum use of the transistor gain and bandwidth product, non-critical transistor parameters, large fan-in and fan-out capability, maximum system reliability through minimum number of circuit components and minimum component cost through use of inexpensive diode gates and use of transistors in a dual function as amplifying gates.

An object of the present invention is to provide an expansible, ultra-high speed, general purpose modular processor computing system adapted for both commercial and military application.

Another object of the present invention is to provide a modular processor, digital computing system of real-time, multi-problem capability which has programming flexibility and is capable of automatic parallel assignment of modules.

Another object of the present invention is to provide a reliable modular processor computer system which incorporates features of self-diagonsis and automatic failure by-pass.

Another object of the present invention is to provide a reliable, flexible, highly efficient and speedy modular processor system which provides maximum data utilization of equipment with minimum overall processing time, real-time variable priority multi-problem capability, broad inter-program flexibility, maximum input-output data rates, automatic by-pass of hardware malfunctions and rapid communication between system and operator.

Another object of the present invention is to provide a system adapted to operate from an automatic operating and scheduling program which assigns segments of individual programs in efficient patterns and sequences to mutually independent standard modules, which system is controlled from a central timing source and which inter-communicates rapidly and automatically through a central switching interlock subsystem.

Another object of the invention is to provide a computer module processor system wherein system elements are in maximum use substantially all the time and wherein operation continues despite some equipment failure.

Another object of the present invention is to provide a switching interlock for a processor system which enables automatic parallel routing and control of inter-module communications and which provides an interrupt feature.

Another object of the present invention is to provide a switching interlock for a module computer to resolve communication conflicts by scheduling wherein this function is accomplished relatively simply with a comparatively small amount of circuitry and without delay both where there is no conflict in requests to the same unit and for the priority case where a pair of conflicting messages are addressed to the same unit.

Another object of the present invention is to provide a switching interlock system for multi-module computor apparatus wherein the switching equipment is distributed throughout the system, wherein control functions of the switching interlock are passive in the absence of conflicting demands and wherein active control relies upon a variable and program controllable priority system.

Another object of the present invention is to provide a computing module system which is flexible at several levels and wherein programs can be performed in parallel fashion so that all modules may automatically time-share programs for maximum efficiency, wherein various programs of varying priorities can be similarly performed in parallel, with high priority programs being assured prior completion, wherein any combination of alpha-numeric, binary or decimal computation may be programmed simultaneously, wherein system expansion without disturbing system balance permits reduced overall processing time and greater multi-program capability, memory capacity, and input-output transfer rate; wherein system expansibility is such as to accommodate modernization of equipment designs in any area of the module complement, thus extending the competitive useful life of the system; and wherein is provided a unitized switching interlock structure and excess system addressing capability to enable ready and practical system expansibility beyond present maximum configuration.

Another object of the present invention is to provide a module computor system and method whereby conflicts between functional modules when attempting to communicate with a particular memory module are resolved automatically in accordance with desired priority, one requestor module gaining access within a normal access time and the other requestor module being delayed until completion of the first memory transfer and wherein queuing of requestor modules which have not yet been serviced is effected to realize continuously the order of priority.

Another object of the invention is to provide a flexible modular data processing system incorporating units such as computers and input-output control units, the units having independent access to memory, permitting a relatively simple input-output control module to control the operation of input-output devices and enabling manipulation of data only to assemble or disassemble computer words in the forms necessary to data transfer so that the computer modules perform only the more complex data manipulation and return to other tasks when input-output traffic is light to enhance ready capabilities of the system and provide built-in growth potential.

Another object of the invention is to provide a switching interlock comprising a bus allocator to define and resolve all time conflicts resulting from simultaneous requests for the same bus or module by having the conflicting requestors queue up according to a multi-level priority assigned by a program and transmitted with each request, the priority system being pre-emptive in that a new request for a high priority will precede a low priority request already in the queue.

Another object of this invention is to provide a centralized switch interlock to effect automatic parallel routing and control of inter-module communications and interrupt signals.

Another object of the invention is to provide a modular processor programming structure which is compact, efficient, powerful and convenient to use, which is adaptable to variable instruction length, which has unary instructions and one, two and three address forms of instructions permitting most efficient use of both program time and space, which provides for indirect addressing of unlimited depth, which incorporates flexible and powerful index registers providing efficient direct addressing and which is provided with a flexible operand stack to minimize requirements for operand manipulation.

Another object of the present invention is to provide a matrix system with control of interconnection among a plurality of processors, memory modules and input-output equipment.

Another object of the invention is to provide a switching interlock comprising switching means and a bus allocator for resolving time conflicts upon simultaneous requests by different function modules for the same memory module and wherein the conflicting requestors queue up according to a first fixed priority among requestor units and a second priority between certain of the requestors in accordance with instantaneous conditions, indication of which conditions is transmitted with each request, said priority system being pre-emptive such that a new request of high priority precedes a low priority request already in the queue.

Another object of the invention is to provide a conflict system including a queue matrix capable of resolving conflicts on the basis of priorities wherein a requesting module is held if the memory it requests is busy or if a conflict is resolved against it and wherein means for initiating a descriptor request from a requestor module for reading out from a memory module to a second requestor module is provided.

Another object of the present invention is to provide a generalized switch interlock system for a module computer which can handle a plurality of modules such as processor modules and input-output control modules which in turn handle a plurality of input-output devices and wherein the exact bus configuration of the switch interlock is not frozen and wherein a prority hierarchy places requests from input-output devices for memory access in an order to be determined by each input-output device's designation code and which also places these requests ahead of similar requests from a first and a second processor module in that order of priority.

Another object of the present invention is to provide for switch interlock operations for a modular computer system wherein all operations with the exception of two-way data interchanges involved in stack operations are completed in six pulse times.

Another object of the invention is to provide a modular computing system comprising functionally self-sufficient units, which means enables rapid and coordinated communication between modules, which is adaptable to parallel communication and adaptable either so that modules can communicate with certain other or with all other modules in the system, and providing for multiple links which can operate simultaneously without conflicts.

Another object of the present invention is to provide a switch interlock for a modular processor system wherein delays are eliminated in module intercommunication in cases of no conflict between requestor modules and incorporating features of immediate detection of conflicts where they do occur and resolving them in an orderly and rapid manner.

Another object of the present invention is to provide a computer system characterized by a fully-shared core memory which may be used concurrently by any one of computer modules and input-output modules in the system whenever conflict between these modules is not present and which provides an automatic switching interlock to resolve conflicts between requesting modules with a technique of establishing queues in order of priority such that one module gains access to the memory within normal access time and any other in conflict is delayed until completion of the first memory transfer.

Another object of the present invention is to provide for a switching interlock system wherein certain units share other devices which system uses a technique of priorities and queues, when precedence is given to the most important transfers between units and wherein delayed transfers are automatically handled in an order of precedence without requiring that the requested device store the request which it cannot immediately service.

Other objects and many of the attendant advantages of the present invention will be appreciated as the same become better understood by reference to the following detailed description when considered in connection with the accompanying drawings wherein.

Figure 1:
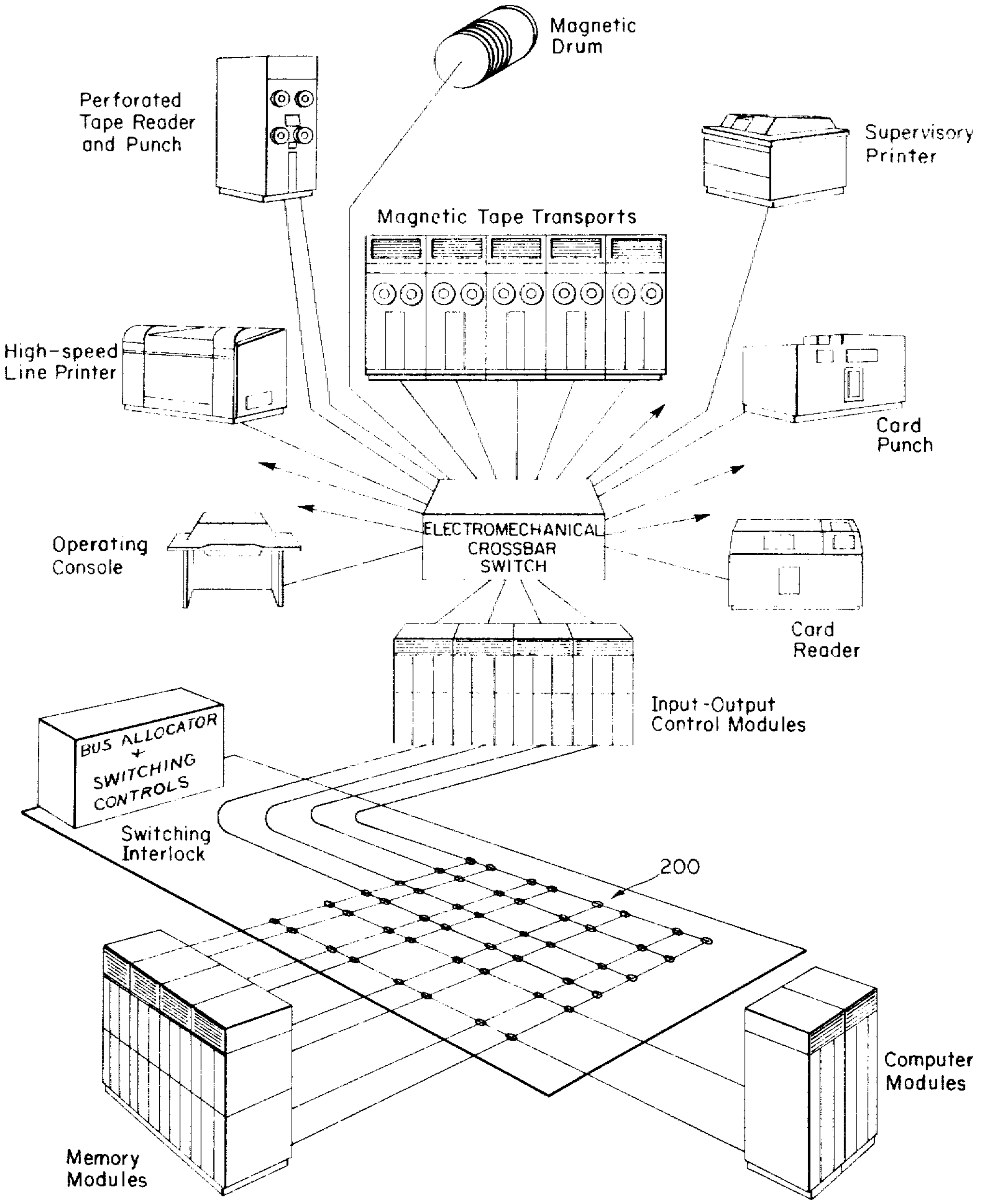
FIG. 1 is a partially schematic and partially pictorial representation of a preferred embodiment of the modular processor of the invention.
Figure 2:
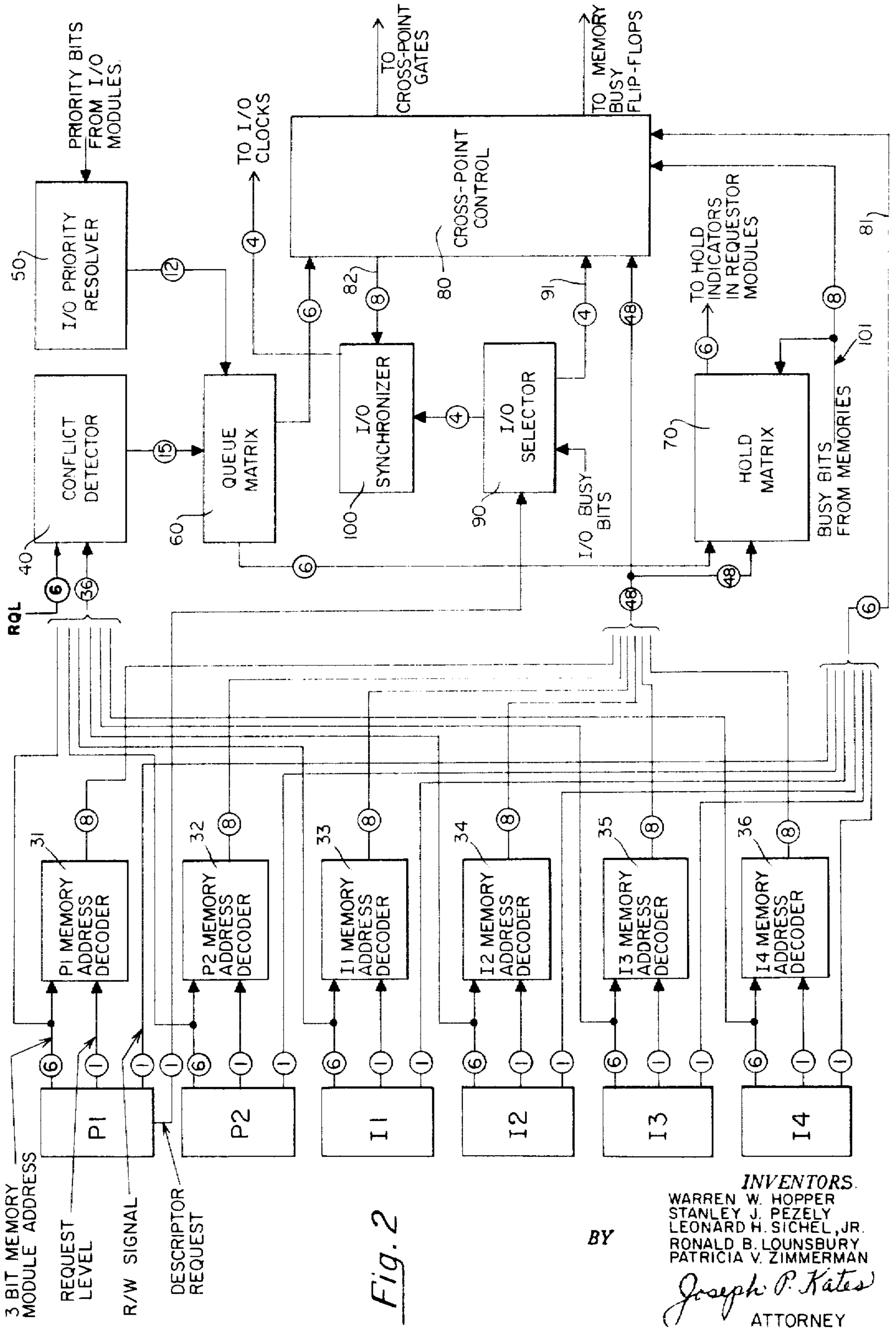
FIG. 2 is a block diagram of the bus allocator of the switching interlock system of the FIG. 1 embodiment.
Figure 6:
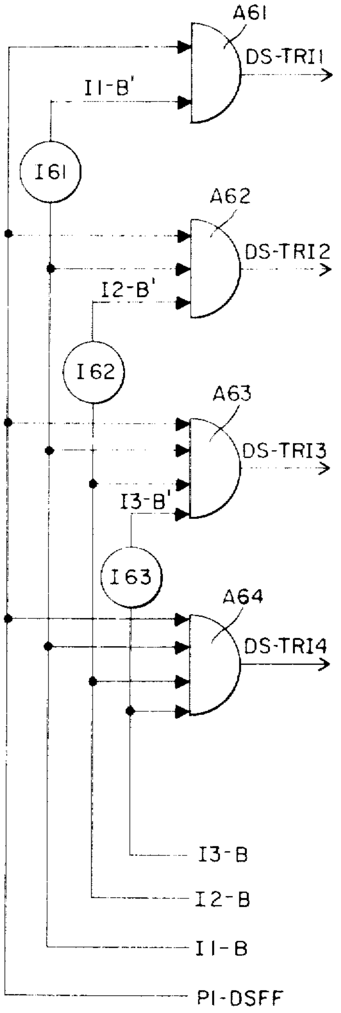
Figure 4D:
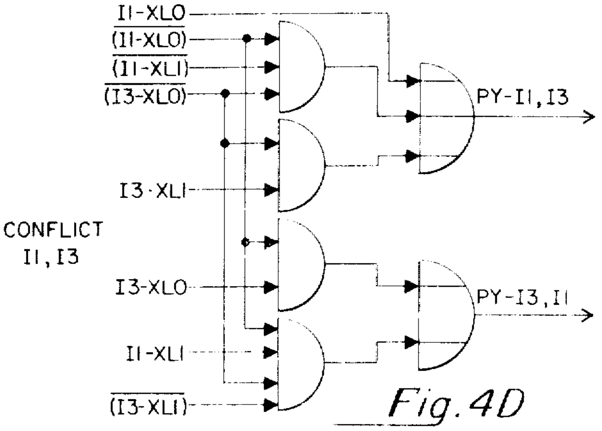
Figure 4E:
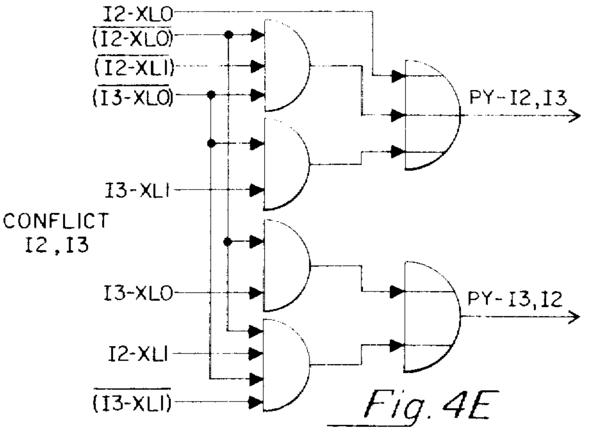
Figure 4F:
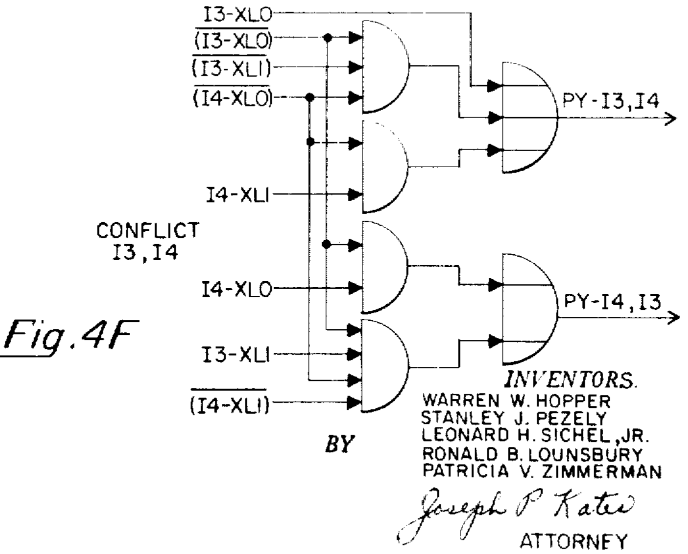
Figure 5:
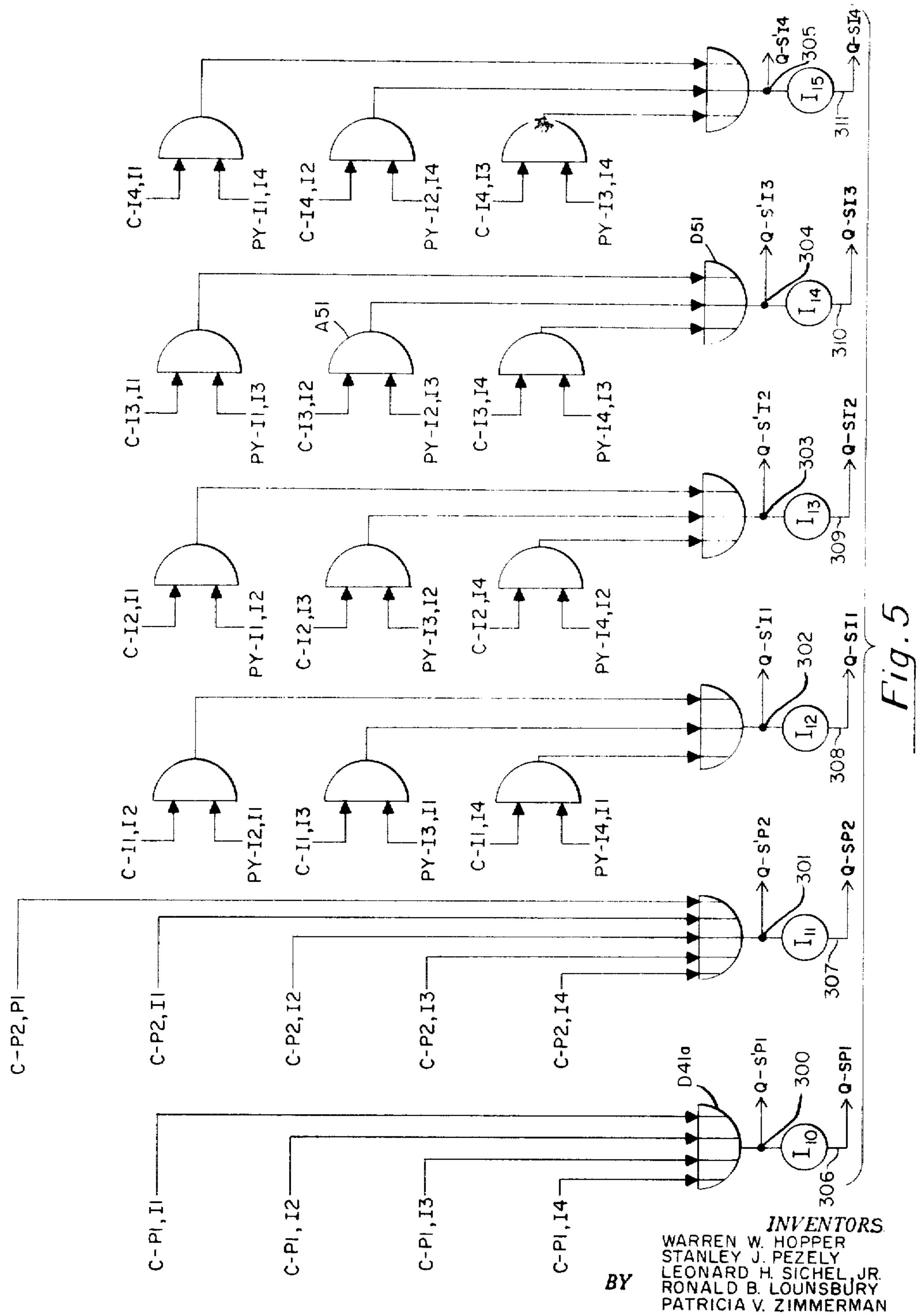
Figure 7:
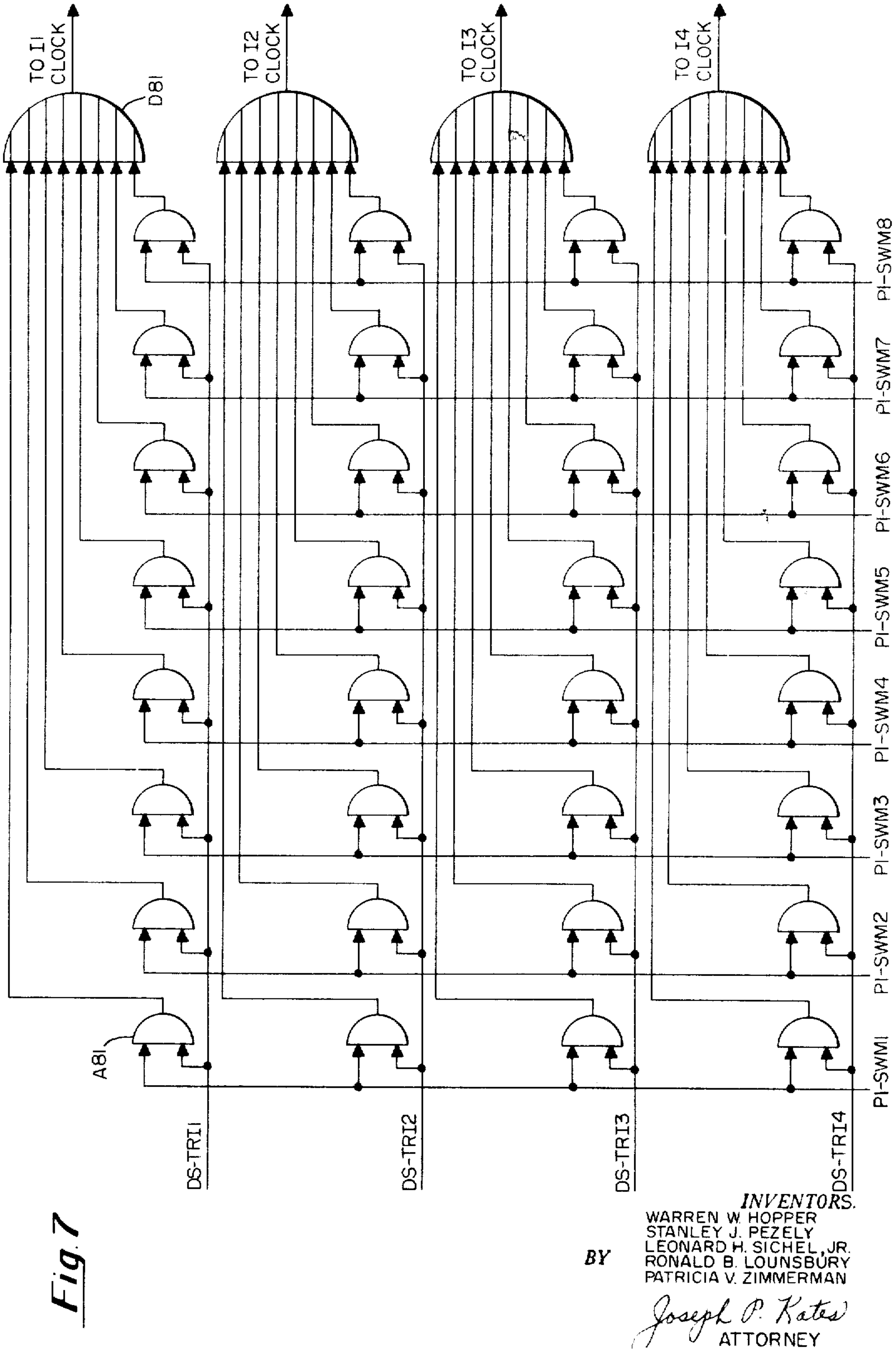
Figure 8A:
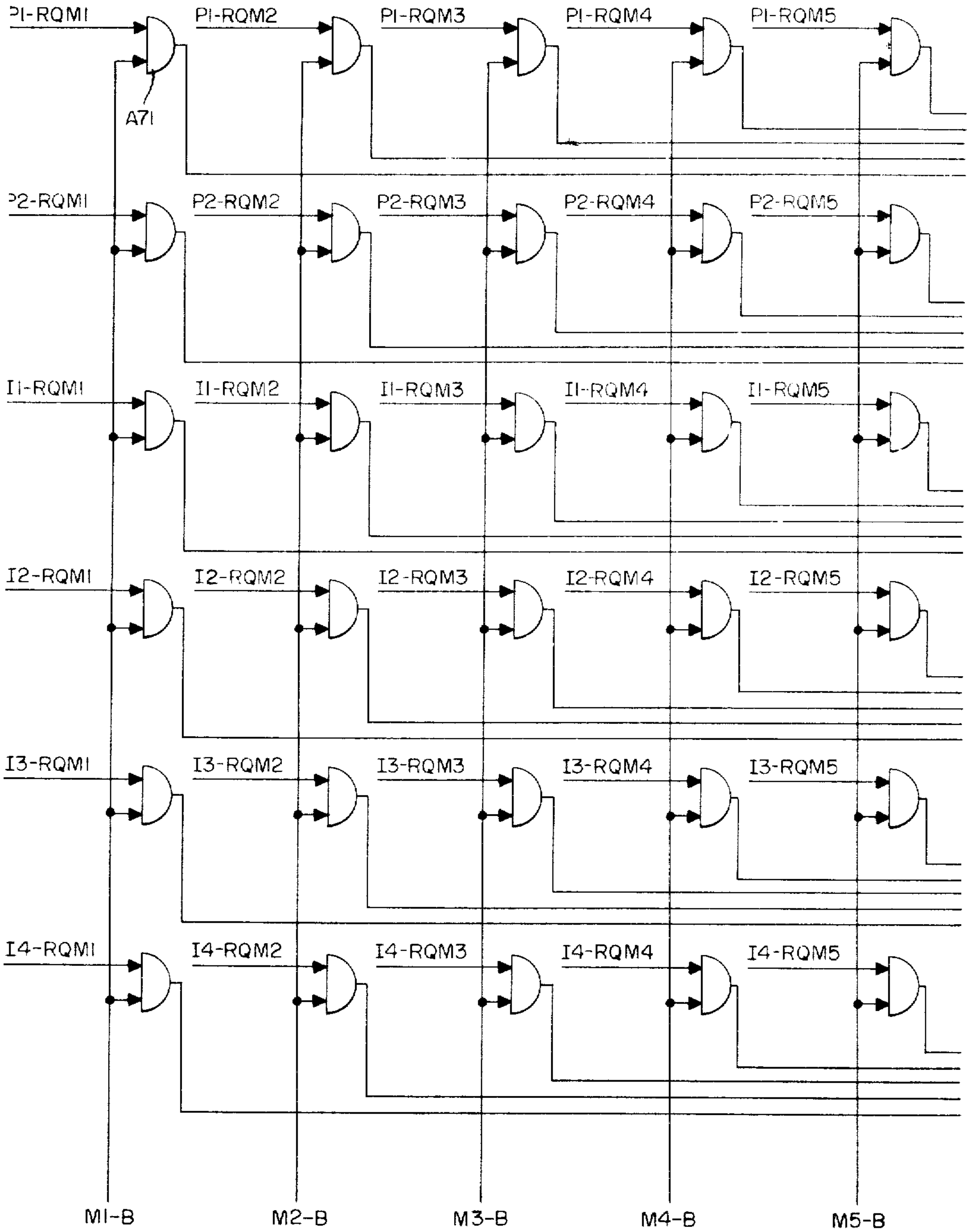
Figure 8:
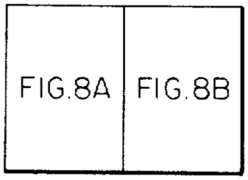
Figure 8B:
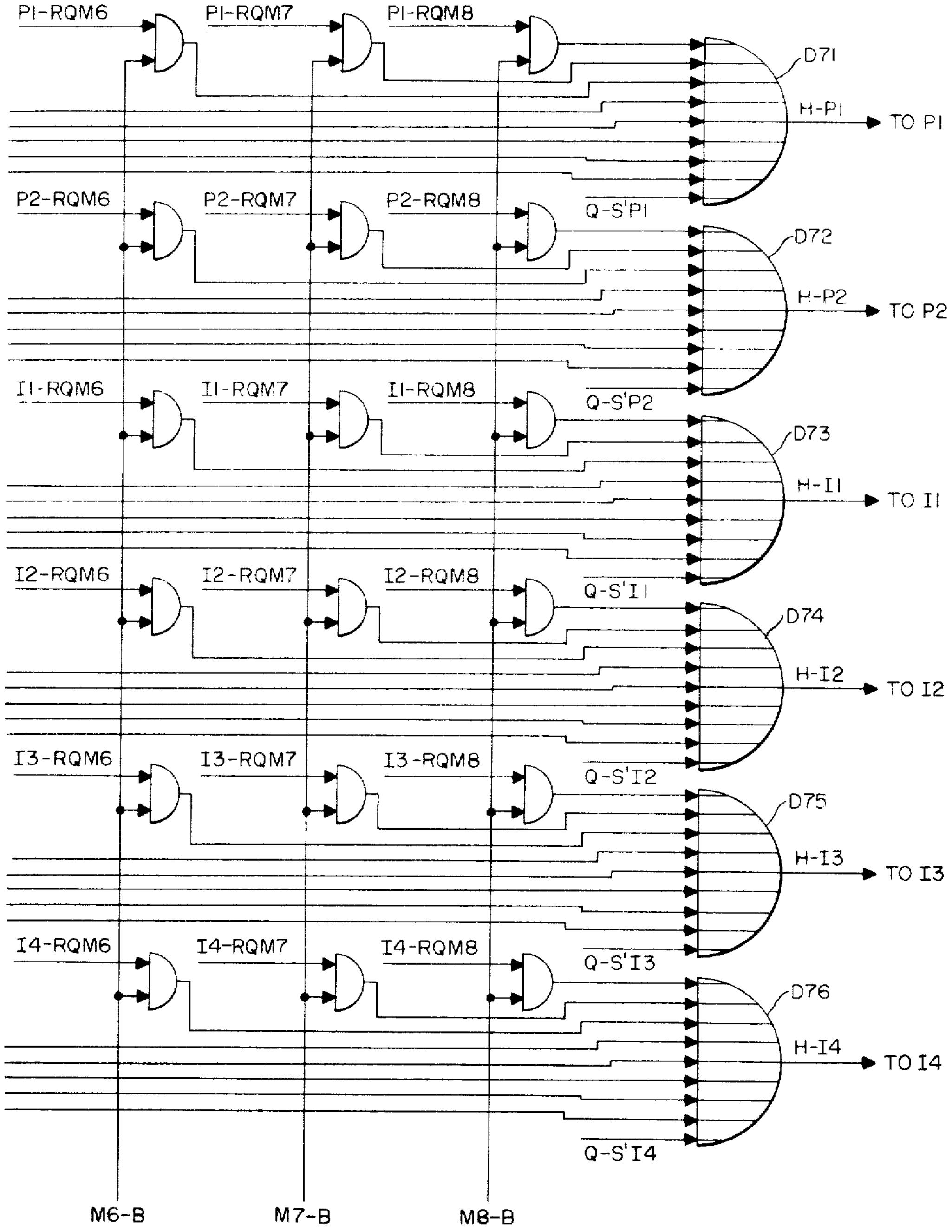
Figure 9B:
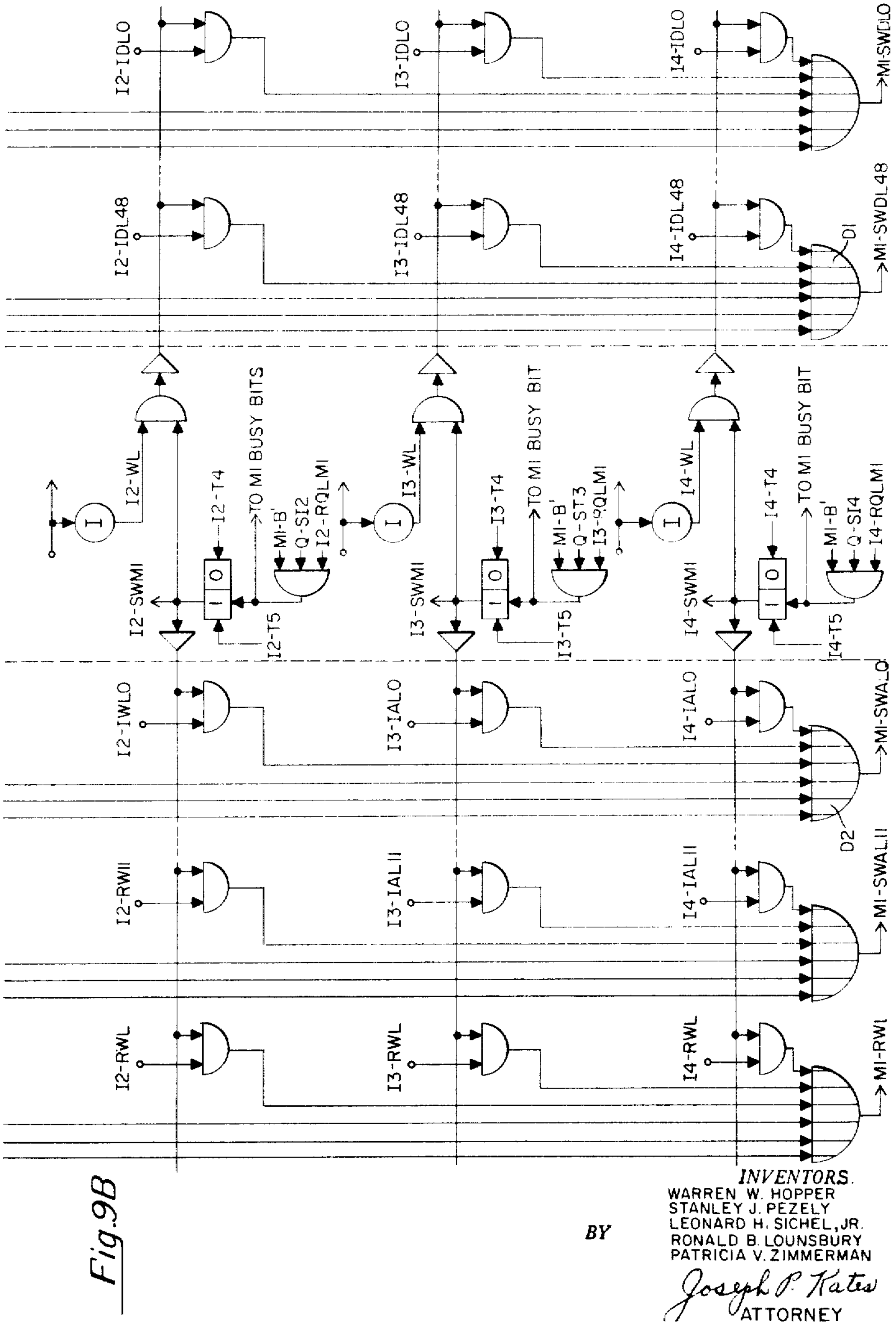
Figure 10:
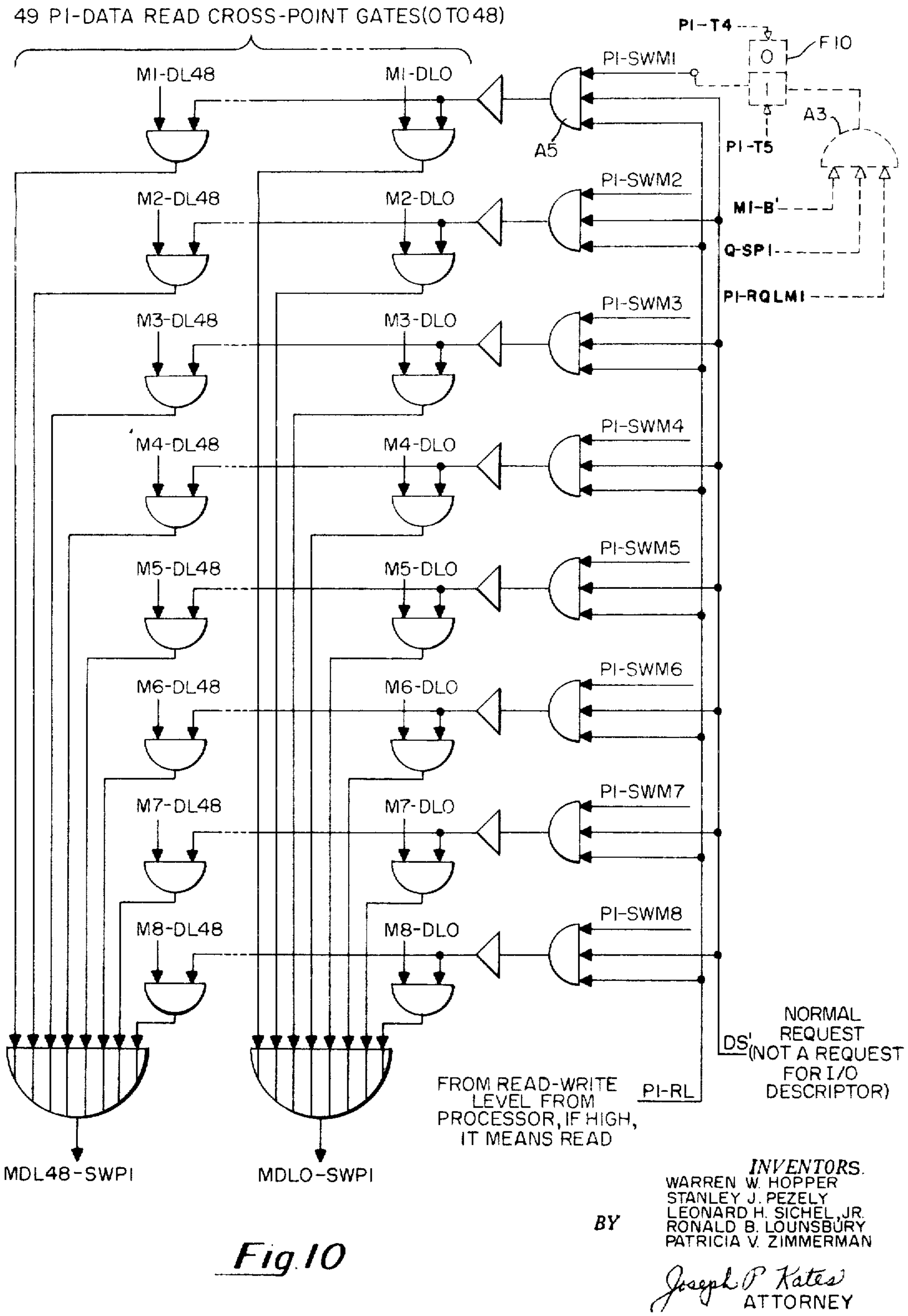
Figure 11:
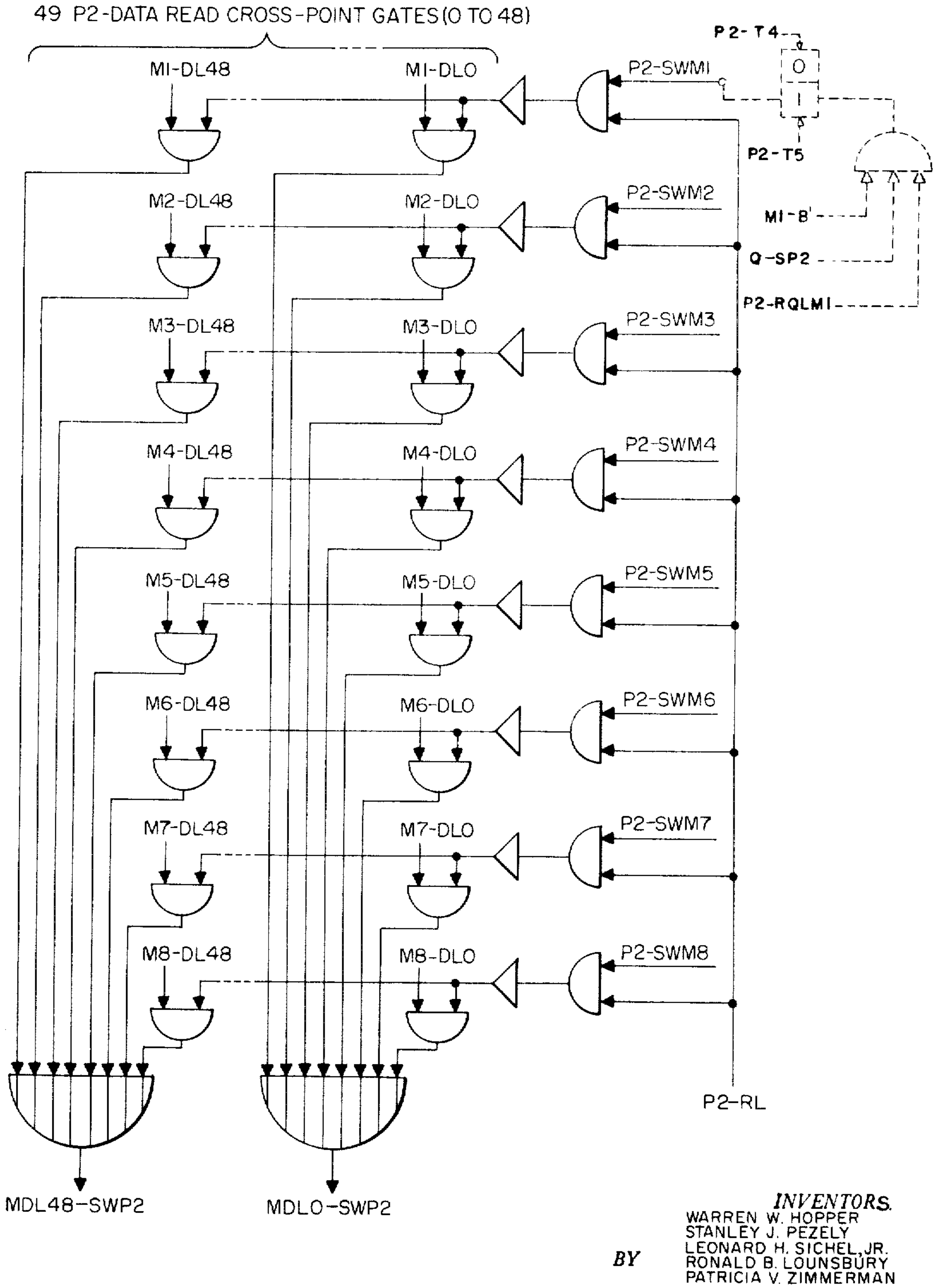
Figure 12:
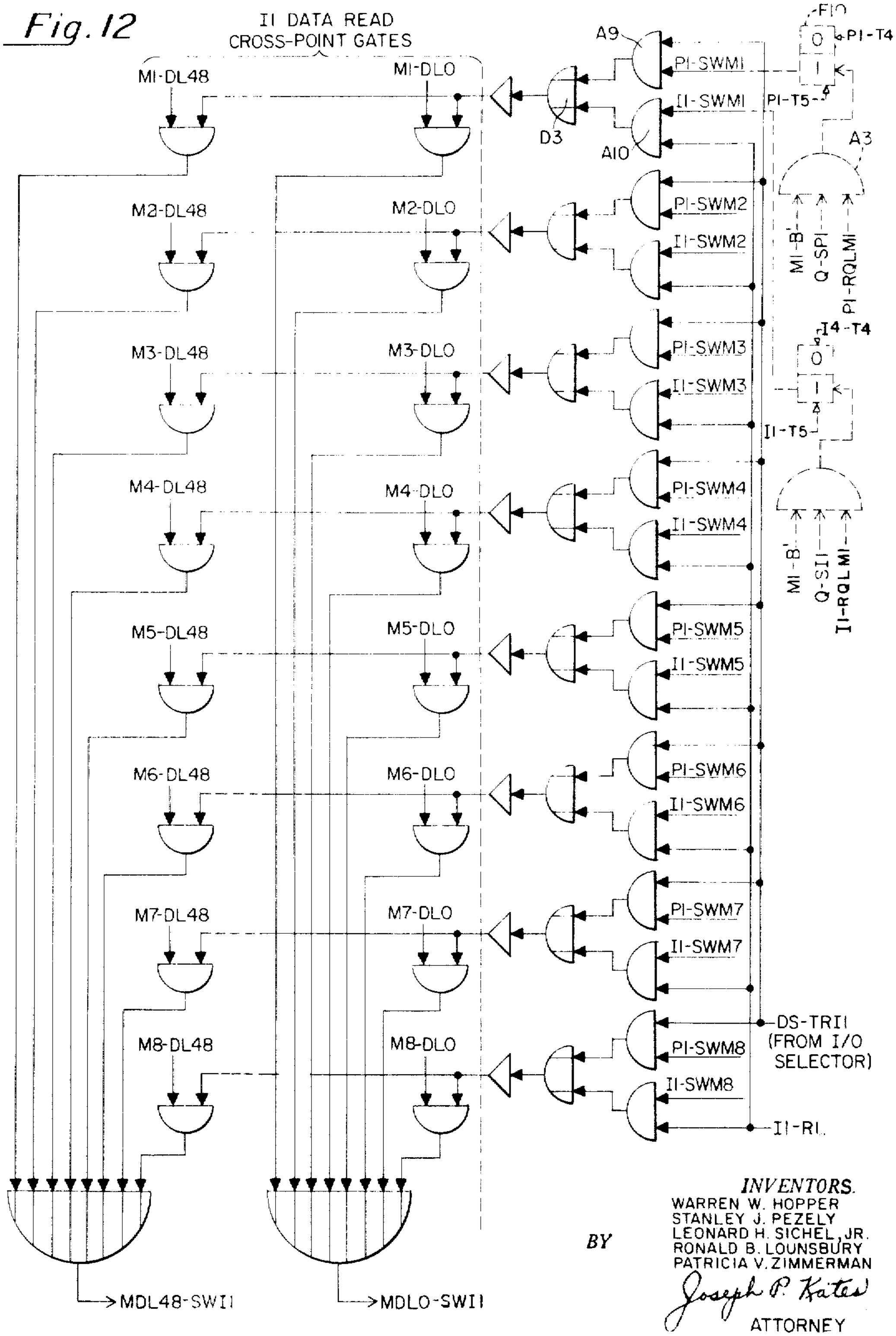
Figure 13A:
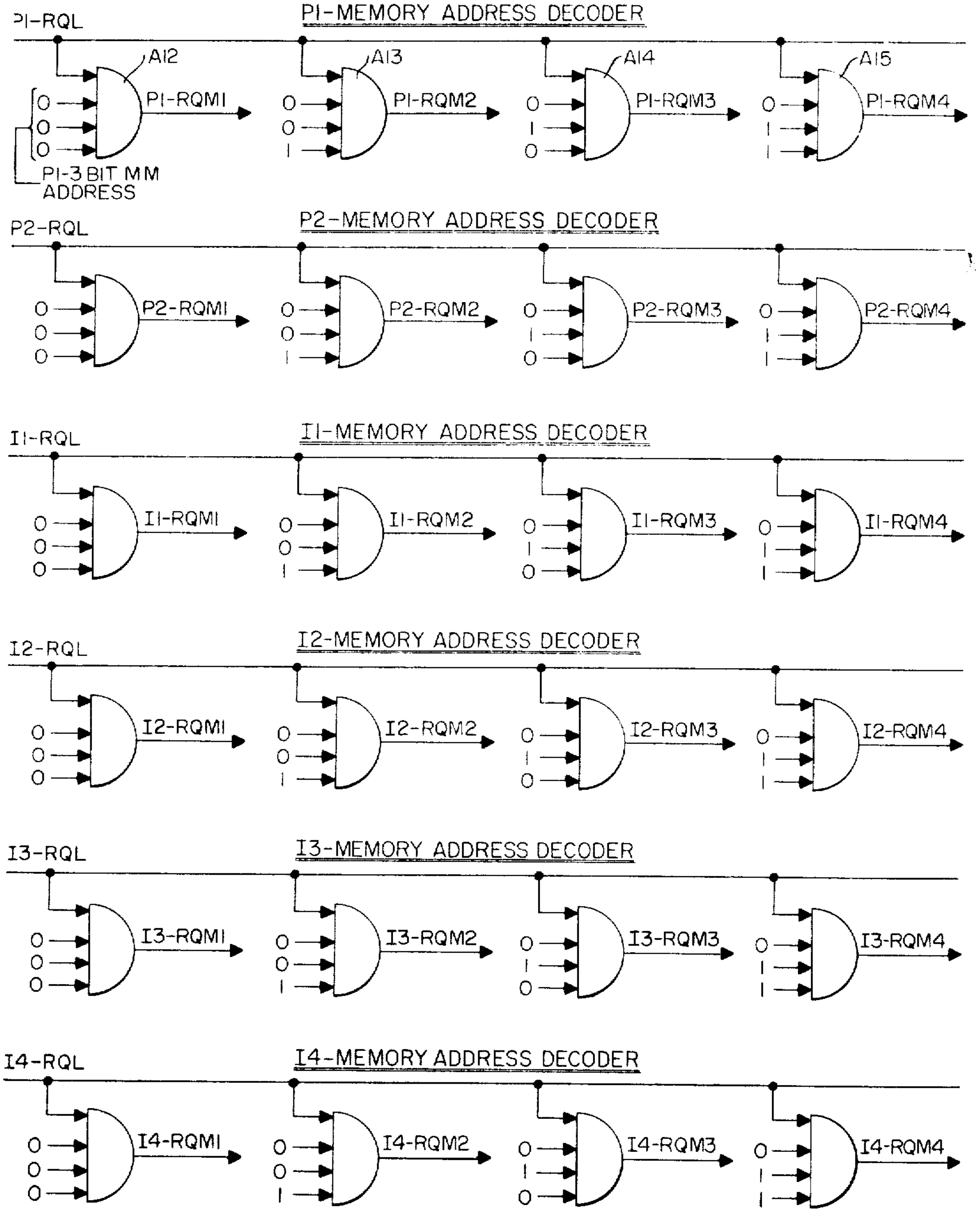
Figure 13:
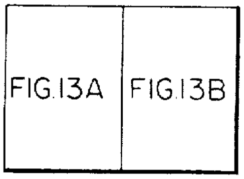
Figure 13B:
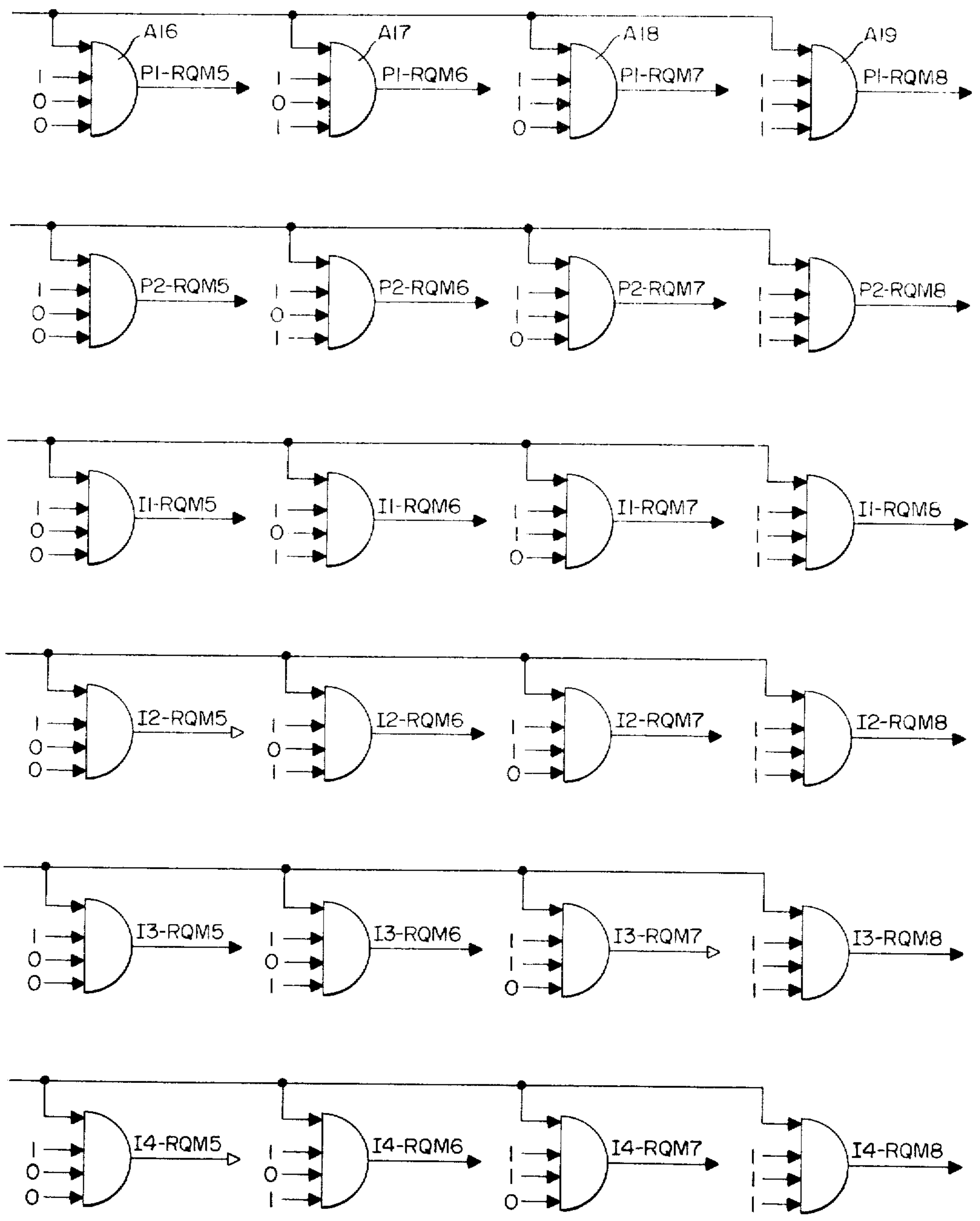
Figure 18:
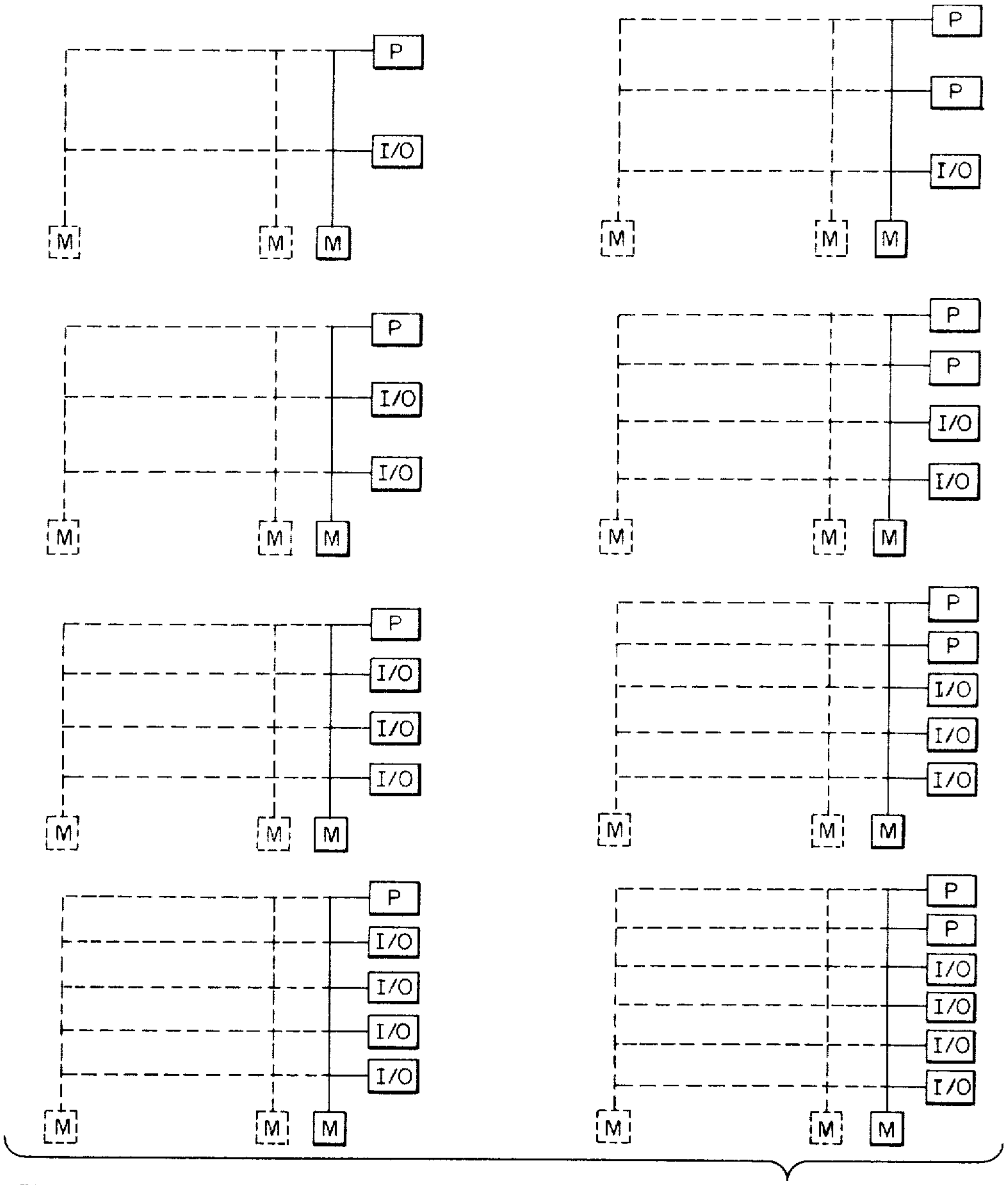
Figure 16:
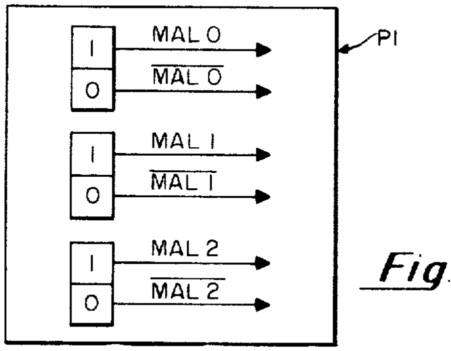
Figure 17:
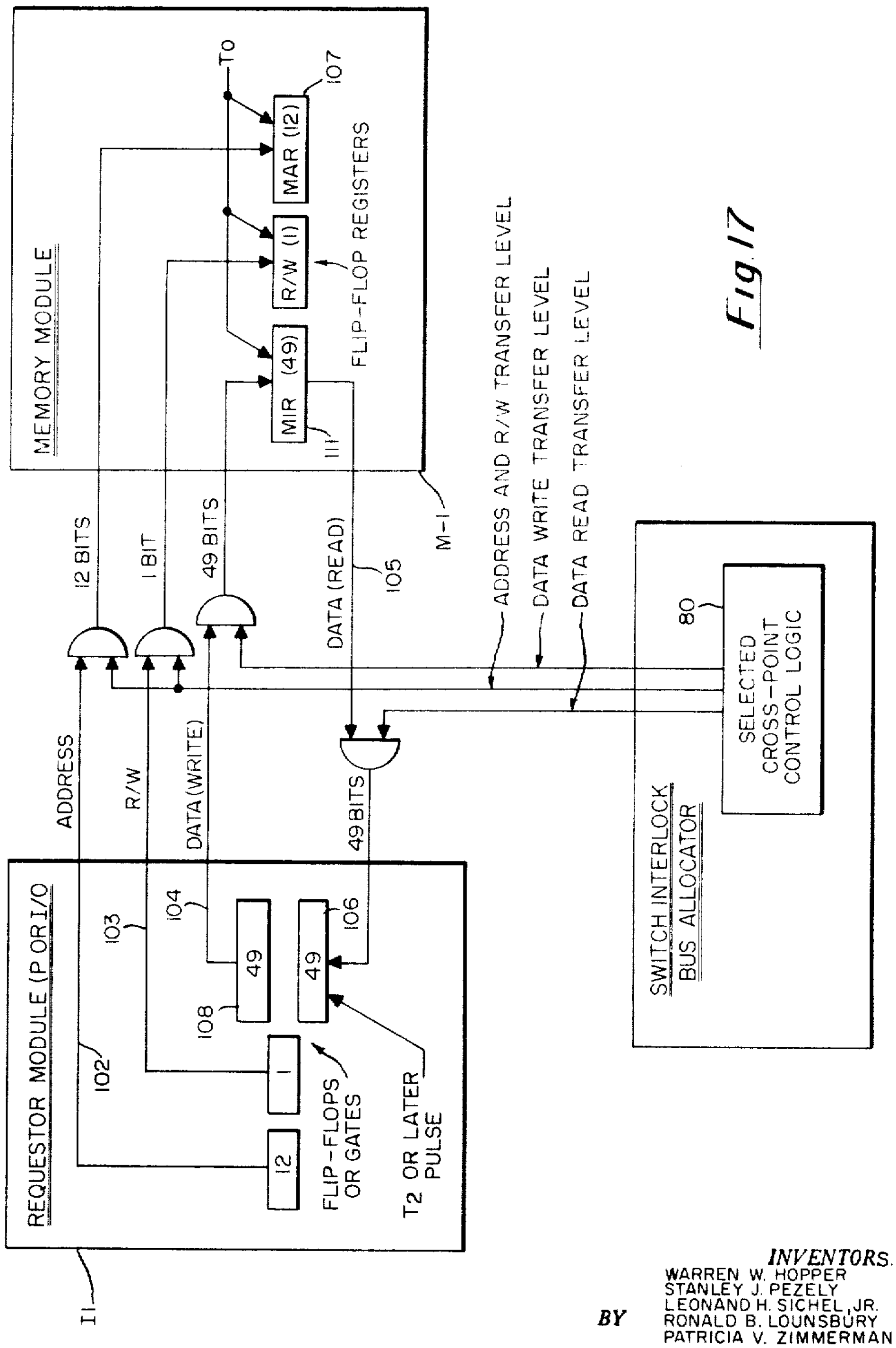
Figure 19A:
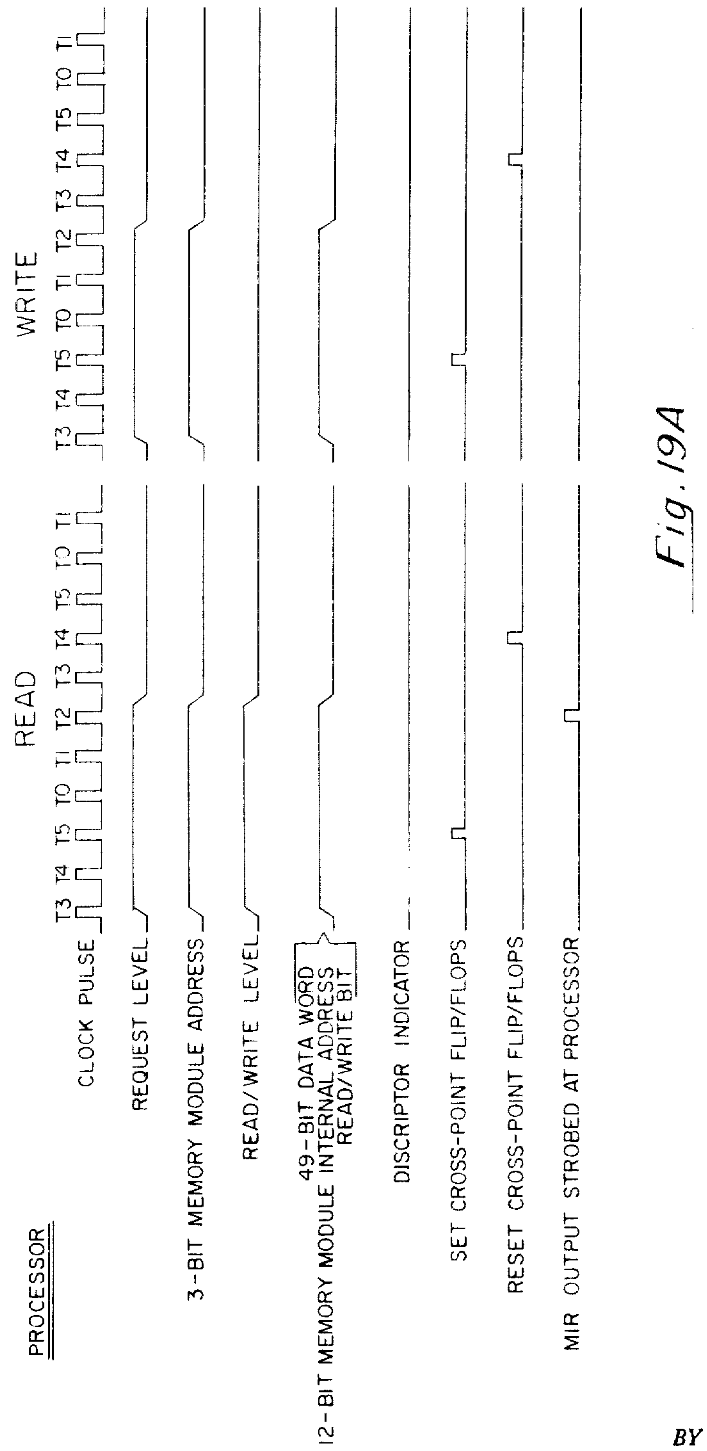
Figure 19B:
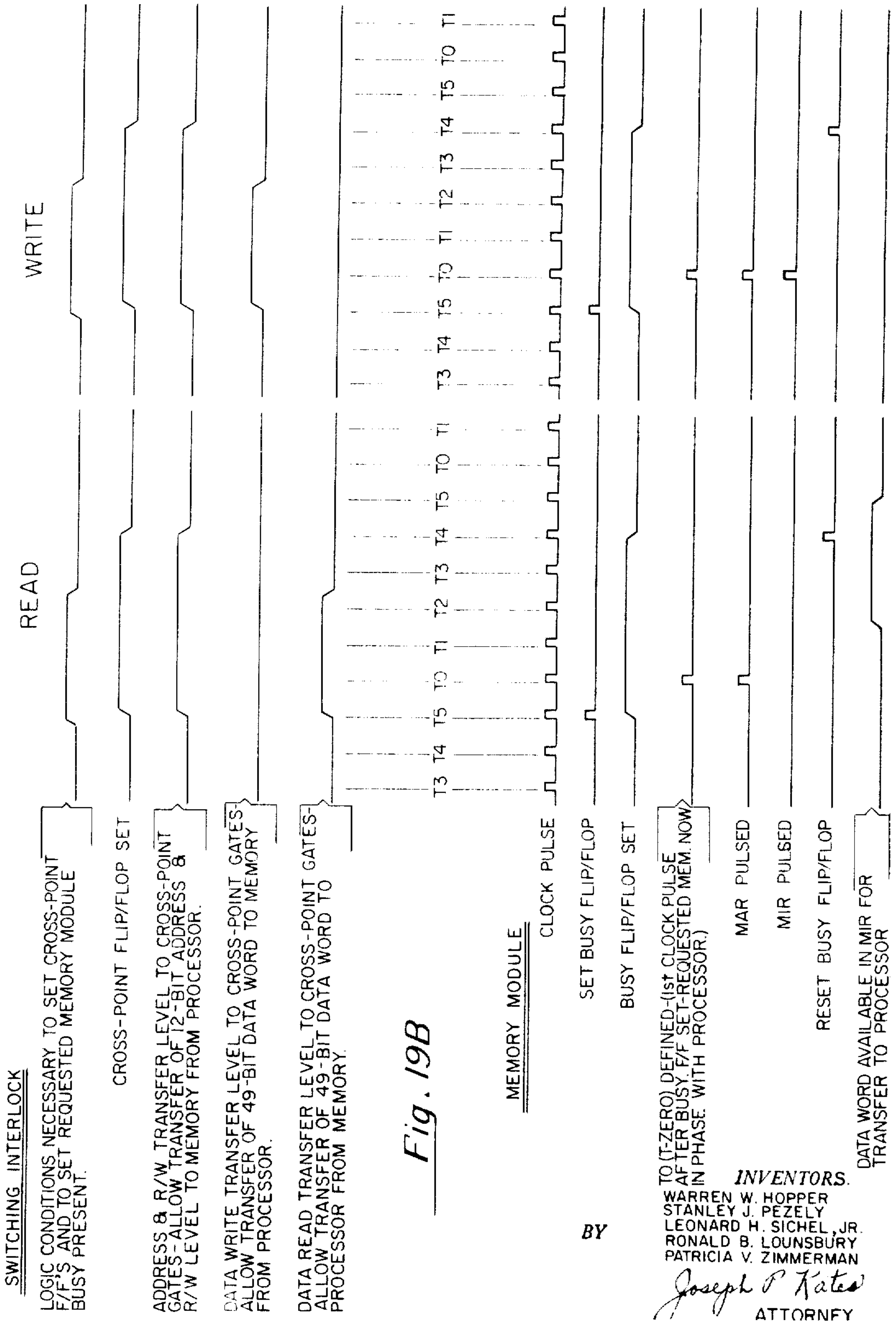
Figure 20A:
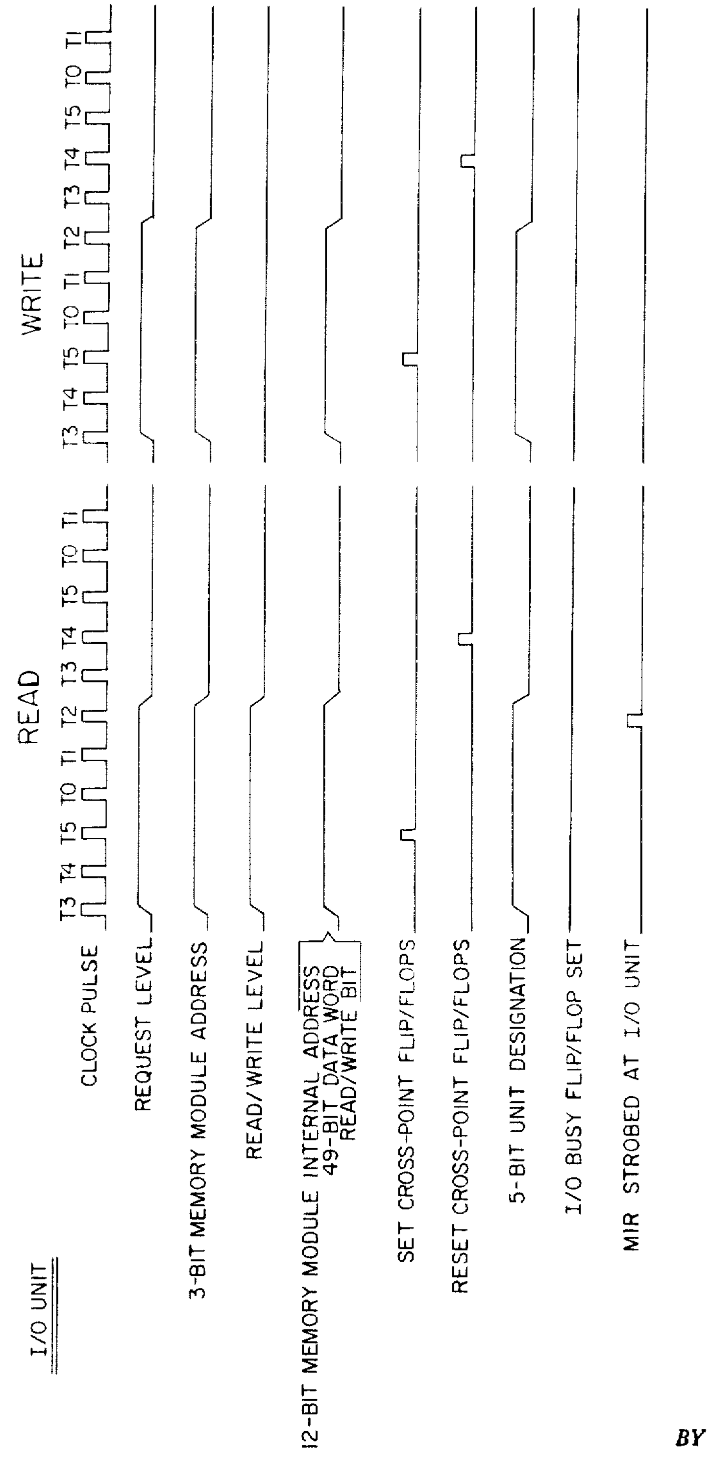
Figure 20B:
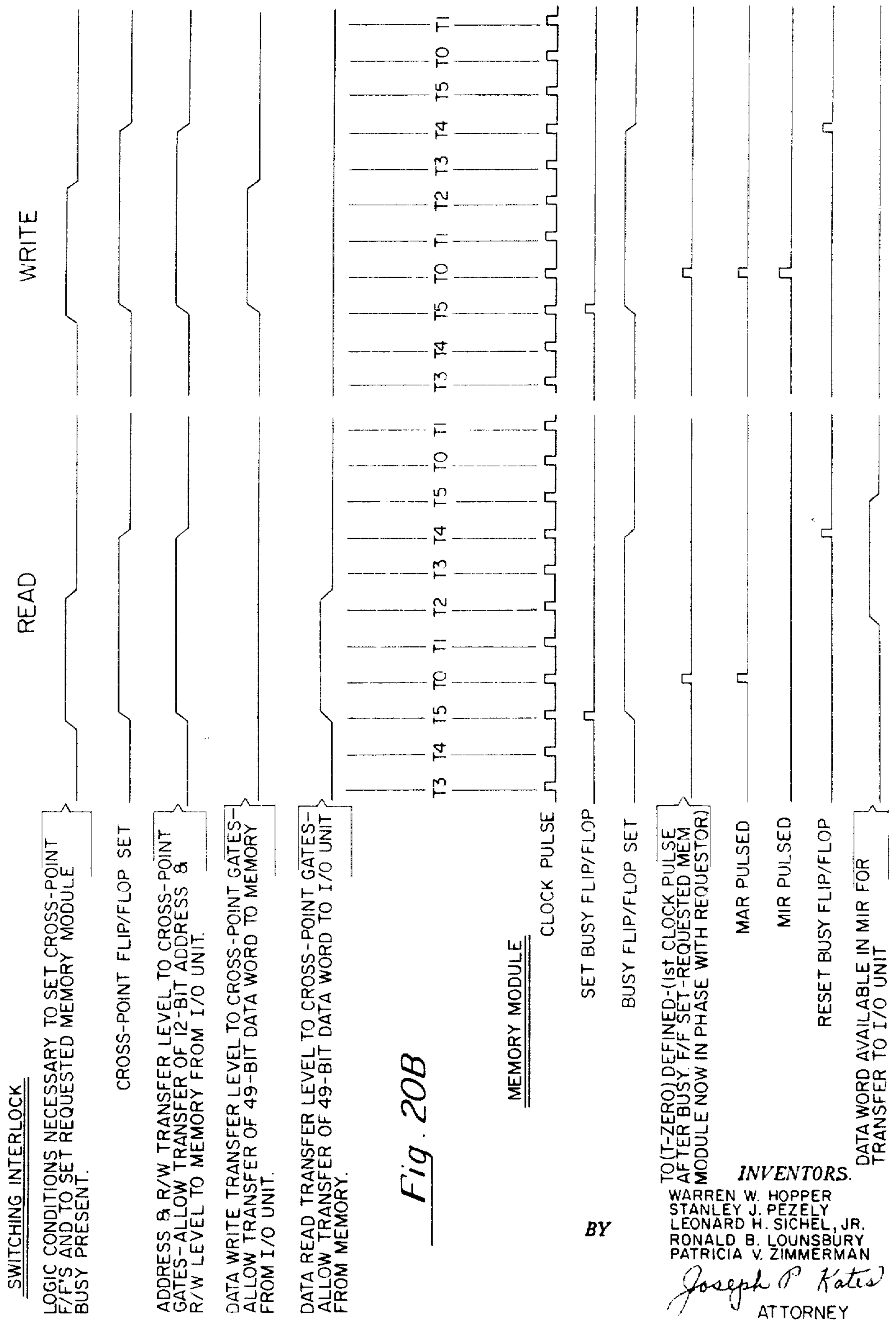
Figure 25:
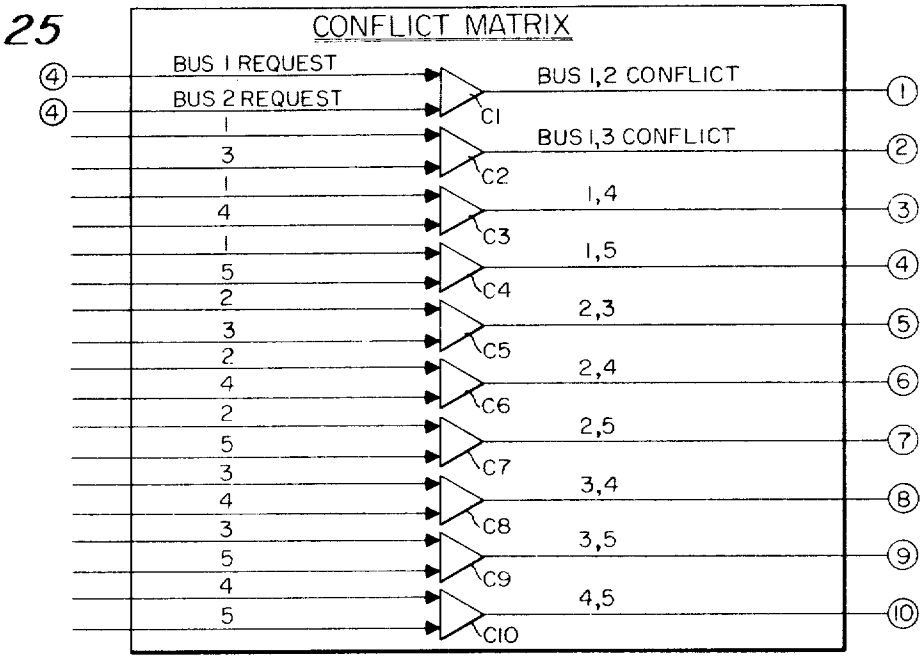
Figure 26:
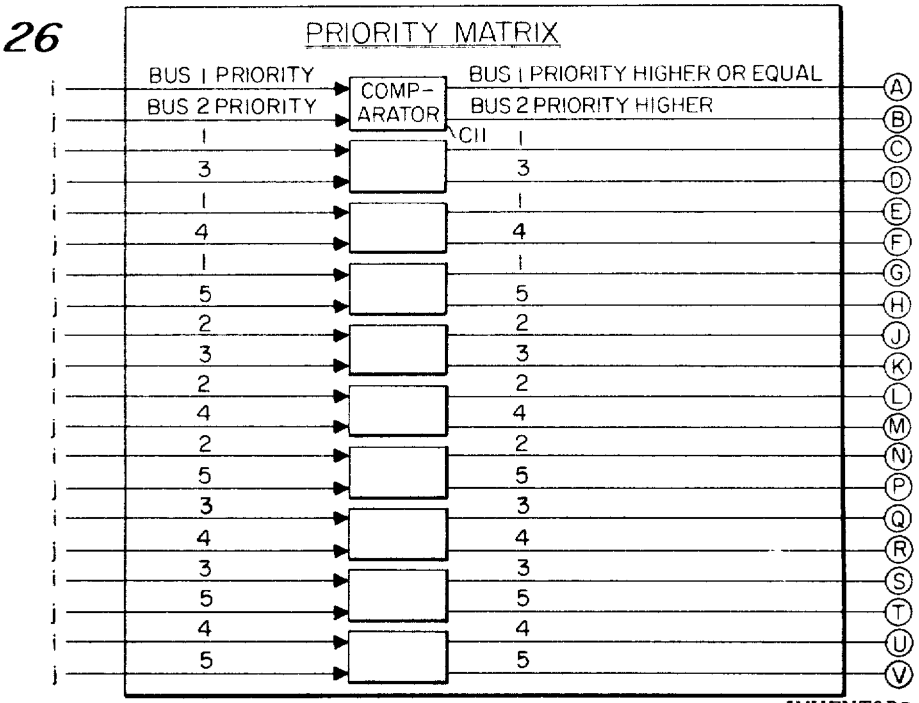
Figure 27:
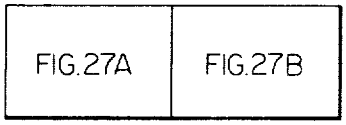
Figure 27A:
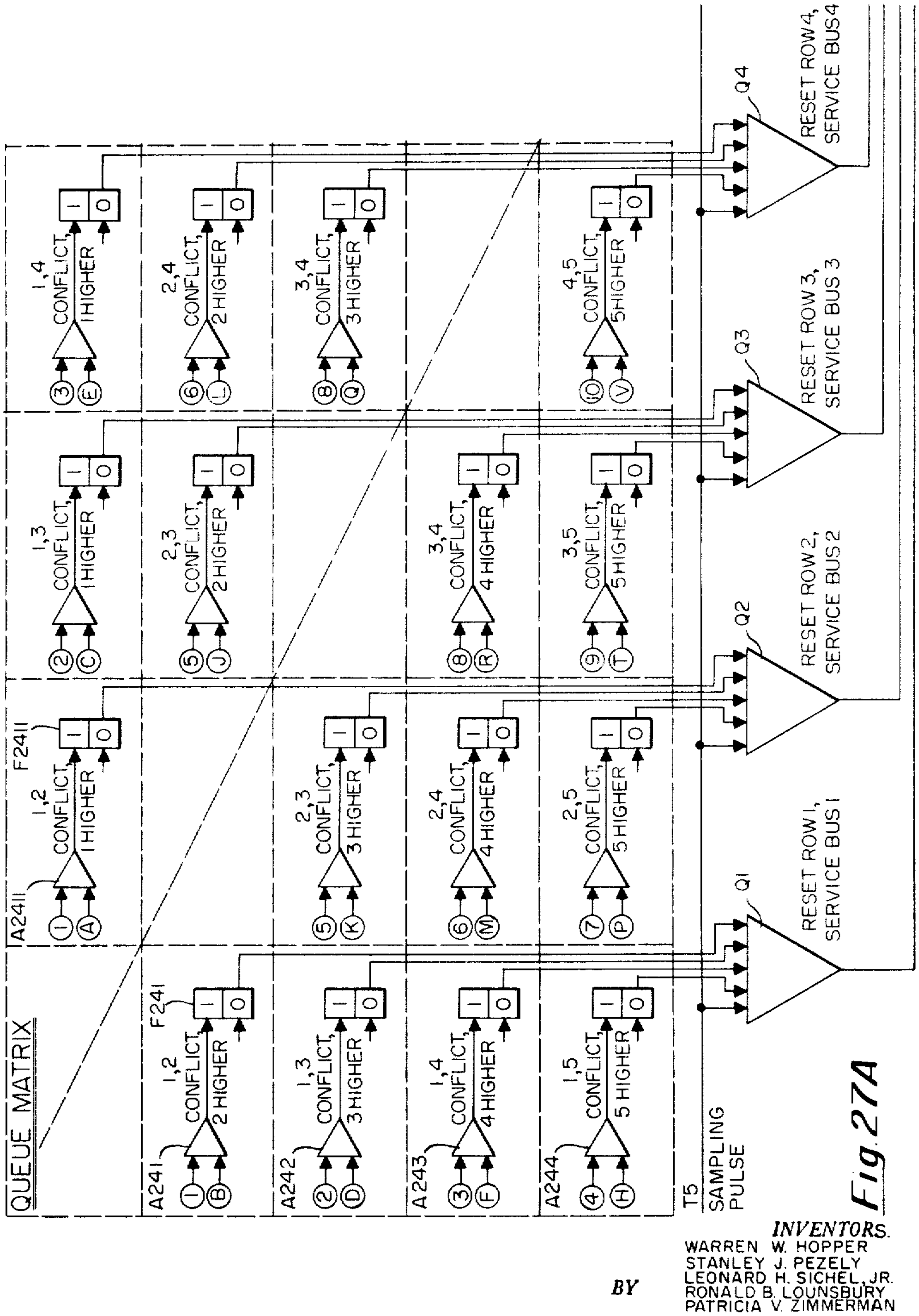
Figure 27B:
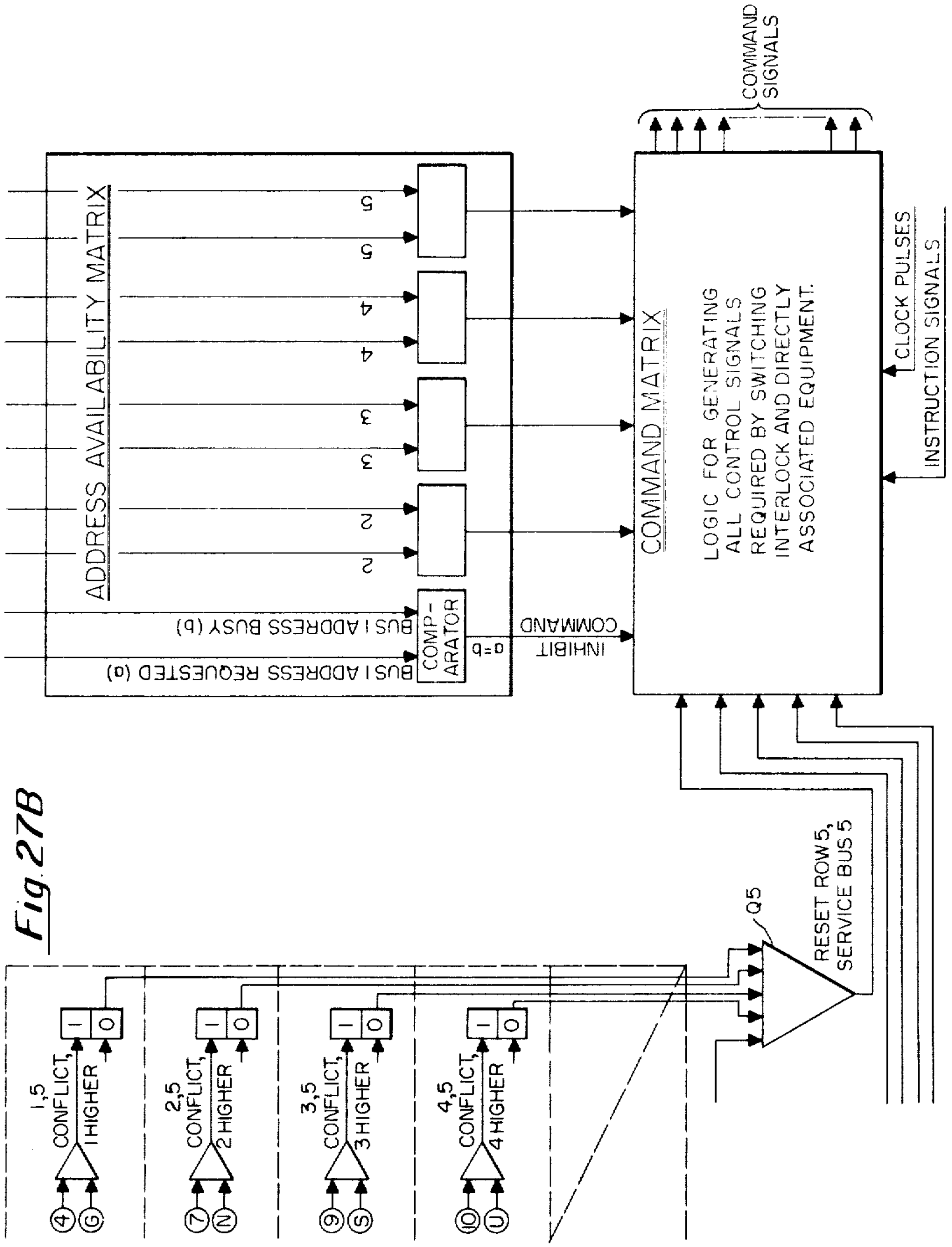
Figures 28, 28A:
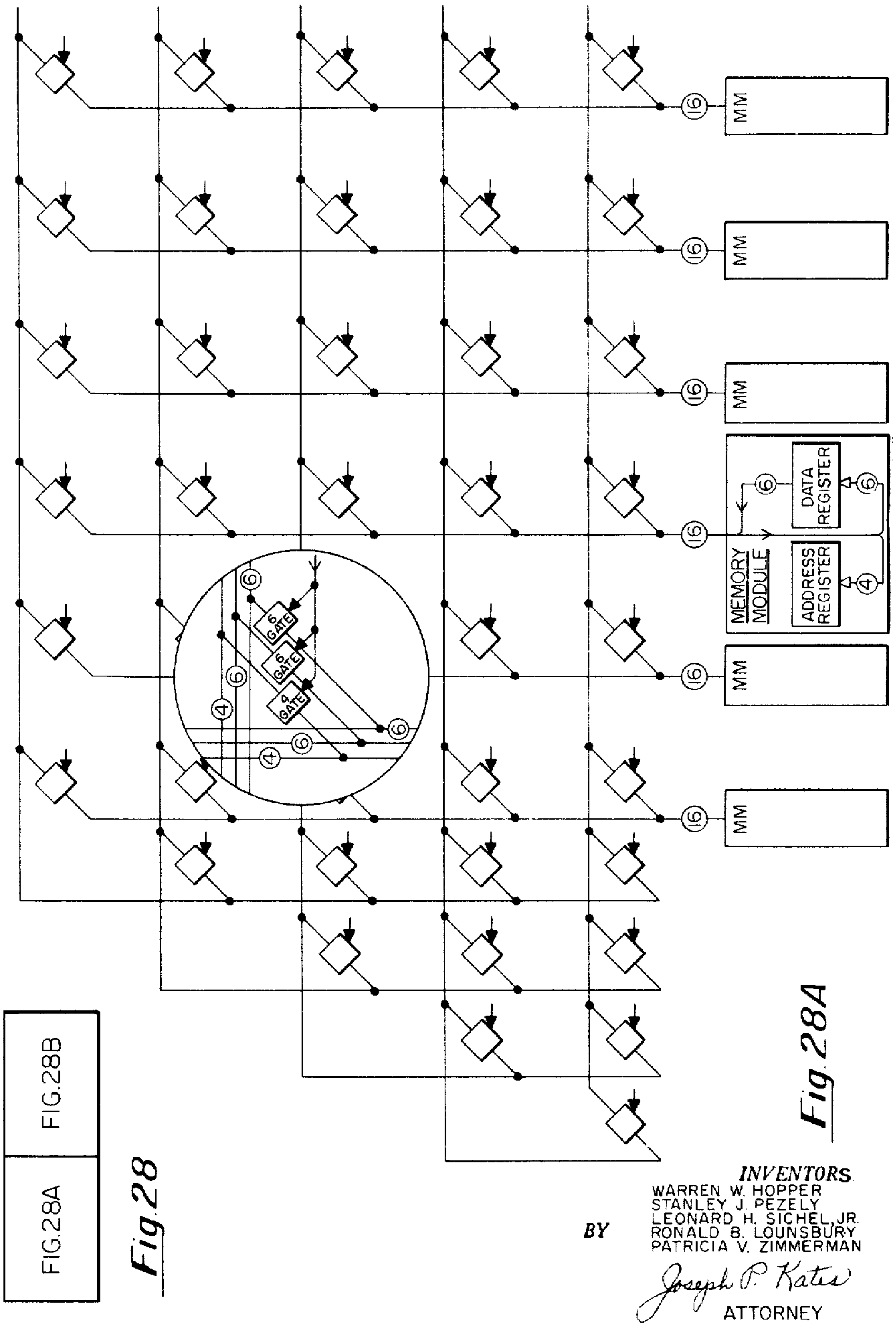
Figure 28B:
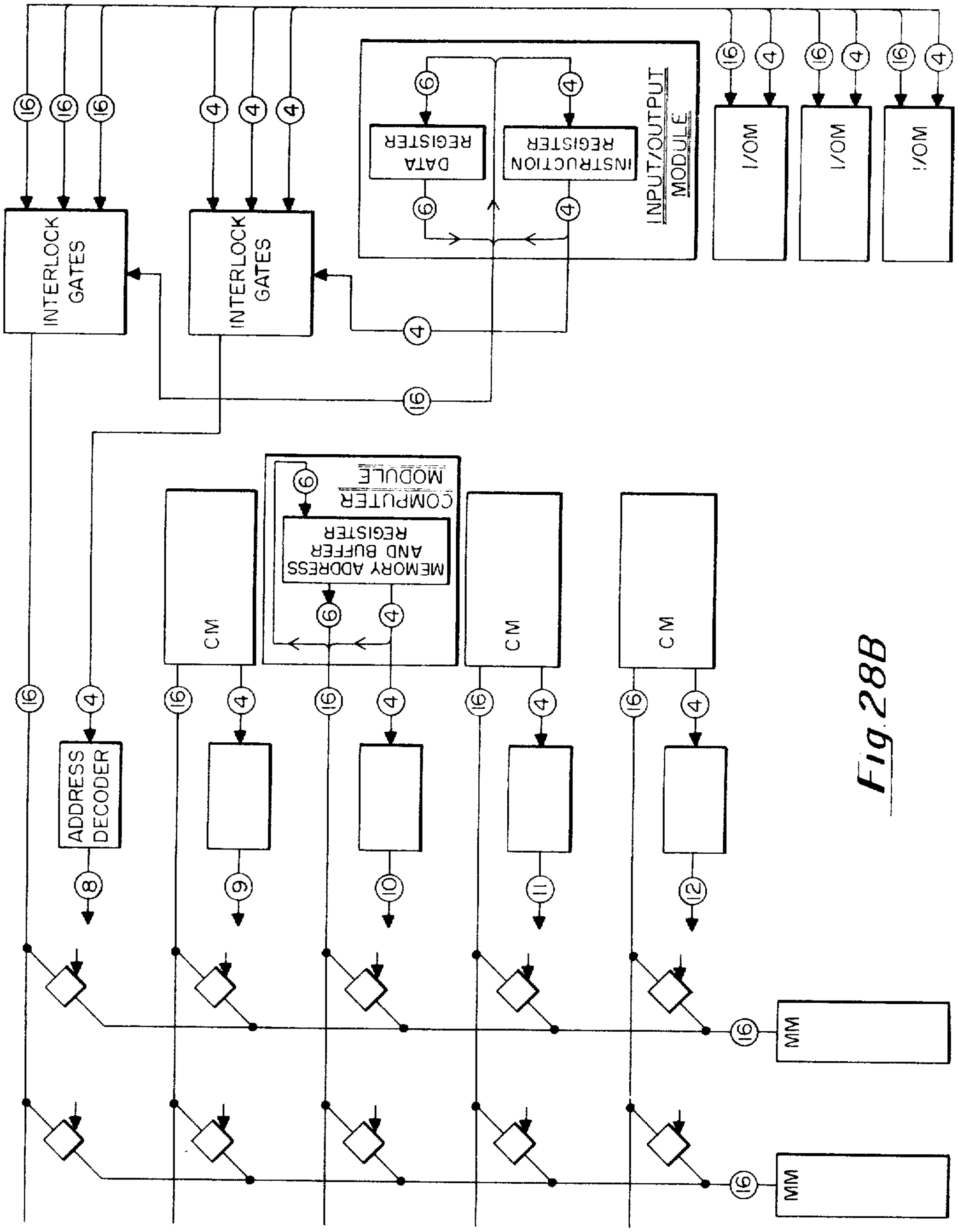

FIGS. 4A, 4B, 4C, 4D, 4E and 4F comprise the logic diagram of the input-output priority resolver of the system of FIGS. 1 and 2 illustrating logic for each possible case of connection to input-output circuits in each possible instantaneous conflict between input-output control units;

FIG. 5 is a logic diagram of the queue matrix of the embodiment of FIGS. 1 and 2;

FIG. 6 is a logic diagram of the input-output selector unit of the embodiment of FIGS. 1 and 2;

FIG. 7 is a logic diagram of the input-output synchronizer of the embodiment of FIGS. 1 and 2;

FIG. 8 and its constituents comprising FIGS. 8A and 8B as shown in the block representation is a logic diagram of the hold matrix of the system of FIGS. 1 and 2;

FIG. 9 and its constituents comprising FIGS. 9A and 9B assembled as shown in the block representation, is a logical diagram of the cross-point control circuits of the system of FIGS. 1 and 2 illustrating address, read-write, cross-point and data write transfer control gates and circuits in the cross-point gates involved in communications between each of the requestors and the first memory module to illustrate exemplary cross-point control of transfer between requestors and each of the memory modules;

FIG. 10 is a logical diagrammatic representation of the processor 1 data read transfer control gating circuitry in the cross-point control subsystem of the system of FIGS. 1 and 2;

FIG. 11 is a logical diagram of the second processor (P2), data read transfer control gating circuitry of the cross-point control subsystem of the embodiment of FIGS. 1 and 2;

FIG. 12 is a logical diagrammatic representation of the data read transfer control gating circuitry for transfer between the first input-output module and the first memory module in the cross-point control subsystem of the system of FIGS. 1 and 2 to illustrate exemplary cross-point control of transfer between each of the input-output control units and each of the memory modules;

FIG. 13 and its constituents comprising FIGS. 13A and 13B, assembled as shown in the block representation, is a logical diagram of the memory address decoder for each requestor unit of the system of FIGS. 1 and 2;

FIG. 14 is a block representation showing the master clock, first processor (P1) clock and memory module number one clock to illustrate distribution representative of that between requestor units, each of which has a clock running at the same frequency as the master clock and which, upon communication between units, becomes synchronized in phase by the inventive logical system;

FIG. 15 is a tabular representation of binary levels for the least two significant bits of the address of corresponding input-output units to which the input-output control units are connected in the illustrative embodiment of FIGS. 1 and 2 and are exemplary of resulting level inputs into the gates of FIGS. 4A, 4B, 4C, 4D, 4E, 4F;

FIG. 16 is a logical representation of an illustrative three-bit memory module address which is sent from a requestor to the conflict decoder and to the requestor module memory address decoder in the bus allocator subsystem shown in FIG. 2;

FIG. 17 is a flow diagram of the switch interlock bus allocator control logic and the transfer paths through one cross-point schematically illustrating the effecting means and the sequence of functional operations which occur when a request is initiated by a requestor module (processor or input-output module) to a memory module to transfer information therebetween;

FIG. 18 is a block diagram illustrative of module processors with various possible combinations of requestor modules and memory modules in accordance with requirements of users and shows how the inventive system is capable of ready expansibility with increasing data processing requirements;

FIGS. 19A and 19B, taken together in vertical tandem arrangement, are graphical charts, FIG. 19A showing the timing diagram for read-write operations of the processor module and FIG. 19B showing read-write operations of the memory module and the timing of the switching interlock corresponding to read-write operations of a processor and of a memory module;

FIGS. 20A and 20B taken together in vertical tandem arrangement, are graphical charts, FIG. 20A showing the timing diagram for read-write operations of the input-output control unit and FIG. 20B showing read-write operations of the memory module and the timing of the switching interlock corresponding to read-write operations of an input-output control unit and of a memory module;

FIGS. 21A, 21B, 21C and 21D taken together in vertical tandem arrangement, constitute graphical charts and the timing diagram for the processor, switching interlock memory module and selected input-output control units when an input-output descriptor transfer request is initiated in the illustrative embodiment system of FIGS. 1 and 2;

FIG. 22 is a block diagram illustrative of system organization in a second illustrative embodiment of the module processor of the invention;

FIGS. 23A, 23B and 23C represent corresponding conflicts, priority and queue matrix configurations to illustrate an example of conflict resolution in the five-bus system of FIG. 22 wherein:

FIG. 23A is a graphical representation illustrative of the conflict matrix where conflict occurs between busses 1 and 2; and among busses 3, 4 and 5 in the system of FIG. 22;

FIG. 23B is a graphical representation of the priority matrix illustrative of precedence in a priority sequence of busses 3, 2, 1, 4, 5 in the system of FIG. 22;

FIG. 23C is a graphical representation of the queue matrix illustrating the place in the queue of busses to be serviced when a conflict has been determined and priority resolved in the system of FIG. 22;

FIG. 24 is a graphical representation of intersection of matrices in the second illustrative embodiment switch interlock system of FIG. 22;

FIG. 25 is a logical diagram of the conflict matrix of the illustrative embodiment system of FIG. 22;

FIG. 26 is a logical diagram of the priority matrix of the illustrative embodiment system of FIG. 22;

FIG. 27 and its constituents comprising FIGS. 27A and 27B taken together, represents a logical diagram of the queue matrix of the illustrative embodiment system of FIG. 22 and shows additional tie-in with the command matrix and address availability matrix of that system;

FIG. 28 and its constituents comprising FIGS. 28A and 28B taken together presents a logical representation, of the switching interlock cross-point switch of the system of FIG. 22 a portion of the figure being cut away and enlarged for purposes of clarity of presentation.

Referring to FIGS. 1 and 2 wherein is shown a preferred embodiment of the modular processor and the incorporated switching interlock system of the present invention, a first and a second processor unit P1 and P2 are provided which in the embodiment are computers. A plurality of input-output modules, I1, I2, I3 and I4 are incorporated and the two processing units P1 and P2 and the four input-output control units I1, I2, I3 and I4 constitute the requesting modules. Eight memory modules, M1, M2, M3, M4, M5, M6, M7, and M8 are provided and enable the memory to be shared by the requestor modules in addition to the other advantages of modular construction.

Responsive to each of the requesting modules is a corresponding memory address decoder 31, 32, 33, 34, 35 and 36, respectively. The processor 1 memory address decoder 31 is responsive to a three bit memory module address, and a request level signal emanating from processor P1. The processor 2 memory address decoder 32 is responsive to the three bit memory module address and the request level signal from processor P2. Similarly, the respective input-output control units I1 through I4 inclusive have corresponding memory address decoders 33, 34, 35 and 36 which are respectively responsive to three bit memory module addresses and to request level signals from respective input-output control units I1, I2, I3 and I4. Each of the three bit memory module address lines disposed between the requestor module on one side and the respective memory address decoder into which it is fed in actuality comprises six lines, the six lines representing the two states of the three bits of the memory module address.

Referring to FIG. 16 wherein the flip flops of the processor P1 are shown, the six lines of the three bit module address lying between processor P1 and P1 memory address decoder 31 are shown, for example, and designated respectively MAL0 to represent the memory address level zero present and not present respectively, the latter being designated on the figure by the letters $\overline{\mathbf{MAL0}}$. In the example shown in FIG. 16 the high output on the three output taps indicates addressing of a predetermined memory corresponding to the code 1–1–1. This could be memory module 8, for example. In FIG. 2 the numbers represented inside of the circles, for example, ⑥, ①, ⑮, ⑫, ④, ⑧, ㊽, ㊱, represent the number of signals (signal channels) between the respective units. For example, the number "6" in the circle in the three bit memory module address from processor P1 represents that there are six (6) wires leading from processor P1 to memory address decoder 31 for this output. Each of the request level signals disposed between the requesting unit P1, P2, I1, I2, I3 and I4 respectively and their respective memory address decoders 31, 32, 33, 34, 35 and 36 is conveyed on a single wire on which is impressed either a high or a low level signal, the high denoting that a particular unit is requesting. In general, except for one case to be discussed hereinafter, in the representative system a high signal means that a request is being effected.

In order to detect conflicts when any two or more of the requesting modules address the same memory module, a conflict detector 40 determines this condition.

As a result of this determination and in accordance with a system of priorities which is responsive to a plurality of input and output units such as magnetic drums, magnetic tapes and other input and output units to which at the time an input-output control module is connected (see FIG. 1) and also in accordance with predetermined priorities of requestor modules which in the illustrative embodiment shown, are that input-output modules have priority over processor P1 which in turn has priority over processor P2, an input-output control unit priority resolver 50 resolves priorities among these requestor modules, the input/output priority resolver 50, resolving priority among input/output control modules in accordance with an order of priority among input and output modules, and where any input and output control module is accordingly trying to request a memory module, this having priority over processor P1 requests, which in turn have priority over processor P2 requests. The data provided by the input-output priority resolver 50 and the data informing of conflict between requesting units addressing the same memory module which are resolved in conflict detector 40 are fed to queue matrix 60. The queue matrix 60 permits the request to be processed which has the highest priority of any which are in conflict, and causes holding in order of priority of all requests of lower priority than that which is highest.

As shown in FIG. 2, the three bit module memory address (see FIG. 16) which emanates from each of the requestors P1, P2, I1, I2, I3 or I4 toward the memory address decoders 31, 32, 33, 34, 35, 36 is fed also into the conflict detector unit 40. Since from each of the six requesting units, there are six lines emanating, then 6 times 6 or 36 lines carry addresses to the memory modules from the requestors into the conflict detector, six from each processing unit.

The cross-point control unit 80 is responsive to the output of the queue matrix 60. The output of queue matrix 60 is fed to the cross-point control unit 80 along six lines each line of which represents a function of selection of one of the requesting modules. Simultaneously as will be described in greater detail in the description of FIG. 5, where conflicts appear the inverse functions are fed from queue matrix 60 along six lines to the hold matrix unit 70. Hold matrix 70 effects the function of holding the requests by means which may comprise suitable indicators in those requestor modules which are in conflict to obtain access to a designated memory module where priority is not resolved in favor of these requesting modules.

In addition to the six inputs fed from the queue matrix 60 into the hold matrix 70 which causes the hold function to be effected whenever the appropriate requesting module has not been selected in the queue matrix 60 for priority, 48 inputs are provided comprising eight inputs from each of the respective memory address decoding units 31, 32, 33, 34, 35, and 36 from which an output is provided by a request from one of the requesting modules P1, P2, I1, I2, I3 and I4 whose request is conveyed to the corresponding address decoder to address one of the eight memory modules. It is understood, of course, that the eight memory modules, and referring to FIG. 18, six requestor modules, are merely representative of a number which could be used. FIG. 18 illustrates the feature of this invention of expansibility with the user's need in that in the illustrative embodiment various combinations from one to six requestor units with from one to eight memory modules could be utilized. Eight outputs are generated and conveyed to the hold matrix 70 from each of the six memory address decoders 31, 32, 33, 34, 35 and 36. The hold matrix 70 requires an input from the queue matrix 60 and an input from a memory address decoder to provide a hold output along one of the six lines to the hold indicators in the requesting modules. This occurs whenever a request is initiated in conflict with one from another requestor and the indicated request does not have priority to be granted at once.

The hold matrix 70 output indicates a hold function to the hold indicators in the requesting modules whenever the addressed memory modules indicate they are busy. The signal indicating that the module is busy is fed from the eight memory modules along the busy lines 101. In the event of a memory module busy signal, at time $T_4$ in the time cycle corresponding to pulses at times T0 through T5 inclusive the hold signal is introduced into the appropriate requesting module which has addressed that memory. This hold signal holds the operation. FIGS. 19, 20 and 21 illustrate the pulse timing.

Referring also to FIG. 17 which shows the transfer paths through one cross-point, each of the requesting modules P1, P2, I1, I2, I3 and I4, upon initiation of a request, simultaneously initiates a read-write signal along one line from each requestor which signals are presented along line 81 (FIG. 2). These read-write signals are introduced into the cross-point control logic unit 80. In the illustrative embodiment a high level signal along the line 81 indicates the function "read" and a low level signal indicates the function "write." The read-write signal enables the proper gates to allow the desired transfer.

Now refer to the descriptor request portion of the circuit shown in FIG. 2. A descriptor is an instruction sent to a memory indicating to the memory that it send to the first available input-output control module an information word. The recipient input-output control unit uses this word, for example, 49 bits, in the present illustrative embodiment, to execute the desired input-output operation. A descriptor request serves as the only means of communication between the processors and the input-output control units. Shown in FIG. 2 is the channel of communication for initiation of the descriptor requestor between processor P1 (not numbered) and the I/O selector 90 to select the first nonbusy input/output control units I1, I2, I3, or I4 to receive the descriptor word from its location in a memory module. The input/output control module then performs in accordance with this descriptor. In the FIGS. 1 and 2 embodiment, only the first processor P1 has incorporated a means to provide a descriptor request to the input-output control units. Processor P2 is not provided with this means. However, the invention contemplates providing a processor P2 descriptor means if desired.

When a descriptor request is initiated from processor P1 to have a word at a particular address in a memory module transferred to the first available input-output control unit, I1, I2, I3 or I4 and not back to processor P1 as would occur in normal operation, a signal represented by a voltage level is generated in processor P1 and transmitted along the descriptor request line into an input-output control module selector unit 90 which is provided. This unit which is shown in detail in FIG. 6 scans the availability of the input-output control units I1, I2, I3 and I4 and indicates which input-output control unit is available for transmission of the descriptor. As shown in FIG. 6, the busy bit signals I1–B, I2–B, and I3–B from the input-output control units are utilized in making this determination. If no input-output control unit I1, I2, I3 or I4 is available when a descriptor request is initiated, the processor P1 automatically holds until an input-output control unit is available. The FIG. 6 circuit operates to select the lowest numbered available I/O control module when at least one I/O control module is available (not busy). When an available input-output control unit of the units I1, I2, I3 and I4 is selected in the input-output selector 90, a signal is generated to the input-output synchronizer 100 (FIG. 2.) This signal is fed along the appropriate one of the four lines corresponding to the unit selected into the selected input-output control unit to synchronize the selected input-output control unit clock (see FIG. 7) with the requestor processor P1 clock (see FIG. 14) so that the selected input-output control unit will accept information from the memory addressed at the appropriate time. In the illustrative embodiment case, programming causes the selected I/O unit (input-output control unit) to accept the information at time $T_2$ (see FIG. 21D).

Along the appropriate line of system of lines 91, FIG. 2, which comprises four lines between the input-output selector 90 and the cross-point control unit 80, there is impressed the D.-C. level signal corresponding to the selected input-output unit to which the descriptor request is addressed. Along the eight lines in system of lines 82 fed into the synchronizer 100 from the cross-point control 80 are fed the outputs of the respective control flip-flops in the cross-point control 80. FIG. 7 which illustrates the synchronizer for the P1 processor shows this in detail. Only one unit, processor P1, is capable of issuing a descriptor in the illustrative embodiment of the invention as shown in FIG. 2. There is no synchronizer for the processor P2 in this embodiment.

From the cross-point control unit 80 an output is fed to the cross-point gates to control the actual transfer of data to and from the memory modules. A second output goes to the memory busy flip-flops. This sets a mechanism inside a respective memory module in the presence of information transmitted thereto such that it initiates a busy signal output. Thus when the memory module is addressed it simultaneously initiates a busy signal. This occurs at time $T_5$.

In the illustrative embodiment in the designations of these times the memory clock of the addressed memory is controlling. Time T0 is the time at which the memory starts to operate. It is necessary therefore to start at time T4 in order to have information received in the memory at its starting time. Timing is shown in the timing diagrams of FIGS. 19, 20 and 21.

In any operation communication is required between a requesting module P1, P2, I1, I2, I3 or I4 and a memory module M1, M2, M3, M4, M5, M6, M7 or M8. The cross-point control mechanism 80 does not itself pass information. Its function is to control the gates which allow data to be transferred.

Now refer to FIG. 17 which shows the transfer paths through one cross-point. By way of illustration assume transfer of data is required between requestor module I1 and memory module M1. During a write operation the requestor module I1 transmits a 12-bit address along address line 102 through an AND gate to a memory address register 107 in memory module M1. A one-bit read-write level signal is simultaneously transferred into the read-write flip-flop register in memory module M1 along line 103. This signal informs the memory module M1 as to whether the operation required is a read or a write operation. In the illustrative embodiment the read operation is signified by a high-level signal and the write operation by a low-level signal. During a write operation a 49-bit information word is transmitted from register 108 along data write line 104 into the memory information register 111 in the memory module M1. This transfer of data from the requestor module I1 to the memory module M1 can occur only when the cross-point control unit 80 permits it to do so.

In a read operation a 12-bit address is transferred to the memory address register (MAR) 107. The forty-nine (49) bits corresponding to the information word in register 108 in the requestor input-output control module I1 is not transmitted. In this operation the 49 bits in the memory information register 111 are sent through line 105 and the AND gate on this line to be read into the information register 106 in the requestor module I1 at time $T_2$ or at a later pulse.

In the case of a write operation along with the 12 bits sent over the address line 102 into the memory address register 107, the 49-bit word in register 108 in the requestor module I1 is transmitted over the data write line 104 into the memory information register 111. The control gates represented by AND gates in FIG. 17 control the transfer of the address, read-write and data write signals along lines 102 and 103, 104 and 105 between the requestor module I1 and the memory module M1. The purpose of the switching interlock is to control these gates. A description of the cross-point control logic circuits by which these gates are controlled follows:

In conjunction with FIG. 17, and referring to FIGS. 9, 10, 11 and 12, there is shown the logic circuitry involved in cross-point switching control of the functions including address, read-write and data-write transfer control.

In order to execute the functions, the operations effected are listed hereinbelow:

WRITE (1) Transfer 12-bit address
(2) Transfer read-write level
(3) Transfer 49 information bits

READ (1) Transfer 12-bit address
(2) Transfer read-write level
(3) Don't transfer 49 information bits to memory module
(4) Receive 49-bits from memory module

DESCRIPTION (1) Transfer 12 address bits
(2) Transfer read-write level
(3) Don't transfer 49 information bits to memory module
(4) Send 49-bit descriptor to selected input-output control module from address memory
(5) Block the path back to processor P1

In the above operations transfer operations 1 and 2 are common to each of the three operations, write, read and descriptor. Referring to FIG. 9, the read state is high and the write state is a low level state.

A description of the operation in the case of each of the above functions is as follows:

Assume that processor P1 is going to write into memory module M1. Consider the dotted line blocked portion 210 of FIG. 9A. Upon request of the write function from the processor P1 to the memory module M1, the following inputs must appear at the AND gate A3 in this block for effecting this operation. The conditions and consequent inputs are that a signal indicating processor P1 requests module M1 appears in the first input to gate A3 (P1–RQLM1), a signal indicating select processor P1 (for priority) appears at a second input to gate A3 (Q–SP1) and a signal is required at the input to this AND gate A3 indicating that memory module M1 is not busy (M1–B′). In this condition at time $T_5$ the control flip flop F10 is in the state shown, with a 1 in the block at the left and "0" in the block at the right. In this state a high output is present at switching point C. To the left of portion 210 is the address and read-write cross-point gate for memory module M1. The high state at the intersection C enables a high voltage signal to be transmitted along line 211 which activates each of the 12 address AND gates along this line. This, in the presence of processor P1 pulse address level signal, transfers each of the 12 address bits and the read-write state into memory module M1. This drawing illustrates the connection between processor P1 and memory module M1 for example. It should be understood also, of course, that in FIGS. 9A and 9B the designations P2–PAL0 to P2–PAL 11 refer to the processor P2 pulse address level signals; the designation I1–IAL0 to I1–IAL 11 refers to the I/O control module I1 pulse address level signals, etc., similarly to the designations P1–PAL0 to P1–PAL 11 for the processor P1 pulse address level signals. It should be understood further that the circuit of FIGS. 9A and B illustrate cross-point control and communications to memory module M1 as exemplary of such control and communication between each of the requestor modules P1, P2, I1, I2, I3 and 14 and each of the memory modules M1, M2, M3, M4, M5, M6, M7 and M8. That is, separate cross-point controls are effected between each of the requestor modules and each of the memory modules utilized.

With this transfer at time $T_5$ the 12 address bits and the read-write level of the processor are available at memory module M1 for strobing into memory module 1 at $T_0$. As shown in FIG. 17 the 12-bit address is received in memory module M1 in the memory address register 107 and the read-write bit is received in memory module 1 in the read-write register (R/W). Simultaneously, the 49 bits which appear in register 108 of the requestor module P1 must be written into the memory information register 111 of memory module M1. During the write operation the read-write level at input D of FIG. 9A is in a low level state. Upon inversion in invertor I1 a high state appears at the input of AND gate A1. Simultaneously, a high state appears at the junction C and therefore at the other input of AND gate A1. After amplication this causes the transfer of each of the 49 information bits in the processor P1 into the memory module M1 such that at time $T_5$ these 49 bits are available for strobing at the memory information register 111 in memory module M1 at time $T_0$. This transfer is effected along the output lines, which lines lead from the data write cross-point gates for memory module M1 including lines 113, 114 shown to the right of FIG. 9A. As shown for example, in OR gates D1 and D2 (FIG. 9B) the information coming into these units is OR-ed such that if it emanates from any of the requesting units it will pass through the respective OR gates D1 or D2 and be received in the memory M1 if any one of the information lines are active. Because of the conflict system to be described, only one of these lines from the requesting modules can be open at a given instant.

Now consider the read operation. During the read operation the same conditions of inputs at AND gate A3, namely processor P1 requests memory M1 (P1–RQLM1), the queue matrix selects processor P1 (Q–SP1) and memory module M1 is not busy (M1–B′) appear at the inputs to AND gate A3. At time $T_5$ the state in the flip flop line is such that a high condition appears at point C. Transfer is effected then of the 12-bit address and of the read-write level at time $T_0$, similar to the occurrence for the write operation. These signals are available to memory module M1 at time $T_5$ and accepted by memory module M1 at time $T_0$. However, the third condition for a read operation, namely, that transfer of the 49 information bits to memory module 1 not to be effected, is met, since during the read operation the condition at point D is high which upon inversion of cross inverter I1 causes a low condition at the input of AND gate A1. Therefore, the 49 information bits cannot be transferred along lines such as lines 113 and 114 to the memory module M1 and they are held in the register 108 of the requestor module (see FIG. 17).

Referring now to FIG. 10 the data read transfer control for the processor P1 is shown. This is different in some respects from the data read control configuration for the other requesting modules which are shown in FIGS. 11 and 12. In the presence of a normal request which is not a request for an input-output descriptor, the line DS′ indicates that a descriptor request is not being effected. In this condition line DS′ is at a high signal level. On the line P1–RL from the read-write level signal from processor P1, if the level is high it indicates a read operation to be effected. This is the input at D of FIG. 9A from processor P1 on the read-write level which is high. This high level is transferred along the line from D to the P1 data read transfer control (see FIG. 9A). The previously selected crosspoint control flip flop F10 following AND gate A3 shown in FIG. 9A also controls the processor P1 data read cross-point gates in that in the presence of a high condition at this point the AND gate A5 enables transfer of the signal therethrough into memory module M1. This is shown in FIG. 9 and also in phantom in FIG. 10.

Referring to FIG. 17, this enables transfer of the 49 bits in the memory information register 111 into the requestor module P1 at a time $T_2$ or later. Thus in order to effect a read of the 49 bits in memory module M1 contained in the memory information register 111 into register 106 in the processor P1 module the following is required: first, the cross-point flip flop F10 must be set by a condition wherein the presence of a clock pulse at time $T_5$, processor P1 is requesting module M1 (P1–RQLM1), the queue matrix 60 selects processor P1 for priority or no conflict is present (Q–SP1) and module M1 is not busy (M1–B′) in conjunction with a request for input-output descriptor not being present (DS′), and in addition a high level must appear along the line P1–RL indicating read level from processor P1. In the case of the read operation in any of the requesting modules I1, I2, I3, I4, and the P2 module, which P2 module in the illustrative embodiment is not provided with descriptor means, all of the signals so far required for transfer into processor P1, except for the indication that a request for input-output descriptor is not in effect, are necessary.

There are two ways of effecting transfer into the I/O modules. One way is by descriptor request by the processor module P1 which has been described. The second method is by a read operation performed by the input-output control module which is substantially identical to that described in the read operation of processor P2 and is shown in FIG. 11 of the drawings.

The descriptor operation is exactly the same as the normal read operation calling for transfers of the twelve address bits and the read-write level, and establishing that the 49 information bits are not transferred to the process P1 module. Data is read as has been described from the memory module, for example, module M1 back to an input-output control module instead of to the requesting processor P1. This is done by blocking the path back to the P1 processor and opening the path to the input-output control module which has been selected to receive the descriptor information. The selection of the input-output control unit available is discussed in the description of FIG. 6 of the drawings (see columns 21, 22 and 23, hereinbelow). The path back to the processor P1 is blocked by the fact that the request for input-output descriptor is present (see FIG. 10) on the line marked DS′. This normal request—not a request for I/O descriptor disables the AND gates A5 etc. from transmitting information back to processor module P1.

Assume that the input-output unit I1 is selected by the I/O selector unit 90 to receive the descriptor 49-bit information from memory module M1. Referring to FIG. 12, the line DS–TR1 (descriptor transfer to I/O unit I1 from selector 90) indicates that I/O unit I1 is selected. The line DS–TRI1 is then at a high level. Also present is the output of the cross-point flip flop F10 along the line P1–SWM1 (processor unit P1-switch memory module M1) which appears at point C. Under these conditions AND gate A9 will pass the signal through to OR gate D3. This enables output from OR gate D3 which allows passing through of the information bits into the first input-output module I1. Similarly, if one of the other input-output units I2, I3 or I4 is selected the corresponding AND gate associated with descriptor transfer line into that unit will in conjunction with the descriptor transfer line enable selection of the corresponding input-output control unit. In the case of normal read operations AND gate A10 which is identical to the processor P2 read operation gate configuration enables input to be received into input-output module I1 when the output at C indicates that input-output unit I1 is selected (QSI1) that memory module M1 is not busy (M1–B′), and that input-output unit I1 requests information from memory unit 1 (I1–RQLM1).

This discussion indicates what signals and states must be generated in order to enable transfer between the requestor and memory modules of the system through the cross-points of the cross-point switching matrix. A discussion of the initiation of the signals and states necessary to command these transfer operations follow:

Refer to the block diagram of FIG. 2. FIG. 2 shows the bus allocator of the switching interlock. In general, a plurality of requestor modules which may comprise first and second data processors P1 and P2 and a plurality of input-output units such as input-output units I1, I2, I3 and I4 request a series of switching functions of a plurality of memory modules which in the illustrative example comprises eight modules M1, M2, M3, M4, M5, M6, M7, and M8. In order for any of the requesting modules to initiate an opeartion there is required first a module address signal which is transmitted over the 3-bit memory module address set of six lines, second a request level signal which is transmitted over one line, and third, a read-write signal which is transmitted over one line. The 3-bit memory module address signal and the request level signal are transmitted to a requestor memory address decoder. The 3-bit address comprises three flip flops in the requesting unit (see FIG. 16) and the state of these flip flops at a particular instant are transmitted across the 3-bit memory module address six-lines to the appropriate memory address decoder 31, 32, 33, 34, 35 or 36. A read-write signal level is simultaneously transmitted from a flip flop in the requestor unit module and applied to the cross-point control unit 80. In addition, the request level signal is transmitted from the appropriate flip flop unit in the requestor to the corresponding memory address decoder. Assume a request level is exhibited which indicates the start of a transfer function is to be instituted.

Now referring to FIG. 13 wherein is shown a logical diagram of the memory address module decoders for each of the requestor units. Consider for example, the processor P1 memory address decoder. The three lines marked 000, 001, 010, 011, 100, 101, 110, 111 respectively at the input to respective AND gates A12, A13, A14, A15, A16, A17, A18 and A19 reflect each of the possible conditions of each of the three flip flops in the processor unit P1 (see FIG. 16). These are the eight combinations of either a 0 or a 1 possible in the three address flip flops of processor P1. In addition, the request flip flop in the processor P1 unit must be in requesting state to provide a request level input to AND gates A12, A13, A14, A15, A16, A17, A18 and A19 to provide output from one of these AND gates.

With an indication of request level present on the line for processor P1 marked P1–RQL (processor P1 requests level) a high level is present on the output line from one of the AND gates A12, A13, A14, A15, A16, A17, A18 and A19 in accordance with the setting of the memory address flip flops. This high level output indicates which of the memory modules M1, M2, M3, M4, M5, M6, M7 or M8 has been requested. Similarly in each of the other processor units P2, I1, I2, I3 and I4, comprises eight AND gates and in the presence of a high level on the request line from its particular module, a high level output will result from the appropriate gate to indicate a request for the corresponding memory module that a processor or input-output unit is requesting. The symbology on these drawings indicates what is being done. For example, referring to AND gate A15, the designation P1–RQL indicates that processor P1 is making a request. This high state appears on the input line labeled P1–RQL at the input to AND gate A15. Each of the other inputs indicates that the first flip flop in the processor P1 is in the "0" state, the second flip flop is in the "1" state and the third flip flop is in the "1" state. On the output line from gate A15 the designation P1–RQM4 indicates that processor P1 is making a request of memory module M4.

Figure 3A:
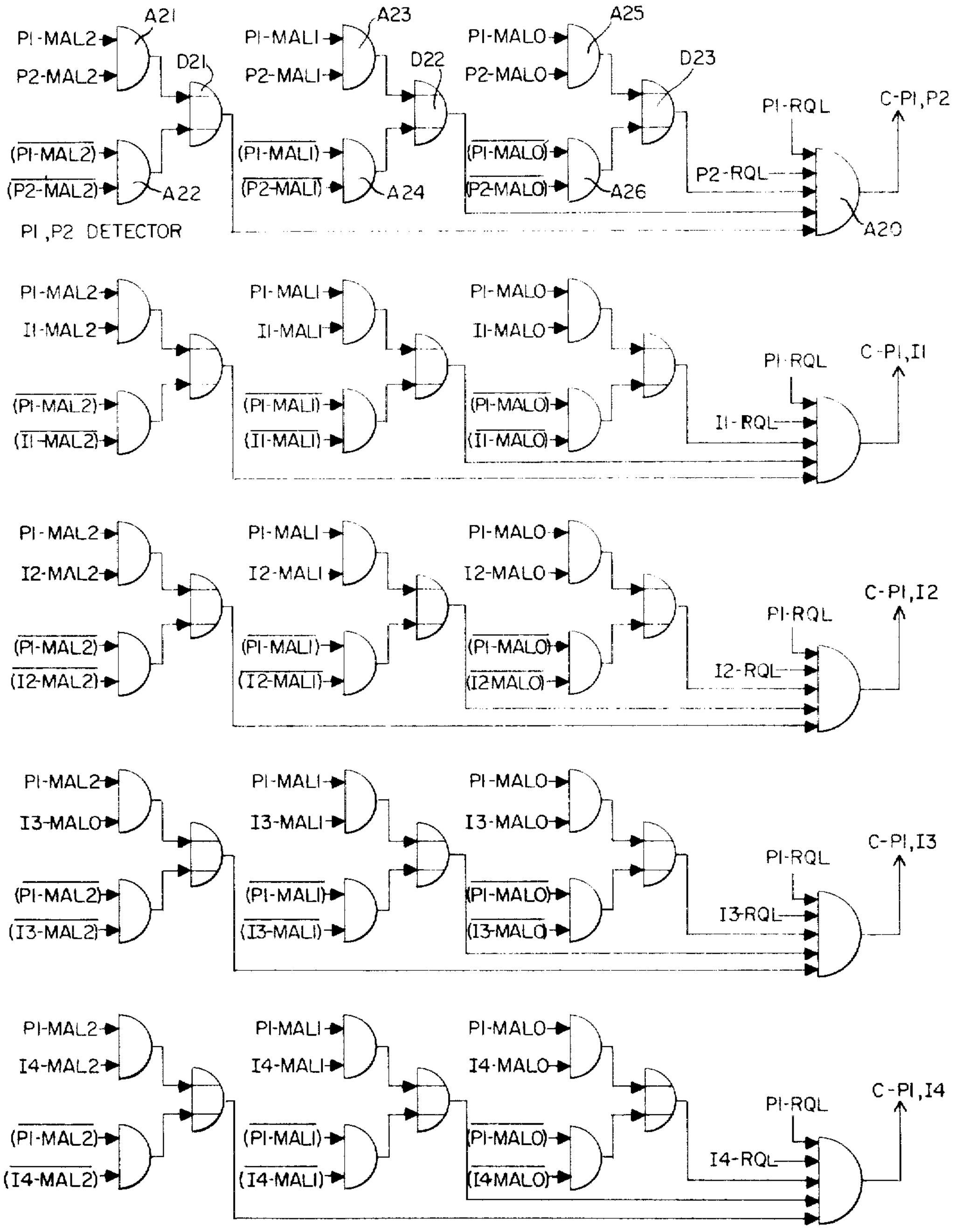
FIGS. 3A, 3B and 3C are the logic diagrams comprising the logical representation of the conflict detector system of FIGS. 1 and 2 illustrating the means and operation responsive to each possible conflict between two requestor modules.
Figure 3B:
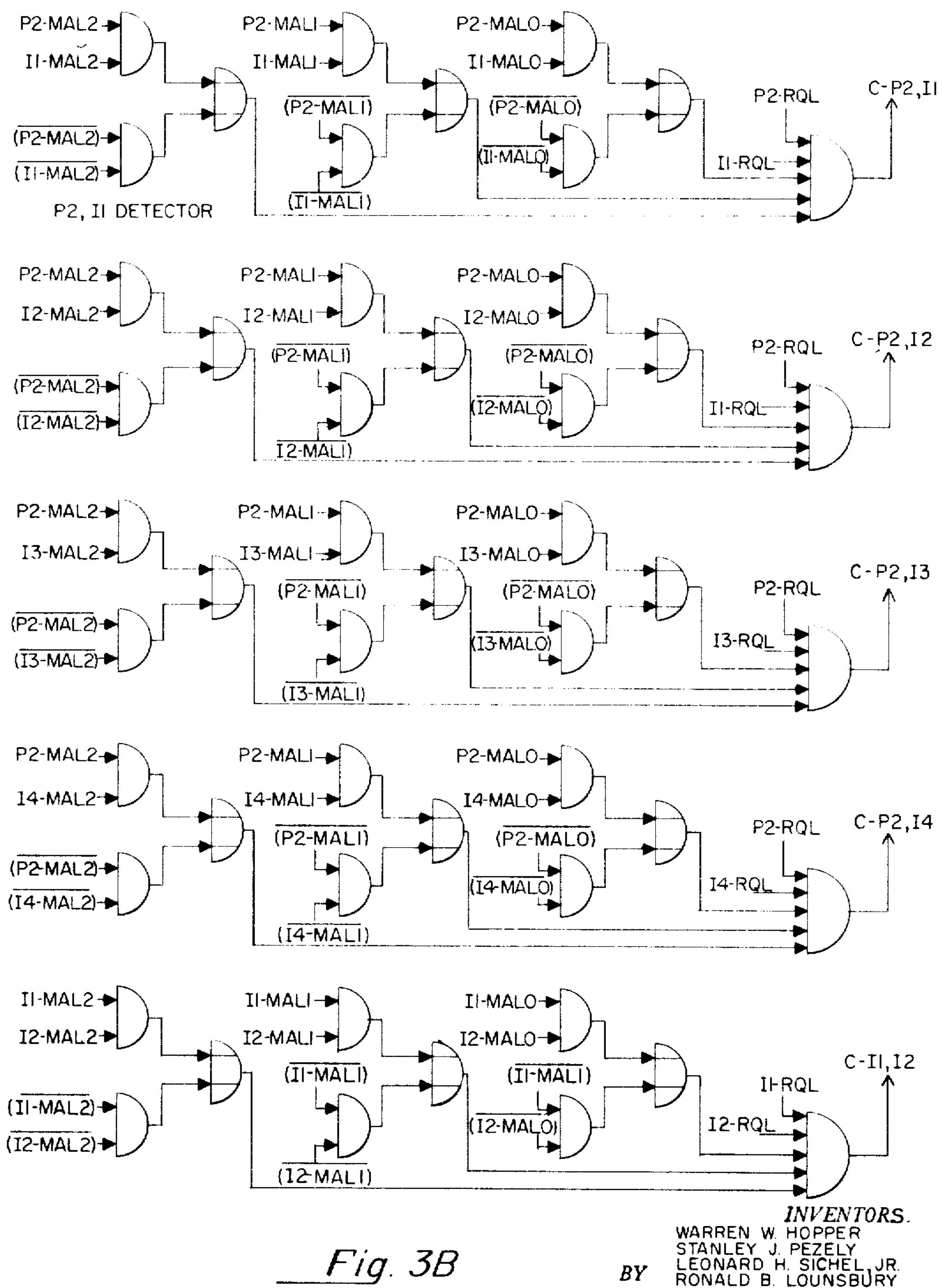
Figure 3C:
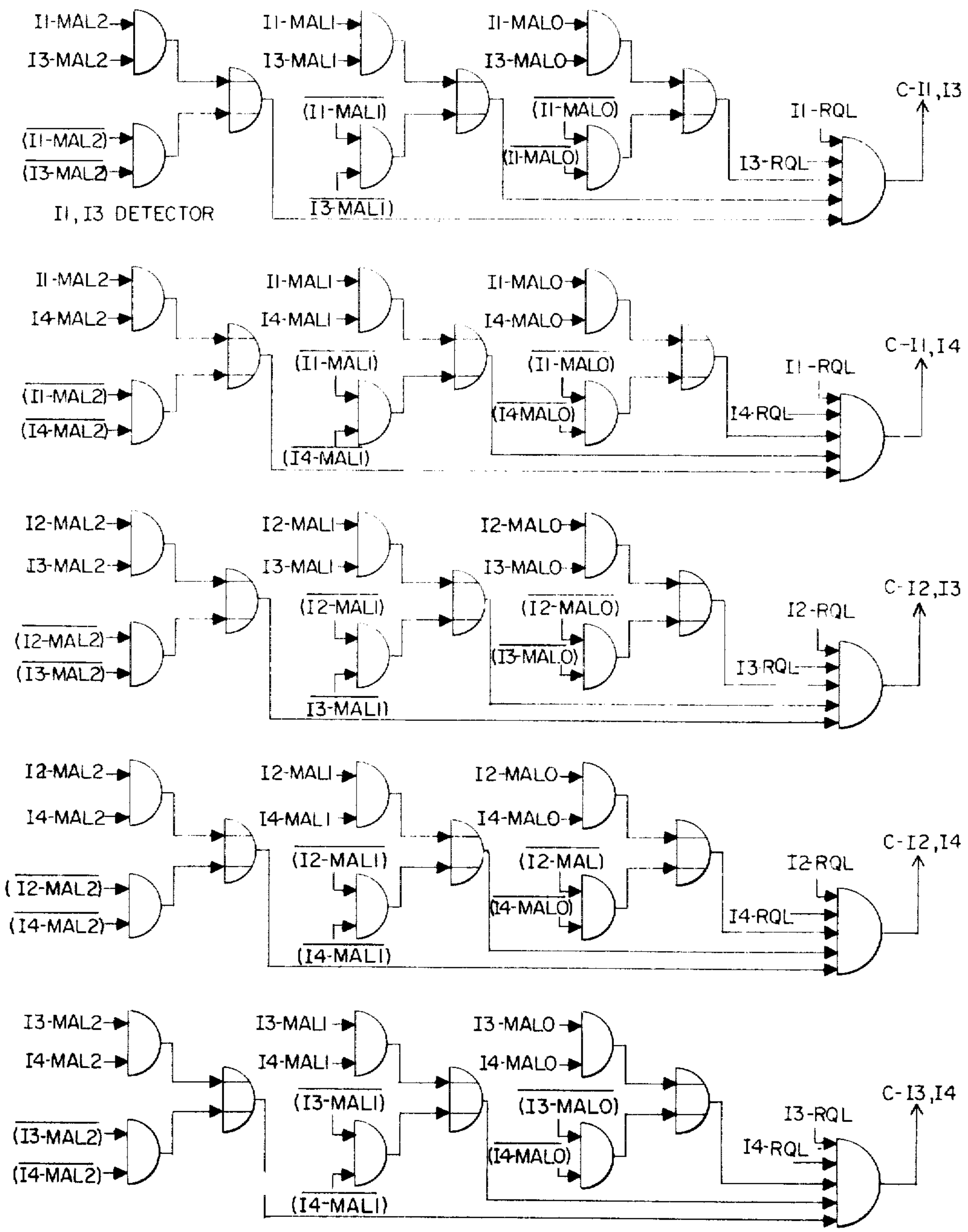

Now refer to the conflict detector 40 shown in FIG. 3 which as also shown in FIG. 2, receives a total of 36 inputs comprising six inputs from the three bit module address of each of the six requestor modules. The conflict detector 40 compares the three bit memory states emanating from each of the requestor modules to determine whether or not any of them coincide. If then the bits coincide it indicates that the same memory module is being addressed simultaneously by more than one of the requestor modules. If so, a signal is exhibited at the output of the conflict detector 40. This signal is fed into the queue matrix 60. For example, assume that processors P1 and P2 are addressing simultaneously the same memory module. In such case, assume that the level of each flip flop of processor P1 is the same as the level of the corresponding flip flop in processor P2. This indicates that both are addressing the same memory module. Then, if both P2 and P1 are requesting, a conflict exists between processor P1 and processor P2. For example, examine the processor P1, P2 detector in the case where a conflict exists between processor P1 and P2. Signals are generated as follows: The highest level of the three-bit address is compared in state. If they are the same an output will develop out of either AND gate A21 or AND gate A22 and the output of OR gate D21 will be high. This high level is fed into AND gate A20. Next, the second highest level state or state of the second two flip flops of the three address flip flop detectors are compared. If they are identical then an output will result either from AND gate A23 or AND gate A24. Hence a high level output will result from OR gate D22. Similarly comparing the lowest or zero significant bit level of the three bit address from processors P2 and P1, if they are the same, an output will result either from AND gate A25 or AND gate A26 and hence a high level output will result from OR gate D23. In the presence then of identical bits from each of the three address bits of processors P1 and P2 and in the presence of an output indicating a request for the same memory address (memory module) from processors P1 and P2 simultaneously, AND gate A20 provides an output which indicates a conflict where processors P1 and P2 request the same memory module at the same time. Similarly, the remaining 14 of the 15 possible comparisons of any two of six modules are compared as shown in the other portions of FIG. 3. A conflict in requests for the same memory module at the same time by two requestor modules cause an output from the conflict detector. This output is applied along one of the 15 line outputs from the conflict detector 40 into the queue matrix 60 (see FIG. 2).

Now, referring to FIGS. 4A, 4B, 4C, 4D, 4E and 4F wherein is shown the input-output control module priority resolver, and further referring to FIGS. 1 and 15, each of the input-control modules are connected to a plurality of external input-output devices including magnetic tapes, magnetic drums and other devices. Because of the speed of operation possible with some of these devices as compared with others, it is desirable to introduce a system of establishing priority of input-output control units wherein instantaneous priority depends upon the particular external unit to which the input-output control module is connected at a particular time at which operation is desired. In the illustrative system three groups are utilized. The first priority group comprises magnetic tape units. The second group comprises magnetic drum devices. All other devices have a priority lower than tapes and drums.

Each of the external input-output units is designated by a five-bit address which identifies it. The least two significant bits of a five-bit address as shown in the table of FIG. 15 determines whether the unit is a tape, a drum or other type of external unit. The least significant bit of address of all tapes is a one (1). The least significant bit of all drums is a zero (0) and the next least significant bit is a zero (0). All other units have a 1 in the next least significant bit and a 0 in the least significant bit of the address, denoting its particular nature and address.

Consider the example shown in the upper left portion of the logic circuitry of FIG. 4. The priority sequence in the case of conflicts between input-output control or I/O unit I1 and input-output control unit I2 are described.

In the case of conflict between I/O units I1 and I2, I1 will have priority in any case where first I/O unit I1 is connected to a magnetic tape unit, second where I1 is connected to the highest priority units of the three levels of priority comprising tape, drum and other units and third wherever the units connected to I/O units I1 and I2 are of identical priority i.e., both input-output units connected to I/O units 1 and 2 are tapes or both are drums or both are units other than tapes or drums. In the third case of connection to equal priority input-output units it is decided arbitrarily that input-output control unit I1 has priority over input-output unit I2. Similarly, arbitrarily I/O unit I2 which is of lower priority than I/O unit I1, does have priority over I/O unit I3 when connected to equal priority input-output units and I/O unit I3 has priority over I/O units I4 when both are connected to equal priority input-output devices. Whenever input-output control module I2 is connected to a higher priority unit, i.e., a tape or a drum, than the unit to which input-output control module I1 is connected which would be a drum or other unit respectively than I/O module I2 has priority over I/O module I1. Similarly, I/O unit I3 has priority over I/O module I2 and I/O module I4 has priority over I/O unit I3 when the greater number designated unit is connected to a higher priority input-output device than the lower number designated unit. Now consider the upper left portion of FIG. 4 representing conflict between input-output control modules I1 and I2. On the upper line the notation I1–XL0 indicates that input-output control unit I1 in its least significant level is a 1. In this case, referring to FIG. 15, input-output control module I1 is connected to a tape and therefore I/O module I1 has priority over I/O module I2. This is reflected by output from OR gate D41 which has an output indicating a priority of I/O module I1 over I2. Whenever input-output control unit I1 is connected externally to a magnetic tape device, it has priority over input-output control unit I2 in event of conflict. Taking the second line the designation $\overline{\text{I1–XL0}}$ means that input-output control unit I1 is externally connected to a unit which has a zero in the least significant bit. The bar over this expression indicates that there is "not one" in the least significant bit position of the address of the input-output device to which connection is made. The next line symbology ($\overline{\text{I1–XL1}}$) indicates that the input-output control unit is connected to an input-output device whose address is not a one in its next least significant bit. Thus far since in the inputs to AND gate A41 the symbology indicates that there is a zero in the least significant bit of the address of the external unit and a zero in the next least significant bit in the address of the external unit which referring to FIG. 15 indicates that I/O module I1 is connected to a drum.

The designation ($\overline{\text{I2–XL0}}$) on the fourth line input to AND gate A41 indicates that the address of the external unit to which input-output control module I2 is connected in its least significant bit is not a 1. These three inputs to the AND gate A41 indicate as shown that input-output control module I1 has a zero in each of its two least significant bits and is connected to a drum, and also the further condition that input-output control unit I2 was not connected to a tape since it has a zero in its least significant bit. In this case since input-output control unit I2 is not connected to a unit of higher priority than input-output control unit I1, priority of input-output control I1 is established over I/O control unit I2. An output occurs indicating this from the AND gate A41 and from the OR gate D41. As shown by the connection of the fifth line into the input of AND gate A42 symbolized as ($\overline{\text{I2–XL0}}$) input-output control module I2 is connected externally to a unit which does not have a 1 in its least significant bit. That is, I/O unit I2 is not connected to a tape. The second input to AND gate A42 bears the notation I2–XL1 which indicates that input-output control unit I2 is externally connected to an input-output unit whose next least significant bit in its 5-bit address designation is a 1. This indicates that I/O unit I2 is not a drum. Since I/O unit I2 is not a tape and not a drum I/O unit I1 must have priority over I/O unit I2. This is indicated by an output appearing from AND gate A42 which causes an output to be fed into the OR gate D41 causing an output from OR gate D41. This last output indicates priority of I/O module I1 over I/O module I2. Referring now to the first input to AND gate A43 this comes from the second line wherein the notation appears ($\overline{\text{I1–XL0}}$). This indicates that input-output control unit I1 is externally connected to an output unit whose least significant bit is not a 1 and is therefore a 0. Referring to FIG. 15 this designation indicates that I/O unit I1 is not a tape. Referring to the second input to AND gate A43, the notation I2–XL0 indicates that input-output unit I2 is externally connected to an output unit whose address has a least significant bit which is a 1. This indicates that input-output control unit I2 is connected to a tape. Since input-output control unit I1 is not connected to a tape and input-output control unit I2 is connected to a tape I/O unit I2 has priority over input-output control unit I1. This is indicated by an output appearing at AND gate A43 which is fed into OR gate D42 to produce an output from OR gate D42 indicating priority of input-output control unit I2 over input-output control unit I1.

Now referring to the inputs to AND gate A44, the first input is the designation ($\overline{\text{I1–XL0}}$) which indicates that input-output control unit I1 is externally connected to an output unit which is not a 1 in the least significant bit of its 5-bit address. This indicates that input-output control unit I1 is not connected to a tape. The second input to AND gate A44 bears the notation I1–XL1. This indicates that I/O unit I1 is externally connected to an operating unit which has a 1 in its next least significant bit of its 5-bit address. This indicates that module I1 is not connected to a drum. The third input to AND gate A44 bears the notation ($\overline{\text{I2–XL0}}$) which indicates that input-output control unit I2 is externally connected to an operating unit which in its least significant bit is not a 1 and hence is a 0. This indicates that I/O unit I2 is not connected to a tape. The fourth input to AND gate A44 bears the notation ($\overline{\text{I2–XL1}}$) which indicates that input-output control unit I2 is externally connected to an operating unit which does not have a 1 in its next least significant bit position of the 5-bit address designating this operation unit. This indicates that I/O unit I2 is connected to a tape or a drum. Looking at the third and fourth inputs to AND gate A44 we see a 0 in the next least significant bit position of the address and a 0 in the least significant bit position of the address or a 5-bit address ending in 00. This indicates that input-output control unit I2 is connected to a drum. Under the conditions that input-output control unit I2 is connected externally to a drum, that input-output control unit I1 is not externally connected to a tape, and is not externally connected to a drum, then output is required from AND gate A44 which is OR-ed in OR gate D42 to provide an output indicating a priority of input-output control unit I2 over input-output control unit I1. Similarly, each of the other possible conflicts may be resolved between the various input-output units to provide the priorities indicated on the output lines from the respective OR gates in the case of each conflict. These twelve outputs of each of the possible combinations of the conflicts of any two of the four input-output control units appear on the twelve lines leading from the input-output priority resolver 50 into the queue matrix 60, shown in detail in FIG. 5. As will be seen in the description of the queue matrix the general priority of any of the four input-output control units over processor P1, which in turn has a priority over processor P2, is designed into the queue matrix configuration and is always fixed.

Now referring to FIG. 5 there is shown the queue matrix and all of the possible combinations of conflict which can occur. Output from unit 50, I/O priority resolver, is fed into the queue matrix 60 along with output from the conflict detector 40 which also is fed into the queue matrix 60 whenever conflict occurs between any two or more of the six requestor modules P1, P2, I1, I2, I3, and I4. The queue matrix 60 is in continuous use and normally in the absence of conflict, all outputs to the inverters 300, 301, 302, 303, 304, and 305 are normally low. In the absence of conflict all outputs from output points 306, 307, 308, 309, 310 and 311 are high. This is, in low level condition at point 300, communication is permitted to and from processor P1 and no hold signal Q–S'P1 is generated. Similarly, in low level condition at point 301, the processor P2 is not held. In low level condition respectively at outputs 302, 303, 304 and 305 the input modules I1, I2, I3 and I4 respectively are not in request hold condition. Similarly, the cross-point control permits transfer of information through the gates of the switching interlock when points 306, 307, 308, 309, 310 and 311 are in high condition such that information from respective requestor modules P1, P2, I1, I2, I3 and I4 can be passed through. That is, the corresponding requestor modules P1, P2, I1, I2, I3 and I4 in high condition of the outputs of respective inverter units I10, I11, I12, I13, I14, and I15 are not prevented from communication. The queue matrix 60 generates signals only to control whether or not information may be permitted to be transferred through the switch interlock. The function of the elements of the queue matrix 60 normally is to permit information to pass through the switch interlock. In the presence of inverse to normal conditions, the queue matrix 60 prevents certain switching functions from occurring through the switch interlock. For example, in the presence of an input indicating conflict between processor P1 and input-output control unit I1, I2, I3 or I4, an output will result from OR gate D41*a* which will cause a high level to cause a select not processor P1 signal at point 300 and a high level input to inverter I10. Hence processor P1 is held. Upon inversion of the signal across inverter I10 the point 306 will be low and hence blocking of information from passing to and from processor P1 will result. Similarly, in the case of conflict between processors P2 and P1 or between processor P2 and any one of the four input-output control modules as shown in the circuit inverter I11 an OR output will result at point 301 which will cause a high level there. Hence holding of processor P2 occurs in any one of the conditions in which an inverter I11 causes the normally high condition at point 307 to be low. This low output prevents a select processor P2 (S–P2) signal and hence blocking of messages to and from processor P2 occurs.

Similarly in the case of conflict between any two of the input-output control modules at any given instant, the conflict is resolved by the queue matrix 60 by preventing the one with the lowest external unit hooked on from operating.

For example, taking the circuit of AND gate A51 and OR gate D51 where a conflict occurs between input-output modules I3 and I2 and the output of the priority resolver indicates that unit I2 is to be given priority over unit I3, an output appears from the OR gate D51 which causes a high condition to result at point 304 which is inverted in inverter I14 to provide a low condition at point 310. This effects holding of input-output control unit module I3 and blocks messages to and from that input-output unit due to low level output at point 310. Since point 303 remains in its normally low state and point 309 remains in its normally high state, there will be no blocking of the lines to and from requestor module I2 and hence its operation will be performed. Naturally this performance will occur only in the event that the addressed memory is available as determined by the cross-point control unit 80.

The function of the input-output selector unit 90 shown in detail on FIG. 6 of the drawings, is to select the particular input-output control unit I1, I2, I3 or I4 which will receive a descriptor from the processor P1.

In the illustrative embodiment only the processor P1 is equipped with means for initiating a descriptor transfer. Equipment of processor P2 with such means and switching which may include a priority arrangement is contemplated as within the scope of this invention. When the input-output selector unit 90 receives a signal which indicates that a descriptor transfer is initiated it selects which of the input-output units is to receive the descriptor from the address memory. The circuitry is designed arbitrarily such that the basis for receiving the descriptor is that in numerical order, one of input-output control units (I/O modules) I1, I2, I3 and/or I4 receives the descriptor. In the event that the lowest number of input-output control unit I1 of group I1, I2, I3 and I4 is busy, then, in sequence input-output control modules I2 or I3 or last choice I4 receives the descriptor in that order, the lowest numbers I/O unit I1, I2, I3 or I4, which is not busy receiving the descriptor. Assume a signal received on the line P1–DSFF (see FIG. 6).

Referring to FIG. 2, this signal is initiated at processor P1 and conveyed over one wire to I/O selector 90. This signal indicates that a descriptor transfer is being initiated by processor P1. This input is one of the inputs to AND gate A61 (see FIG. 6). This input is applied simultaneously, also as one input to AND gates A62, A63 and A64. The output line DS–TRI1, DS–TRI2, DS–TRI3 or DS–TRI4 indicates which input-output control module unit I1, I2, I3, or I4 is selected to receive the descriptor. As shown in FIG. 2 in the input to the I/O selector unit 90, and as shown in FIG. 6 on the three lines designated I1–B, I2–B, I3–B simultaneous signals indicating the busy or not busy level are received from the corresponding input-output control modules. In the event that I/O module I1 is busy, it applies a high-level output which is received as input to the I/O selector 90 on the line marked I1–B. This high level I1–B is inverted across inverter I61 to provide a low-level input to AND gate A61. In this case there is no output from AND gate A61 which indicates that input-output I1 is not to receive the descriptor. Assume that input-output control unit I1 is busy and input-output control module I2 is not busy. In this case upon arrival of a descriptor request at line P1–DSFF, a low state responsive to I/O module I2 output when not busy exists at the selector 90 input line marked I2–B. This low state upon being inverted across inverter I62 and in the presence of the high level at the input to AND gate A62 from busy input-output control unit I1 applied along line I1–B and in the presence of the high level state applied along the line marked P1–DSFF upon initiation of a descriptor permits the AND gate A62 to present an output at DS–TRI2 (Descriptor Transfer to I/O module I2). This indicates that input-output control unit I2 is selected. Simultaneously as we have seen the busy signal of I1–B has prevented AND gate A61 from providing an output and the low level along the line marked I2–B, which is not inverted, inhibits both AND gates A63 and A64 so that no outputs result from these gates. Now assume that input-output control units I1 and I2 are busy and input-output control unit I3 is not busy. A high level is present at the lines I1–B and I2–B, each of which is transferred to a low level across respective inverters I61 and I62 to inhibit AND gates A61 and A62. The low level then present at line I3–B when input-output unit I3 is not busy becomes high across inverter I63 and at this input to AND gate A63. An output results from AND gate A63 due to the high level at each of its four inputs due to descriptor request P1–DSFF, I/O modules I1 and I2 busy and inverter not busy low signal from module I3. The low level at the line marked I3–B inhibits AND gate A64. This input-output control unit I3 is designated alone to receive the descriptor.

In the event that the three input-output control units I1, I2 and I3 are busy when a descriptor provides a high on the line marked P1–DSFF, a high state exists at the lines marked I1–B, I2–B and I3–B which, upon being inverted across respective inverters I61, I62 and I63 inhibits AND gates A61, A62 and A63, respectively. These high states of the line marked P1–PSFF on issuance of a descriptor request from processor P1 and of the lines marked I1–B, I2–B, I3–B when I/O modules I1, I2 and I3 are busy provide the four high inputs which enables gate A64 to provide an output indicating selection of input-output control unit I4 to receive the descriptor.

A descriptor request is not issued when all four input-output control modules I1, I2, I3 and I4 are busy. Processor 1 before issuance of a descriptor operation checks its interrupt register (not shown) as to the availability of at least one input-output control module. This interrupt register in processor P1 indicates when all four input-output control modules I1, I2, I3 and I4 are busy. This interrupt register may include, for example, an AND gate responsive to output from each busy indicator from the I/O modules I1, I2, I3 and I4 to provide output only when all four are busy.

The synchronizer 100 which is described in detail hereinafter is responsive to the output of I/O selector 90. Synchronizer 100 coordinates the phase of the clock timing in the input-output control modules with that of the processor P1.

Referring to FIGS. 8A and 8B of the drawings wherein is shown the HOLD matrix 70, a plurality of OR gates D71, D72, D73, D74, D75 and D76 when providing outputs respectively cause a signal, actually a level, to be fed to the respective requestor modules P1, P2, I1, I2, I3 or I4 into which they are connected. The requestor units sense the OR outputs and take appropriate action to cause HOLD of the requestor to be effected until such time as an output from the respective OR gate D71, D72, D73, D74, D75 and D76 is not forthcoming. There are two conditions which cause an output from the OR gates D71, D72, D73, D74, D75 and/or D76 and cause the HOLD function to be effected. The first condition is that the requestor unit corresponding to the OR gate has requested a memory module which is busy and the second condition where HOLD takes place is where under the first condition the particular requestor module has not been selected for priority by the queue matrix. For example, referring to the upper lefthand portion of FIG. 8, assume that requestor module processor P1 requests Memory 1. This is shown as a high level input on the line noted P1–RQM1 (P1 requests M1). The accompanying condition when memory 1 is busy causes an input to be applied to AND gate A71 from the line at the lower left-hand corner of FIG. 8 marked M1–B (M1 Busy). These two inputs to AND gate A71 cause an output which is applied to OR gate D71. Upon receiving an input OR gate D71 provides an output which causes processor P1 to be held. The second condition which causes OR gate D71 to provide an output to hold processor P1 occurs where a conflict has occurred and the processor P1 has not been selected as having priority. This is effected by an output from the queue matrix 60 applied along the bottom line leading to OR gate D71 which bears the notation QS'P1 (Queue Select not P1). A high input along the line marked QS'P1 indicates that processor P1 has requested a memory module and there is a conflict in requests for that memory module and processor P1 has not been selected for priority. This input is the output before inversion in each case shown in FIG. 5 of the drawings where a conflict occurs resulting in a high output from the corresponding OR gate of that figure. The input Q–S'P1 to OR gate D71 is provided when point 300 of FIG. 5 just before the inverter I10 is high indicating output from OR gate D41. This, in turn, is output provided by conflict between any I/O unit and P1 wherein the I/O unit has priority over the processor P1.

The forty-eight lines coming in eight from each of the requestors P1, P2, I1, I2, I3 and I4 are represented as the upper line input into each of the AND gates in FIGS. 8A and 8B. These are the forty-eight lines or wires leading from the memory address decoders shown in FIGS. 2 and 13. The busy signals leading into each of the forty-eight AND gates of FIGS. 8A and 8B come from the memory modules. Output from OR gates D71, D72, D73, D74, D75 and D76 is applied to the corresponding unit marked on the output line which unit senses this output and takes appropriate action such as stopping.

As shown in FIG. 2, the synchonizer unit 100 is responsive to the four outputs from input-output control module selector 90 (FIG. 6) to generate four outputs which are fed to the respective clock (not shown) of each of the input-output control units I1, I2, I3 and I4 in order to synchronize the timing operations of requestor module P1 and the particular input-output control module I1, I2, I3 or I4 selected as recipient of the descriptor. The T0, T1, T2, T3, T4, and T5 pulse output of the Processor P1 clock and the corresponding pulse outputs of the clock of the selected I/O module are thus phase synchronized on initiation of a descriptor. These clocks may physically be crystal controlled oscillators. Input-output selector 90 and input-output synchronizer 100 are only in operation when a descriptor transfer is initiated.

Referring to FIG. 7 wherein is shown the input-output synchronizer, by way of example, consider AND gate A81. If, as shown in FIG. 9, the output from flip-flop F10 at C is high it indicates that processor P1 and memory M1 are in contact (P1–SWM1 or P1 switch M1). In the presence of a descriptor wherein input-output control module I1 has been selected by the input-output control module selector 90 a high level signal output appears at the output DS–TRI1 (Descriptor Transfer to I1) from AND gate A61 shown in FIG. 6. Then two high signal inputs (P1–SWM1 and DS–TRI1) at AND gate A81 in FIG. 7 are in coincidence. Under these conditions an output results from AND gate A81. This output is fed to OR gate D81. Upon input to OR gate D81 an output is provided which is fed to the clock in the input-output control unit I1. The output to the input-output control module clock starts the timing sequence. Similarly the other AND gates of FIG. 7 covers all possible requests and corresponding input-output control unit selections to start their respective I/O clocks when a descriptor operation is present.

TIMING CIRCUITS

Refer to FIGS. 19, 20 and 21.

In the illustrative embodiment system each of the memory modules and each of the requestor modules has its own clock. The clocks are synchronous, i.e., for example, each of the clocks may be running exactly on frequency at a 1 megacycle rate (or 3 megacycle rate, etc., if desired). However, these clocks are ordinarily free-running and are not in phase with each other. It is important that each of the modules involved be put into phase with each other at the time a transfer operation is being effected. Assume a 1 megacycle clock rate. All timing notation is based on the memory module's operating cycle. The memory module operates on a six-clock pulse cycle which may be of six microseconds duration.

Figures 21A, 21B:
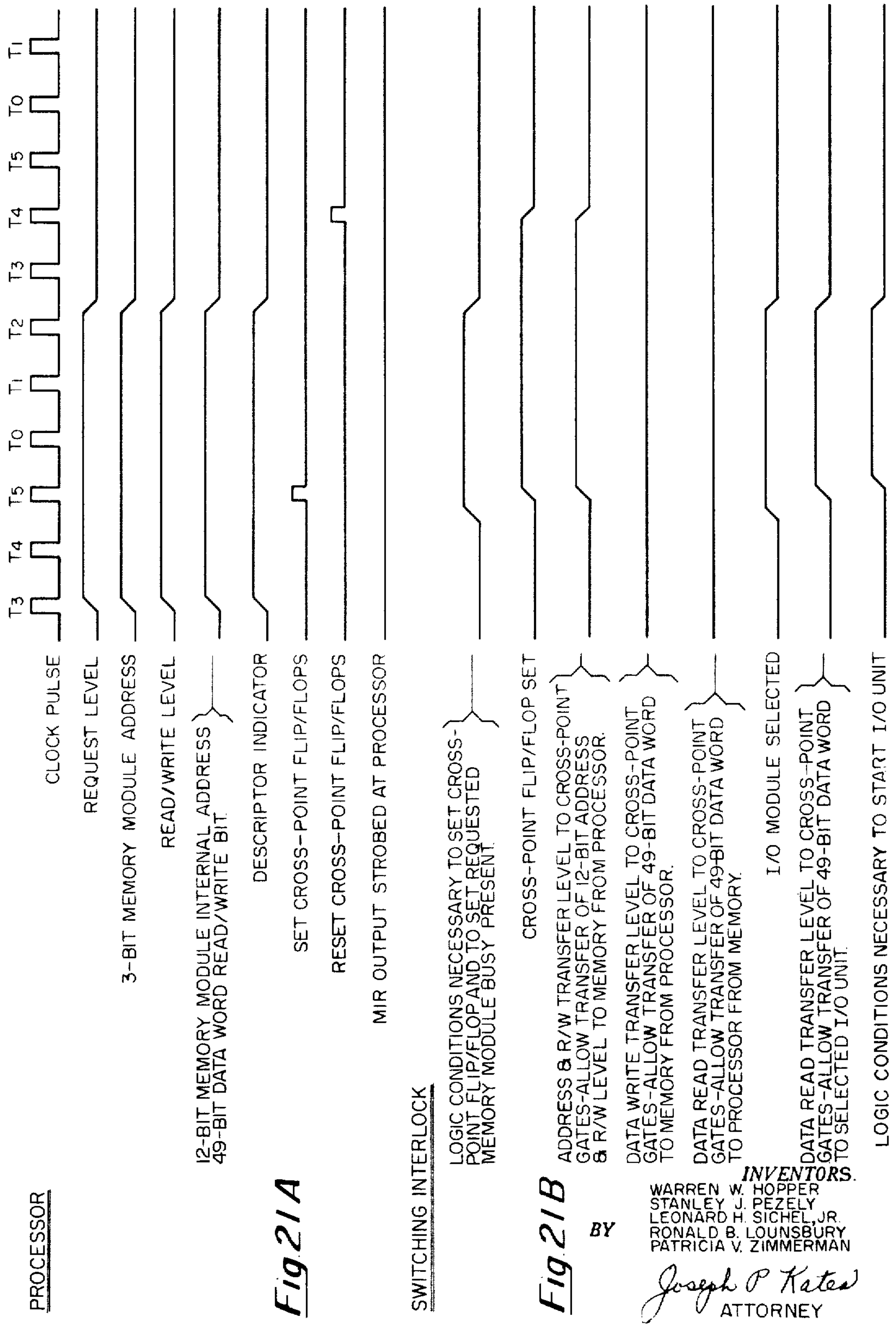
Figure 21C:
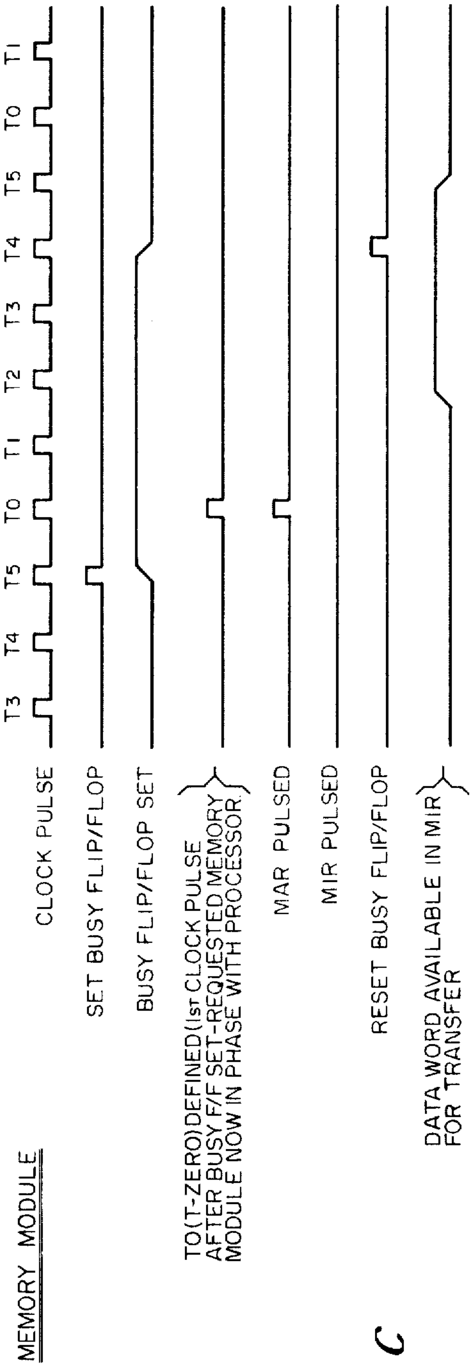
Figure 21D:
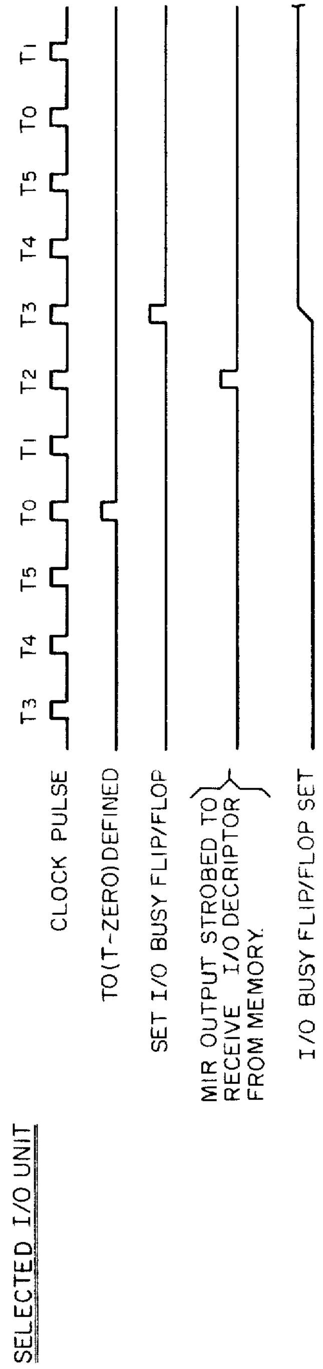

Referring to FIGS. 19B, 20B, 21C, the time T0 is defined as the time at which the memory module starts its operation. The cycle is six clock pulses in duration. Since information must be transferred into the memory at time T0 the processor cycle must begin at time T4. At time T4 the following is present in the requestor module: (1) a 3-bit memory address; (2) a request level; (3) a read-write signal; (4) a 12-bit memory module internal address; (5) a 49-information bit data word available at the processor for strobing.

This must be available at time T4. Prior to time T5 and after time T4, conflicts must be detected, input-output control module unit priorities must be resolved; the appropriate requestor must be queued, appropriate HOLD signals generated, and the cross-point control flip-flops must be prepared for strobing at T5.

At time T5 two things happen. (1) The appropriate cross-point flip-flop are set. (2) Coincidentally the memory busy flip-flops are set. The T5 pulses come from the respective requestor modules. This is shown in FIG. 9 at the cross-point control flip-flops at the input designations, for example, the input to flip-flop F10 labeled P1–T5. In the memory the conditions for setting the memory busy flip-flop are available prior to the requestor modules T5 pulses. Because a memory module can be connected to any one of the requestor modules, the memory T5 pulse is not used to set the memory busy flip-flop. Instead one megacycle pulses are fed from the memory clock to the clock set input of the memory flip-flop. Since all clocks are in synchonism, the memory flip-flop is set at the requestor's time T5. The memory busy flip-flop serves two purpose: (1) to indicate that the memory is busy, and (2) to indicate to the memory that when the busy flip-flop was set that pulse was at time T5 in the requestor. Subsequently the memory clock begins its operation on the following pulse, which is designated as time T0.

Re-stating, consider the circuit of AND gate A3 shown at the top center of FIG. 9. At time T4 the conditions indicated as P1–RQM1, Q–SP1, M1–B′, are not present at the inputs to the AND gate A3. At time T5, considering the requestor module, these conditions are present. When these conditions are present the output of the AND gate A3 is fed to the busy bit flip-flop in memory module M1. Simultaneously the clock which is in the memory module M1 continues to pulse into the memory M1 busy flip-flop. The simultaneous occurrence of the output from AND gate A3 in the busy bit memory flip-flop in memory M1 and the next pulse from its own memory clock serves to set the busy bit memory flip-flop. This is indicated to the right of cross-point control gate A3 as the lower output of that unit in FIG. 9. Under these conditions consider that the time in the memory unit at the memory flip-flop is time T5. At this point the requestor module and the memory module are both synchronized and in phase, so that transfer of the word bits may be effected at the proper time in accordance with the memory cycle. In the case of the descriptor it is necessary also to put into phase the selected input-output control module that is to receive the descriptor from the memory module.

In the case of a descriptor request it is necessary not only to synchronize the clocks of the memory unit and the requesting module so as to be in phase with each other, but in addition the clock of the input-output control unit which has been selected to receive the descriptor from the selected memory must be put in phase with the clocks of the P1 processor and the clock of the selected memory.

Summarizing, during the descriptor operation not only are the processor and memory in phase but in addition the selected input-output control module must be in phase.

Referring again to FIG. 7, and specifically for example, to the output of output gate D81, when a descriptor is initiated an output occurs from this gate which is fed to the input-output control unit number one clock. Similarly of course, output from the other gates where a corresponding input-output control unit is selected goes to the clock of the input-output control module selected. Output from the OR gate D81, etc., in the input-output control synchronizer 100 is fed to the input-output control module clock. The signal, for example, P1–SWM1 appearing on the input line from the lower left portion of this figure is available to AND gate A81 shortly after time T5 of the processor P1 clock. This signal appears at the output of OR gate D81 and is high at the input of the input-output control module unit I1 clock prior to time T0 of the P1 processor, but after time T5 of the P1 processor. As in the case of the memory module clock this pulse is gated with the one megacycle clock pulse input to the input-output unit control flip flop gates. At time T0 of the processor P1 clock the input-output control unit flip-flop is set. This defines time T0 in the operational sequence of the input-output control unit. Now all three units, the processor P1, the selected input-output control unit and the the selected memory module, are not only synchronous but also in phase. A timing sequence therefore can be set up which is referenced to the identical instant of timing T0 in all three units. As shown in the timing diagrams of FIGS. 19, 20 and 21 the following significant functions occur at the times listed, (a) Read, (b) Write and (c) Descriptor transfer operations:

a. Basic operation involving memory read:

$T_4$—Memory address is stable in requesting module. Address decoding, conflict detection, priority resolution, queue gating, busy flip flop sensing, etc. proceeds.

$T_5$—Switch Interlock set-up (selected cross-point control flip flop and memory module busy flip flop set).

$T_0$—MAR flip flops pulsed; memory address now in MAR. Read cycle starts.

$T_1$—Read cycle continues.

$T_2$—Read cycle ends. Data word is stable in MIR, and available at requesting module for strobing.

$T_3$—Write cycle starts. Data word in MIR proceeds to be re-written.

$T_4$—Write cycle continues. Cross-point control flip flop and busy flip flop reset.

$T_5$—Write cycle ends. MAR and MIR reset.

b. Basic operation involving memory write:

$T_4$—Memory address and data word are stable in requesting module. Address decoding, conflict detection, priority resolution, queue gating, busy flip flop sensing, etc., proceeds.

$T_5$—Switch interlock set-up (selected cross-point control flip flop and memory module busy flip flop set).

$T_0$—MAR and MIR flip flops pulsed; memory address now in MAR; data word now in MIR. Read cycle starts, but serves only to clear addressed location.

$T_1$—Read cycle continues.

$T_2$—Read cycle ends.

$T_3$—Write cycle starts. Data word in MIR proceeds to be written into addressed location.

$T_4$—Write cycle continues. Cross-point control flip flop and busy flip flop reset.

$T_5$—Write cycle ends. MAR and MIR reset.

c. Transfer of I/O descriptor to I/O module:

$T_4$—Memory address and I/O descriptor indicator are stable in requesting module (Processor P1). Address decoding, conflict detection, priority resolution, queue gating, busy flip-flop sensing etc., proceeds. Scanner logic proceeds to select "first non-busy" I/O module.

$T_5$—Switch interlock set-up (selected cross-point controls set for addresses and descriptor transfers, and memory module busy flip-flop set).

$T_0$—MAR flip flops pulsed; memory address now in MAR. Read cycle starts.

$T_1$—Read cycle continues.

$T_2$—Read cycle ends. I/O descriptor is stable in MIR, and available for strobing at selected I/O module.

$T_3$—Write cycle starts. Data word in MIR proceeds to be re-written.

$T_4$—Write cycle continues. Cross-point controls and busy flip flop reset.

$T_5$—Write cycle ends. MAR and MIR reset.

As shown in FIG. 18 the system is very flexible and may operate with less requestor modules of any type in accordance with the needs and pocketbook of the users and modules may readily be added as needs of the user grows to the maximum of two processors, 4 I/O units, and 8 memories shown. With a little modification the the system can readily be adapted also to use of more modules.

A glossary of the designations to denote code lettering used in FIGS. 1 through 21 appears hereinbelow near the end of the specification.

Now referring to FIG. 22 an alternative embodiment of the modular computing and of the switch-interlock system is shown. In the system organization of FIG. 22, a plurality of computers for example, four, and a plurality of input-output control units for example, four, and a plurality of memory units, for example, eight, are interconnected, so that each computer has exclusive use of a data transfer bus with which it can communicate with any memory module, any input-output control module, and any other computer module in the system. Input-output control modules in this embodiment share one bus among them. Sharing a bus in the case of input-output transfers is feasible where there is relatively low activity of this class of transfers. Conflicts that occur when two busses are addressing the same module are resolved on a basis of priorities. A bus whose addressing request originates in an input-output control module, has precedence over a computer's request.

Conflicts are resolved by having the conflicting requestors queue up according to priorities assigned to each module and transmitted with each switching request. In this embodiment the priority system is preemptive also in that a new request for a high priority precedes a low-priority request already in queue.

The control functions of a switching interlock of this system are shown in FIGS. 25, 26, 27A and 27B. The control functions of the switching interlock of this embodiment are performed by five units, each having a matrix configuration: conflict detector matrix, priority matrix, queue matrix, address availability matrix, and command matrix.

The conflict detector matrix is generated by comparing the addresses that are impressed on the address lines associated with each bus. FIG. 23A graphically represents conflicts occurring in a system having five busses and presents an example of conflict resolution in accordance with this embodiment.

In FIG. 23A the conflict matrix is represented graphically and an X in the boxes indicates conflict. The X's shown in the graph boxes in FIG. 23A by way of example, indicate conflict between: busses 1 and 2; and between busses 3, 4, and 5.

Principles of the priority matrix are shown graphically in FIG. 23B which presents an array of the priorities associated with the address on each bus. In this embodiment the priorities are transferred simultaneously with the requested address. In the event of equal priority an arbitrary precedence is established; for example, a lower numbered bus precedes all higher numbered busses. As shown in the priority matrix in FIG. 23B for example, an X indicates precedence of a row number over a column number for a priority sequence of 3, 2, 1, 4, 5.

In FIG. 23B for example, an X in the box in the row 3 in column 1 indicates priority of bus 3 over bus 1. An X in the box of row 2 and column 1 indicates that bus 2 has a priority over bus 1. In the second column the X in the row 3 and column 2 box indicates that bus 3 has a priority over bus 2. In the fourth column, the X in row 1 the box of the intersection of column 4 indicates that bus 1 has a priority over bus 4. The X in the intersection of row 2 and column 4 indicates that bus 2 has a priority over bus 4 and that in the intersection of row 3 and column 4 indicates that bus 3 has a priority over bus 4. The X's in each of the intersecting boxes of the intersections of rows 1, 2, 3 and 4 respectively with column 5 indicates that each of these four buses 3, 2, 1 and 4 has priority over bus 5.

The address availability matrix is simply a representation of the busy or idle condition of the possible addresses.

The outputs of the conflict matrix and the priority matrix are logically ANDed to create a queue matrix. FIG. 23C shows a typical queue matrix. A queue matrix consists of flip flops (or storage elements) arranged in a square matrix, one column and row for each bus. Sampling signals are propagated vertically through the matrix, appearing at the output only where all of the flip-flops in the column are in a reset state (see FIGS. 27A and 27B). Output pulses in addition to activating the command matrix, are used to reset all the flip-flops in the corresponding rows of the queue matrix; for example, the output pulse from column 4 resets all of flip-flops in row 4.

Referring again to FIG. 23C the queue matrix is shown. The conflict and the priority matrices are shown in FIGS. 23A and 23B, respectively. The number of the X's in the column indicate the place they appear in the queue, i.e., buses 2 and 3 are first in line and are serviced immediately. Buses 1 and 4 are second in their respective queues. Bus 5 follows bus 4.

The command matrix accepts inputs from the queue matrix and generates switching commands to effect the requested communication links unless inhibited by the address availability matrix. The address availability matrix generates signals which inhibit the output of the command matrix when a busy address is requested.

In this embodiment the function of the priority matrix is to decode a two bit binary which indicates the priority associated with each bus and to generate precedence signals based on the four-level priority.

Referring to FIG. 24 in this illustrative embodiment, five busses are involved and therefore twenty lines of comparison (see FIG. 25) are required. That is, $N^2-N+20$ (where $N=5$ busses) is the number of comparator circuits used to compare the priorities of all combinations of five busses taken two at a time. This is shown in FIG. 24.

In FIG. 24 each intersection $(i, j)$ denotes a comparator which generates an output if the bus designated by the row number $(i)$ has a higher priority than the bus designated by column number $(j)$.

By arbitrary decision, if the priorities are equal, then output is generated if $i<j$. The case of $i=j$ does not exist since any given bus can handle only one output at a time.

Thus we need two types of comparators, one for $i<$ (less than) $j$ in the priority matrix and the other for $i>$ (greater than) $j$.

Now refer to FIG. 25 which shows the conflict matrix wherein ten different comparators, C1, C2, C3, C4, C5, C6, C7, C8, C9, C10, compare all possible combinations of conflicts between requests coming in on the five different busses. When the two bit address (or larger number address if utilized) indicates that the same memory module is being addressed by both busses an output results which indicates that the busses conflict. In the 5 (1 per bus) groups of 4 bits each we compare each bus with all of the others so that in 10 comparators one exclusive-OR circuit is used to compare each bit of 4 in a group with the corresponding bit in another group of 4 bits.

For example, referring to the conflict matrix of comparator C1, assume that the bus 1 request is to address 0, 1 which indicates, for example, memory module M3. If bus 2 request is also 0, 1 this indicates a request of memory module M3 also. In such case the comparator provides an output showing that bus 1 and bus 2 conflict. Referring to FIG. 27A, this output is one input to the AND gate A241 in the first column of the queue matrix and is one input to the AND gate A2411 of the second column of the queue matrix. Where, for example, the requestor module is an input-output control unit attached to a drum referring to FIG. 25 the bus 1 priority when compared in the comparator C11 with the bus 2 priority provides an output indicating that the bus 1 priority is higher. When the bus 1 priority is higher, this output shown at the output line A is applied to AND gate A2411 shown in the second column of the queue matrix in FIG. 27A. Similarly if because of attachment of the input-output control unit to a higher priority output unit, the comparator C11 in the priority matrix resolves that the bus 2 has priority for this instant because of this connection over bus 1 then a signal output appears at the output of comparator C11 on the bus 2 priority higher line terminated at point B. This output is applied to AND gate A241, column 1. Thus, in the case of a conflict between bus 1 and bus 2, where the priority on bus 2 is higher, an output appears from AND gate A241 indicating that busses 1 and 2 are in conflict and that priority of bus 2 is higher. This causes the flip-flop FF241 to be set. In the case where bus 1 has priority, AND gate A2411 provides an output. This output represents conflict of busses 1 and 2 and that bus 1 has a higher priority. This sets flip-flop FF2411 in the queue matrix. Similarly in case of conflicts of the other busses, the respective comparators in the conflict matrix and the priority matrix provide a corresponding output in the queue matrix shown in FIGS. 27A and 27B to indicate the conflict and which bus has the higher priority by setting a corresponding flip-flop in the queue matrix.

Whenever a conflict between two busses addressing the same memory occurs, the intersection is a comparator which generates an output if the bus designated by the row number has a higher priority than the bus designated by the column number. This is illustrated in FIGS. 27A and 27B. If the priorities are equal then an output is generated if $i$ is less than $j$ (arbitrary decision). The case of $i=j$ does not exist since any given bus can only handle one request at a time. This is shown by the lack of conflict in the circuits of FIG. 25.

Now referring to the queue matrix of FIGS. 27A and 27B on each cycle of six microseconds or six pulses, from the clock, at time T5, a sampling pulse is applied to the input of each of the AND gates Q1, Q2, Q3, Q4 and Q5. The remaining inputs to the AND gates are the outputs showing the state of respective flip-flops in the corresponding columns of the queue matrix. For example, referring to AND gate Q1, assuming that each of the AND gates A241, A242, A243 and A244 are in the reset state at the time T5 of the sample pulse, AND gate Q1 is unblocked permitting any request which is generated on any of the busses to be applied through AND gate Q1 to maintain the reset state of each of the flip-flops in row 1. Simultaneously a service bus 1 output is caused to be applied to the command matrix. The command matrix maintains the busses between each of the requestors and the memories open. Requests are transmitted therefore from the requestors to the memory modules unless the address availability matrix inhibits the signal from the command matrix from permitting the request to go through. This address availability inhibit signal arises when the particular memory addressed is busy. Thus, bus 1 is serviced whenever there is an output from AND gate Q1 applied to the command matrix and the memory addressed is not busy. Where the memory module is busy the address availability matrix causes the command matrix to cause the message to be held until the memory is no longer busy.

Now assume a conflict between busses 1 and 2 and that the priority at the time of bus 2 is higher. An output from AND gate A241 results. This causes flip-flop F241 to be set instead of reset. Now, when the next sampling pulse at time T5 is applied to AND gate Q1, it will not cause AND gate Q1 to have an output. When output from AND gate Q1 is blocked, bus 1 will not be serviced. Under these conditions, the command matrix is in a state to block communication between bus 1 and the particular memory addressed along bus 1 and bus 2.

The request from bus 1 is held until the request from bus 2 has been finished and no other conflicts of higher priority are present. When this has been accomplished and there is no longer an output from AND gate 241, the next sampling pulse T5 resets flip-flop F241. This permits an output to be applied from AND gate Q1 which resets the corresponding queue matrix row and enables servicing of bus 1. A similar process occurs in the case of each of the other rows. For example, assume busses 1 and 2 conflict and bus 1 has a higher priority. Under these circumstances an output will result from AND gate A2411 causing flip-flop F2411 to be set. The sampling pulse T5 does not produce output then from AND gate Q2. Therefore the command matrix prevents interconnection between bus 2 and the requested memory unit. Until the message and the operation indicated on bus 1 is completed and all other priorities over this request along bus 1 have been resolved, output will be blocked. When the circuit is cleared, the particular sampling pulse at time T5 resets row 2 including flip-flop F2411. Output then from AND gate Q2 permits a service of bus 2 signal to be generated along the command matrix. In the absence of inhibiting from the address availability matrix this permits the operation desired indicated to be effected by the memory module addressed.

In this embodiment as compared with the illustrative embodiment of FIGS. 1 through 21, interconnection is permitted between each of the requestor units as well as between the requestors and the memory modules.

The function of the command matrix shown in FIG. 27B is to accept inputs from the queue matrix and generate switching commands for the cross-point switch unless inhibited by the address availability matrix output. The command matrix consists of five (one per bus) bus flip-flops and five times $(m-1)$ gates with buffered outputs where $m$ is the number of functional modules (input-output control computer and memory).

Outputs from the queue matrix set the corresponding bus flip-flops indicating that the bus is at the head of the queue. The output of the bus flip-flops is ANDed with each of the $(m-1)$ outputs from the bus' 4-bit decoding circuit in the availability matrix.

Thus for a switching command to be generated, two conditions must be met. (1) The bus must be at the head of its queue (i.e. bus flip-flop set); and (2) in each group, four exclusive OR's are needed. Each exclusive OR yields a 1 if the inputs are different, and a 0 if identical. Thus only if all inputs are identical there be no "1" inputs to the NOR-gate (exclusive OR) yielding a "1" output from the NOR, signifying conflict.

The availability matrix decodes the 4-bit address for each bus and determines if the requested module (memory M1, M2, etc.) is busy by comparing the decoded address lines with the busy signal lines from the memory modules. It consists of five (one per bus) 4-bit decoders and combining circuits. The decoder and combined circuit for each bus consists of sixteen 5-leg AND gates (four inputs are used for decoding and one for the idle-busy signals from the modules).

In the drawings figures coded letter designations along the input lines have been utilized to facilitate explanation of the drawings. A glossary of these designations follows:

*Switching-interlock logic*

GLOSSARY

A Address
B Busy
B' Busy Not
C Conflict
D Data
DS Descriptor
FF Flip-flop
H Hold
I1 Input-Output Control Module One
I2 Input-Output Control Module 2
I3 Input-Output Control Module 3
I4 Input-Output Control Module 4
L Level
MA Memory Address
M1 Memory Module 1
M2 Memory Module 2
M3 Memory Module 3
M4 Memory Module 4
M5 Memory Module 5
M6 Memory Module 6
M7 Memory Module 7
M8 Memory Module 8
P1 Processor 1
P2 Processor 2
P Pulse
PY Priority
Q Queue
R Read
RQ Request
R-W Read-Write
S Select
SI Switching Interlock
T Time TR Transfer
W Write
X External Address Obviously many modifications and variations of the present invention are possible in the light of the above teachings. It is, therefore, to be understood that within the scope of the appended claims the invention may be practiced other than as specifically described and illustrated.

What is claimed is:

1. A computer system comprising requestor modules including processor modules and input-output control modules, memory modules, a plurality of complementary input-output devices connected to said control modules and a switch interlock system, comprising a cross-point switch interconnecting each of said requestor modules with each of said memory modules, and a bus allocator, said bus allocator comprising a conflict detector responsive to said requestor modules to determine existence of conflicts between requestor modules when addressing the same memory module at the same time, a priority resolver to resolve priorities between the input-output control requestor modules in accordance with their connection to said input-output devices when said input-output control modules are in conflict and a queue matrix comprising a built-in system of priorities of input-output units over one of said processor modules which in turn has priority over another of said processor modules and responsive to said priority resolver, cross-point control means responsive to output of said queue matrix to permit communication between the requestor modules and the memory which is addressed in order of priority established in said queue matrix, a hold matrix responsive to said queue matrix to control said requestor modules so as to hold those selected to follow the requestor module given priority for immediate communication, means to indicate to said hold matrix that a memory module is busy to inhibit said cross-point switch from permitting communication to and from said memory module when it is busy, a cross-point control means to govern operation of said cross-point switch to prevent communication between said one of said requestor modules and one of said memory modules when said requestor module addresses said memory module when said memory module is busy and when conflict occurs which is resolved in favor of a requestor module other than said addressing requestor module.

2. A modular processor system comprising a configuration of computer modules, memory modules, input-output control modules and a plurality of input-output devices each connected to each of said input-output control modules, a switching interlock to provide automatic parallel routing and control of intermodule communications, said interlock comprising conflict detecting and combined fixed and variable instantaneously determinable priority resolving means to resolve conflicts between individual modules of said input-output control modules and said computer modules for communication with said memory modules, said variable priority means resolving present conflicts between input-output control modules on the basis of communicating input-output devices, said interlock comprising means normally open to communication without delay in the absence of conflict of communication between said modules, and for the top priority communication where at least two modules of the computer and input-output control modules are in conflict in attempting to communicate simultaneously with a memory module.

3. The apparatus of claim 2, said conflict detecting and priority resolving means comprising, a queue matrix, a conflict detector, an input-output control module priority resolver, a hold matrix, means responsive to operating conditions of said memory modules to initiate busy signals and cross-point control means responsive to said queue matrix to permit communication in said normally open communication means for the priority message selected and simultaneously to trigger the means to initiate busy signals from the memory modules to the hold matrix, said hold matrix being responsive to the said busy signal emanating and to said queue matrix to provide holding of the messages in a requestor module where a conflict with another requestor module for a memory module ensues and another requestor module is selected and where said memory module is busy.

4. The apparatus of claim 3 including means associated with said computer modules and said input-output control modules to provide address information designating the memory module requested and wherein said conflict detector is responsive to said memory address information from said computer modules and said input-output control modules to provide a conflict signal in the presence of two simultaneous messages addressed to the same memory module, means to provide priority bits in accordance with identity of said input-output devices, said priority resolver being responsive to said priority bits from said input-output devices to provide indication of priority at a given instant of a particular input-output control module and means to provide predetermined selection of said input-output control means in accordance with said priority bits.

5. The apparatus of claim 4, said queue matrix being of a predetermined priority configuration as to priority between input-output control modules and each computer module, said hold matrix being responsive to output of said queue matrix indicating selection of a module having priority granted in said queue matrix to apply hold signals to the hold indicators of the modules other than the said selected module in conflict, said hold matrix being responsive to said memory address signals from said computer and input-output control modules to indicate the memory module that is being addressed.

6. In a system comprising a plurality of requestor and memory modules, said requestor modules comprising computer and input-output control modules, switch interlock communication means between said computer and memory modules and between said input-output control and said memory modules such that said memory modules may be used concurrently by all computer and input-output control modules in the system, only one computer or input-output control module simultaneously using the same memory module, said switching interlock comprising means to resolve conflicts wherein the same memory module is simultaneously referenced by more than one requestor module, said switching interlock comprising a priority resolver and queue matrix means such that where more than one requestor module simultaneously references the same memory module, one requestor module gains access within normal access time and the other requestor module is delayed until completion of the first memory transfer, said queue matrix comprising means to queue up the conflicting requestor modules according to priorities that are assigned to each requestor module and also according to priorities on the basis of the instantaneous connection between said input-output control modules and input-output devices to which they are connected, said priority system being preemptive in that a new request of high priority precedes a low priority request already in queue.

7. In a modular processor system comprising a plurality of processors, a plurality of input-output control modules, said processors and input-output control modules comprising requestor units, a plurality of memory modules, a plurality of input-output devices connected to each of said input-output control modules, and switching interlock means to interlock said processors and said input-output control modules with said memory modules, said switching interlock means comprising a plurality of switching control means to control switching between said memory modules and said processors and said input-output control modules, said switching interlock means further comprising a bus allocator, said bus allocator comprising conflict detector means including a plurality of comparators to detect conflict between each of said processors and input-output modules in attempting to communicate with the same memory module, a queue matrix, priority means to determine priority of access to said memory module when said conflict occurs in accordance with a concurrent first system of instantaneous priority dependent upon instantaneous communicability of said input-output control modules and said input-output devices and a second system of predetermined priority with respect to one another of said input-output control modules and said processors, said queue matrix being responsive to input from said conflict detector means determinative of a conflict being present among at least two of said processors and input-output control modules, and in accordance with said priority determining means providing an output whenever a conflict is present and priority has been determined between the two requestor units in conflict, said switching control means being responsive to said queue matrix outputs, sampling pulse inserting means, a plurality of AND gates responsive to said sampling pulses and to said queue matrix to maintain said switching control means in message communicating position for each requestor unit so long as a conflict between said requestor unit and other requestor units is absent and so long as said other requestor units are of lower priority where a conflict occurs, said queue matrix providing output indicating that a conflict exists and a module other than said requestor unit is selected, to cause the switching control means to hold communication up between said requestor module and said memory module in the case of said conflict wherein selection is in another unit for processing.

8. A system for providing a queue of order of answer in accordance with predetermined priority in case of conflict between two requests addressed to a single device, said system comprising a queue matrix comprising a plurality of logical devices responsive to conflict between a first and each of remaining requests and to establishment of priority of one of said requests, a binary device responsive to the output of each of said queue logical devices which output is absent in the absence of a conflict of requests plus indication of a priority in one of the conflicting requests, means to provide a recurrent sampling pulse, a plurality of AND gates each being responsive to a respective group of queue matrix binary devices which comparing one requestor device with all others is responsive to cases of conflict of each and to said sampling pulses to provide an output permitting access to the requested device in the absence of a signal indicating conflict and priority to another, said AND gates being responsive to said sampling pulse to continuously attempt to reset the group of queue devices in each of said groups of requests initiated.

9. A switching interlock system for a computer comprising functional units to perform computer operations, functional units to perform input-output control operations and functional memory units to provide storage operations, said switching interlock system comprising a conflict detector responsive to addresses from the functional units to the memory storage units to determine when conflicts in addressing the same memory storage unit occur, a priority matrix to determine the order of priority of addressing functional units in cases of conflict, a queue matrix to provide an order of priority of conflicting requests from the functional units in accordance with conflict determinations of the conflict detector and priority determinations of the requests from the functional units, a command matrix to generate control signals in response to the queue matrix, an address availability matrix responsive to selective busy and non-busy condition to selectively inhibit and permit the command matrix in generating control signals, said switching interlock system comprising switching means responsive to command signals from said command matrix to selectively unblock and block communication between the functional units and the memory units.

10. In a modular processor system comprising computer, memory and input-output control modules; a switching interlock to perform a control function of permitting communication between the computer and input-output control and the memory modules, said switching interlock being passive to permit communication in the absence of conflicting demands of the computer and input-output control modules, said switching interlock being responsive to actively control intercommunication between the said computer and input-output control and said memory modules in accordance with a combined predetermined fixed and instantaneously determinable variable priority system when the same memory module is addressed by more than one module, said variable priority system resolving present conflicts between input-output control modules on the basis of communicating input-output devices.

11. The apparatus of claim 10 wherein said priority system comprises a queue matrix, a conflict detector and an input-output control modules priority resolver, said queue matrix comprising a fixed priority means between said input-output control and computer modules, said input-output control modules priority resolver being responsive to coded addresses dependent upon input-output units serviced by said input-output control modules and when input-output units serviced are of the same type being responsive to a predetermined order of priority of input-output control modules to resolve priority as to the input-output control module to be selected for servicing when in the presence of conflict between said input-output control modules, said queue matrix being responsive to said input-output control modules priority resolver and said conflict detector to establish priority of one of said input-output control and computer modules to permit crosspoint control allowing the module selected for priority of communication with said memory module and holding means to hold the remaining requests in queue arrangement determined by said priority system.

12. In a computer having a plurality of functional modules and a plurality of memory units, some of said functional modules being connected to input and output units, a switch interlock comprising a cross-point switch and a bus allocator, said cross-point switch including gating logic for transferring data from a functional requestor unit to a memory module and gating logic in the cross-point switch to transfer data from said memory unit to said functional modules, said gating logic comprising flip-flops in each of said modules which are sending, and an AND gate for each of the receiving modules in said transfers, an OR gate having a number of inputs equal to the number of sending modules, and a flip-flop in each of said receiving modules responsive to output of said OR gates which in turn are responsive to output of said AND gates due to input from the flip-flop and the sending module to thereby provide for transferring data in both directions between said functional modules and said memory units, said bus allocator comprising means to detect conflicts when transfer to a single memory unit by two or more functional modules is required at the same time, priority determining means responsive to said conflicts detector to establish priorities in accordance with combined predetermined fixed relationship of said functional modules and dynamically varying interrelationship of said functional modules which are connected to input and output units for servicing each conflicting transfer from a functional module to a memory unit where conflicts occur, and means to effect holding of functional modules other than the functional module selected for priority in servicing in the event of conflict.

13. The apparatus of claim 12 including means for issuing a descriptor request from one of said free functional modules to transfer information from one of said memory units to one of said input-output modules connected functional units, said descriptor means comprising a selector to determine which of said connected functional modules is selected for transfer of information from said memory unit, a synchronizer responsive to the output of said selector to synchronize timing in said selected functional module with said descriptor issuing functional module, said memory units having means to initiate busy bits when in operation, a hold matrix responsive to output from said priority establishing means and said busy bits to provide hold operation to cause said functional modules from holding to their requests when said memory unit is busy and when a conflict is resolved in favor of another functional modue in conflict, and cross-point control means responsive to said priority determining means, to said selector means and to addresses from said functional modules to enable continuation of normally open condition of said cross-point gates when the addressed memory unit is free to operate and when conflicts are resolved in favor of the module wherein cross-point gating is to be permitted to occur and when there are no conflicts and when a descriptor request is initiated and the memory unit containing the information for said selected module to be transferred to is free to transfer information.

14. In a system comprising a plurality of requestor modules comprising a first and a second computer and a plurality of input-output control modules, a plurality of input-output operating units, each of said input-output control modules being connected to said plurality of input-output operating units, and a plurality of memory modules; a switch interlock system disposed to enable transfer of information between said requestor modules and said memory modules, said requestor modules seeking access to said memory modules selectively singly, simultaneously and in any combination, said switch interlock system comprising a cross-point switch having cross-point gates and busses interconnecting each of said requestor modules with each of said memory modules and means to control said cross-point switch in accordance with an instantaneously determined priority corresponding to indication that the input-output control modules are connected to particular ones of a group of said operating units at a given time and in accordance with a general priority of input-output control modules over one of said processor modules which in turn has priority over the other of said processing modules, and memory module busy indicating means to block communication of another requestor module from said memory module when said memory module is busy.

15. In a system comprising a requestor unit and a memory unit, a switch interlock system comprising a plurality of busses, cross-point control switching means interrupting said busses between said requestor and said memory units, and a bus allocator having a cross-point control unit to govern action of said cross-point switching means, said requestor unit comprising a multi-bit address word means, selectively determined read-write bit storage means, and a multi-bit data word storage device, from which data may be taken for a write operation and a data receiving multi-bit word storage device to receive data in a read operation, said memory unit comprising a memory information register to store a multi-bit data word during a write operation and from which a multi-bit data word is taken during a read operation, said memory unit further comprising a register to receive the read-write command in form to determine selective read and write operation, said memory unit further comprising a multi-bit data word receiving memory address register, said selected cross-point control logic being responsive to said bus allocator to provide selective data write transfer and data read transfer levels in accordance with desired operation of writing and reading respectively and an address and read-write transfer level means which in response to commands from said bus allocator wherein the address is initiated by the requestor unit causes the selected cross-point control logic to address the memory unit under predetermined conditions, said cross-point control means including a plurality of first AND gates, said first AND gates being responsive to input from said requestor module address register and said address and read-write transfer level selected cross-point control logic output, a second AND gate responsive to the read-write bit in the requestor unit and said address and read-write transfer level output of said selected cross-point control logic to provide an output received in the read-write receiving unit of the memory unit, a third AND gate disposed between the multi-bit word information word device and the requestor unit and the memory information register and responsive to a data write transfer level signal from the selected cross-point control logic and to the requestor unit to provide an input into the memory information register upon a data write request from the requestor unit in the presence of a data write transfer level signal actuating said plurality of first AND gates and a fourth AND gate responsive to input from the memory information register and to a data read transfer level signal from the selected cross-point control logic upon actuation by the requestor unit to cause a bus allocator to provide this signal to the selected cross-point control logic, to effect a transfer from the memory information register to the data word receiver register in the requestor unit, and means to apply a timing pulse to said memory information register, said read-write register and said memory address register at a first time and to provide at a later time a pulse to the receiving word register of said requestor unit and clock means to initiate said pulses disposed in said requestor unit and in said memory unit.

16. In a system comprising a processor unit and a plurality of input-output control units, said processor and said input-output control units being connected in detachably communicating relationship to each of a plurality of memory units, each of said units having a pulse generator, means to effect action on a descriptor request from the processor unit to transfer information from a memory device into one of said input-output control units which is free, said means comprising an input-output selector which when one of said input-output control units is free in accordance with a predetermined sequence of input-output control units, enables selection of the first unit of the sequence which is free, and an input-output control unit synchronizer responsive to said descriptor request from said processor unit and to said input-output selector to synchronize the phase of the pulse generator in the input-output unit with the phase of the pulse generator in the processor unit to thereby enable transfer from the memory to the input-output unit at a predetermined instant of real time, and cross-point control means responsive to said selector and to the processor unit descriptor request to trigger said synchronizer in conjunction with said selector and simultaneously to permit connection between the input-output control unit selected by said selector to receive the descriptor request information and the memory unit to which the descriptor request is directed by said processor unit.

17. In a system whereby a plurality of requestor units address a plurality of requested units, a conflict detector to determine simultaneous address of a single requested unit by more than one requestor unit, said requestor units each comprising means to provide an output comprising a plurality of bits coded in accordance with a particular requested unit address, said conflict detector having a conflict circuit for each possible combination of requestor units which address each requested unit, each of said conflict circuits comprising a plurality of pairs of AND gates, each said pair corresponding to one of said bits and comprising a first and a second AND gate, said first gate being responsive to input of a first binary level of its respective bit from each of the requestor units for which possibility of conflict is being determined, such that an output results when the bit level being investigated is the same for each of the two requestor units, said second AND gate being responsive to the other binary state of said respective bit, an OR gate responsive to each said pair of AND gates to provide output where matching occurs the bit level of the address from said requestor units for which conflict is being determined, which level is being investigated by said pair of AND gates, output of either of said AND gates causing its corresponding OR gate to provide an output, and an AND gate responsive to each of the OR gates corresponding to a significant bit in the address and responsive to indication of a request level signal indicating request from each said two conflicting units, output of said AND gate providing a signal determinative of conflict between said two units in addressing the same requested unit.

18. In a modular processing system comprising a plurality of requestor units and a plurality of memory units, cross-point control switching gate means which are normally open to permit normally interchange of information between said requestor units and said memory units and means to block selected gates of said cross-point control gate means to prevent communication between one of said requestor units and one of said memory units, a queue matrix to control said cross-point control gate means, said queue matrix comprising OR means responsive to a signal indication of conflict between requestor units in addressing the same memory, said OR means comprising a plurality of OR gates, each OR gate being responsive to conflicts between one of said requestor units and each of a group of other requestor units such that in the presence of an output from one of said OR gates, said one requestor unit, which is being compared with each other requestor unit for conflict, is blocked to signals between said requestor unit and the requested memory unit for which said requestor unit is in conflict with another unit, and a second output inverted from said first output to provide holding of the address from said requestor unit until the conflicting requestor units with higher priority complete their operation in conjunction with said commonly addressed memory unit.

19. In a system comprising processor and memory modules and a plurality of input-output control modules, a descriptor request means whereby said processor effects transfer of information between said memory modules and an available input-output control module, said input-output modules being designated in a predetermined sequence of priority of use for descriptor requests, an input-output control module selector to select the first available control module of said predetermined sequence of priority of input-output control modules when at least one input-output control module is available for transfer of information between a memory module and said selected control module, said selector comprising an AND gate for each input-output control module to provide a descriptor transfer signal for its respective input-output control module, means for applying a first descriptor request signal input simultaneously to each of said AND gates, the first module of said pre-determined sequence of input-output control modules having a second input means to apply a signal indicative of free and of busy state of said first designated input-output control module to accept and to deny transfer respectively, means to apply input inverse to said second input to each remaining control module AND gate, each successive control module of said sequence having an input means to apply a signal indicative of free and of busy state of its respective input-output control module and having means to apply input inverse to each input indicative of the respective state applied to each input-output control module prior in sequence to it, so that successive busy signals are applied to each AND gate corresponding to the sequence of modules below that module in sequence for which the busy and free signal is applied such that for each designated numbered module when that module is busy its AND gate is inhibited from providing an output due to indication that it is busy and when it is free its AND gate receives a signal indicative of it being free and signals indicative of all higher priority selective input-output control modules being busy.

20. In a system comprising a plurality of requestor modules including a first type requestor module, a second type of requestor module and a third type of module means which is responsive to selection of one module of said second type to perform an operation to synchronize the phase of clock pulses of said selected module to clock pulses of said first type requestor module, said synchronizing means comprising an AND gate having a pair of inputs and an output for each combination of second type and third type modules, said inputs comprising means disposed from the output of said first type module designating one of said third type of modules to transfer information to said selected module said second input to said AND gate being an input responsive to an output of said first type module requesting said operation and channeled through said means to select said unit so as to appear at the input to said AND gate, an AND gate for each module of said third type modules responsive to said selected module responsive to its designation to provide an output when said operation is requested and when said second type module is selected, said request being addressed to said designated third type module, and OR means responsive to each of said AND gates, said selected module being responsive to output of said OR gate to synchronize its time cycle of operation in phase with the time cycle of operation of said requested third module and said first module.

21. In a system comprising requestor units and a unit to which a request is made, hold matrix means operable upon more than one request for the said requested unit and on busy conditions of said requested unit, said matrix comprising an OR gate for each requestor unit, an AND gate for said requested unit for each of the requestor units, means to provide a first input indicative of requested unit address from each of said requestor units to each of said AND gates, and a second common input to each of said AND gates responsive to busy condition of said addressed unit, each of said requestor unit OR gates being responsive to its respective AND gate, said OR gate having an input responsive to a signal indicating that said requestor unit is to await operation upon its request, each of said OR gates having output means to provide a signal to its corresponding unit to enable said unit to sense said OR gate output and take appropriate holding action.

22. In a system comprising a plurality of requestor and requested modules including means wherein one of said requestor modules may separately address any one of said requested modules to transfer information into a second requestor module; a conflict detector, a requestor module resolver to determine instantaneous priorities in accordance with peripheral units with which some of said requestor modules are in connectible relationship, a queue matrix responsive to said conflict detector and to said requestor module resolver to provide a queue of requestor module requests in accordance with a first fixed system of priorities between sets of requestor modules and said second instantaneous priority determined by said resolver in accordance with instantaneous priorities, means to provide signals indicating that the requesting modules are busy, and a hold matrix responsive to decoded address messages from said requestor modules and to signals from said queue matrix request for indicating deferring of consummation of requests from said requestor modules, and responsive to said indications of requested modules being busy to provide a hold signal to the requestor modules to effect holding of said requestor modules until said queue matrix enables operation of said request.

23. In a computer system comprising a requestor unit and a requested unit, a cross-point control switching means for effecting address, read-write and data write transfer control comprising an AND gate responsive to inputs when said requestor unit requests said requested unit, selection of said requestor unit when it is the only requestor of said requested unit and in the event of conflict with said requestor unit and another requestor unit and selection of said requestor unit as having priority, and an input indicative of said requested unit being free to execute the request of said requestor unit, said AND gate having an output to trigger said requested unit to initiate a busy signal, a cross-point flip-flop unit, clock means disposed in said requestor unit, an input to said flip-flop causing it to be reset at a predetermined pulse of said clock unit, the output of said AND gate being fed to the said side of said flip-flop and in conjunction with an input carrying the next succeeding pulse to said first named pulse said flip-flop being set to provide a high-level output indicative of being granted switching to said requested unit, gate means responsive to output from said flip-flop and to respective address bits to effect an output from each of said AND gates, an OR gate responsive to said AND gate to provide an output such that in the presence of an input and an output from said AND gate transfer of an address from said requestor unit to said requested unit is effected, an AND gate triggered by said output of said flip-flop to effect output in the presence of a request from said requestor unit to transmit said request to said requested unit, a plurality of AND gates corresponding to bits of an information word, a data write transfer AND gate, an inverter, said data write transfer AND gate being responsive to said output from said inverter and to said flip-flop level to provide a first input to said write cross-point gates of said requestor unit, said inverter being responsive to the selective level of read and of write to selectively provide an inhibit output of said data write transfer level AND gate thereby selectively permit writing a word from said requestor unit into said requested unit when desired said read-write level forming an input to provide data read transfer control.

24. A cross-point control switching means comprising, a read-write gate, data write transfer control gate means, gating means to inhibit operation of said data-write transfer control gate means in the presence of a read instruction and to actuate said data write transfer control gate in the presence of a write instruction, a binary state switching device, which retains its switched condition pending input denoting a change in state, a cross-point control AND gate responsive to a plurality of conditions to provide an output to set said switching device and to simultaneously actuate a requested unit, means to invoke a time indicating pulse which when inserted causes said switching device to assume a state to permit communication between a requestor unit and a requested unit, an AND gate responsive to the output of said switch and to an operation request to actuate the requested unit, an address transfer gate responsive to address information from said requestor unit and to the output of said switching means to provide transfer of address from said requestor unit to said requested unit and means responsive to the output of said cross-point control AND gate to synchronize phase of said requestor unit and said requested unit.

25. Data read transfer control means for transfer of information from a memory unit to a requestor unit, said means comprising a memory information register containing a plurality of binary state devices to provide a multi-device function, a cross-point control AND gate, a plurality of data read cross-point AND gates responsive to the state of said memory binary devices and to the output of said cross-point control gate to provide an output switching each of said memory information register words into said requestor unit, said cross-point control AND gate comprising a plurality of inputs, one of said inputs applied to said AND gate being a read-write level input from said requestor unit, a second of said inputs being an input indicative of normal request for a read and for a write operation, a cross-point control flip-flop unit, a third input of said cross-point control AND gate being responsive to output of one of said flip-flop unit states when said flip-flop state is at a predetermined level, and means to set said flip-flop, an AND gate means setting said predetermined level of said flip-flop in the presence of input from said requestor unit of request to said memory unit, determining that said requestor unit is selected to transmit the message, and a signal indicating that the memory unit requested for transfer is free, output of said AND gate means setting said cross-point control flip-flop in the presence of a pulse from said requestor unit, said requestor unit comprising clock means to initiate recurring clock pulses and a distributor, one of said pulses from said distributor being fed to said one state of said flip-flop to cause its state to become set for switching input to said cross-point control AND gate to enable activation of said data read cross-point AND gates, to enable transfer of the information in said memory unit to said requestor unit.

26. In a system of controlling cross-point switching between a requestor unit and a requested unit, and wherein said system comprises a second requestor unit, means to provide control of a data read transfer from said requested unit to said first requestor unit in response to a request from said second requestor unit, said requested unit having a memory information register comprising a plurality of binary devices, said first requestor unit having an information register comprising a plurality of binary devices corresponding to said requested unit binary devices, a plurality of data read cross-point AND gates disposed between said requested unit binary devices in said requested unit information register and the corresponding binary devices in said first requestor unit information register, a cross-point control AND gate, said cross-point AND gates responsive to the output of said cross-point control AND gate and said requested unit binary devices to provide an output to trigger said OR gate, to thereby provide information transfer from each of said requested unit binary information register devices to the first requestor unit binary information register devices in the presence of output from said cross-point control AND gate, a first and a second preliminary cross-point control AND gate, said cross-point control AND gate being responsive to the output from said preliminary control AND gates to provide an output of said data read.

27. A computer system comprising at least one processor and at least one main memory storage means connected to communicate therewith, said storage means containing both descriptor and data words, at least two control units, at least two peripheral storage devices connectable to said control units, said storage devices having different characteristics which determine different priorities for access to the computer system, circuit means enabling said processor to cause descriptor words to be transferred between said storage means and said control units, said descriptor words thereafter controlling data communication between said peripheral storage devices and said storage means, a priority resolver connected to permit data communication between said storage means and only one of said peripheral storage devices at a time when more than one of said storage devices attempt to simultaneously gain access thereto and said priority resolver including means determining which storage device is permitted access on a priority basis dependent upon the type of peripheral device individually connected to said control unit.

(References on following page)

References Cited by the Examiner

UNITED STATES PATENTS

| | | | |
|---|---|---|---|
| 2,910,238 | 10/1959 | Miles | 340—152 |
| 2,946,986 | 7/1960 | Harrison | 340—172.5 |
| 2,951,234 | 8/1960 | Spielberg | 340—172.54 |
| 3,029,414 | 4/1962 | Schrimpf | 340—172.5 |
| 3,099,818 | 7/1963 | Murray | 340—172.5 |
| 3,117,306 | 1/1964 | Reitfort | 340—172.5 |

OTHER REFERENCES

Pages 205–206, 1960, Irwin, W. C., Digital Computer Principles. N.J.D., Van Nostrand.

ROBERT C. BAILEY, *Primary Examiner.*

STEPHEN W. CAPELLI, MALCOLM A. MORRISON, *Examiners.*

P. L. BERGER, *Assistant Examiner.*

UNITED STATES PATENT OFFICE

CERTIFICATE OF CORRECTION

Patent No. 3,274,554 September 20, 1966

Warren W. Hopper et al.

It is hereby certified that error appears in the above numbered patent requiring correction and that the said Letters Patent should read as corrected below.

Column 4, line 3, for "possible" read -- possibly --; column 6, line 2, for "high" read -- higher --; column 12, line 3, for "requestor" read -- request --; column 14, line 69, for "amplication" read -- amplification --; column 15, line 74, after "I/O" insert -- control --; column 16, line 9, for "process" read -- processor --; column 20, line 68, for "This" read -- That --; column 24, line 62, for "flip-flop" read -- flip-flops --; column 34, line 46, for "unit" read -- module --; same line 46, for "module" read -- unit --; line 74, for "modules" read -- unit --; same column 34, line 75, for "units" read -- modules --; column 35, line 12, for "modue" read -- module --; column 36, lines 3 and 4, for "module" read -- unit --.

Signed and sealed this 29th day of August 1967.

(SEAL)
Attest:

ERNEST W. SWIDER
Attesting Officer

EDWARD J. BRENNER
Commissioner of Patents